United States Patent
Takahashi et al.

(10) Patent No.: US 6,390,586 B1
(45) Date of Patent: May 21, 2002

(54) RECORDING APPARATUS, RECORDING METHOD, INFORMATION PROCESSING APPARATUS AND RECORDING MEDIUM

(75) Inventors: Kiichiro Takahashi, Kawasaki; Naoji Otsuka, Yokohama; Hitoshi Nishikori, Kawasaki; Osamu Iwasaki, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/847,741

(22) Filed: Apr. 22, 1997

(30) Foreign Application Priority Data

Apr. 23, 1996 (JP) .............................. 8-101617
Apr. 22, 1997 (JP) .............................. 9-104712

(51) Int. Cl.$^7$ .................. B41J 29/393; B41J 29/38; B41J 2/21
(52) U.S. Cl. .................. 347/19; 347/14; 347/15; 347/43
(58) Field of Search .................. 347/19, 15, 43, 347/14

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,626,867 A | * 12/1986 | Furukawa et al. ............. 347/43 |
| 4,723,129 A | 2/1988 | Endo et al. |
| 4,740,796 A | 4/1988 | Endo et al. |
| 4,788,563 A | * 11/1988 | Omo et al. ..................... 347/9 |
| 5,038,208 A | * 8/1991 | Ichikawa et al. .............. 347/19 |
| 5,276,459 A | * 1/1994 | Danzuka et al. .............. 347/19 |
| 5,285,220 A | * 2/1994 | Suzuki et al. ................. 347/19 |
| 5,500,661 A | * 3/1996 | Matsubara et al. ............ 347/9 |

FOREIGN PATENT DOCUMENTS

| | | |
|---|---|---|
| DE | 42 44 259 | 7/1994 |
| EP | 0 600 735 | 6/1994 |
| EP | 0 687 565 | 12/1995 |
| EP | 0 700 786 | 3/1996 |
| JP | 54-56847 | 5/1979 |
| JP | 59-123670 | 7/1984 |
| JP | 59-138461 | 8/1984 |
| JP | 60-71260 | 4/1985 |
| JP | 3-005156 | 1/1991 |
| JP | 6-155758 | 6/1994 |

* cited by examiner

Primary Examiner—John Barlow
Assistant Examiner—Charles W. Stewart, Jr.
(74) Attorney, Agent, or Firm—Fitzpatrick, Cella, Harper & Scinto

(57) ABSTRACT

The present invention achieves formation of a $2^n$-value image with data of n bits, thereby reducing the amount of image information to be transferred and processed, while improving the tonal rendition, and thereby realizing a high-quality recording system for dot matrix recording suitable for personal use. For this purpose there is disclosed an ink jet recording apparatus and a method therefor, comprising an image process unit for generating multi-value information, an identification unit for identifying that the image data are multi-value information, an identification unit for the recording head, and an analysis unit for decoding the n-bit information, and featured by effecting multi-value recording while processing the n-bit data as multi-value information.

47 Claims, 41 Drawing Sheets

FIG. 1A
TWO-VALUE RECORDING METHOD
○ : NOT RECORDING DOT
⊘ : RECORDING DOT
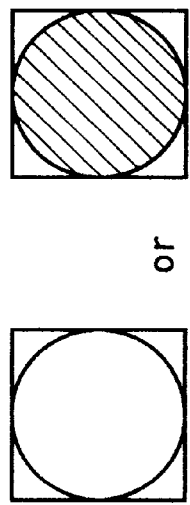
FIG. 1B
MULTI-VALUE RECORDING METHOD
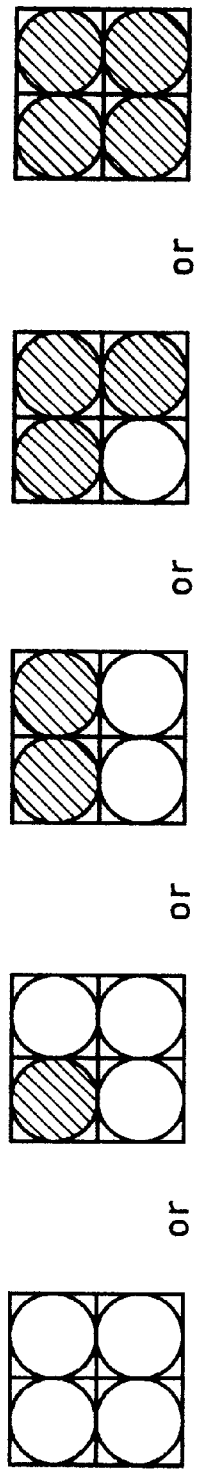

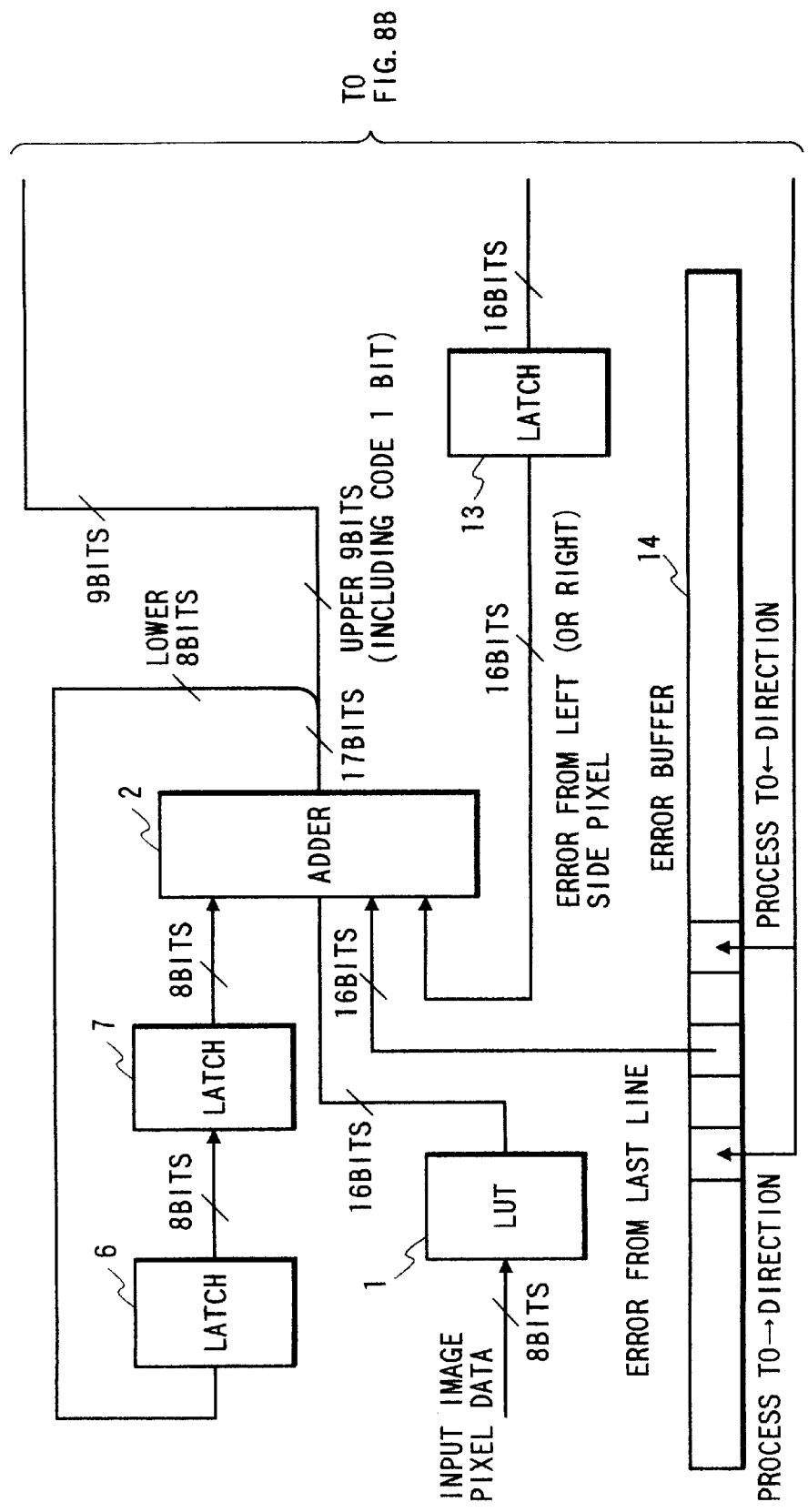

FIG. 9

ERROR DISTRIBUTION WINDOW
WHEN PROCESS→DIRECTION

|    |    | ±  | e0 |
|----|----|----|----|
| e3 | e2 | e1 |    |

ERROR DISTRIBUTION WINDOW
WHEN PROCESS←DIRECTION

| e0 | ±  |    |    |
|----|----|----|----|
|    | e1 | e2 | e3 |

FIG. 10

EXAMPLE OF ERROR
DISTRIBUTION COEFFICIENT

|           |           | ±         | $\frac{129}{256}$ |
|-----------|-----------|-----------|-------------------|
| $\frac{20}{256}$ | $\frac{37}{256}$ | $\frac{70}{256}$ |     |

FIG. 11

|     | e0    | e1    | e2    | e3   | o0 | o1 |
|-----|-------|-------|-------|------|----|----|
| 0   | 0     | 0     | 0     | 0    | 0  | 0  |
| 1   | 128   | 71    | 37    | 20   | 0  | 0  |
| 2   | 256   | 142   | 74    | 40   | 0  | 0  |
| ⋮   | ⋮     | ⋮     | ⋮     | ⋮    | ⋮  | ⋮  |
| 42  | 5376  | 2982  | 1554  | 840  | 0  | 0  |
| 43  | -5376 | -2982 | -1554 | -840 | 1  | 0  |
| ⋮   | ⋮     | ⋮     | ⋮     | ⋮    | ⋮  | ⋮  |
| 84  | -128  | -71   | -37   | -20  | 1  | 0  |
| 85  | 0     | 0     | 0     | 0    | 1  | 0  |
| ⋮   | ⋮     | ⋮     | ⋮     | ⋮    | ⋮  | ⋮  |
| 127 | 5376  | 2982  | 1554  | 840  | 1  | 0  |
| 128 | -5376 | -2982 | -1554 | -840 | 0  | 1  |
| ⋮   | ⋮     | ⋮     | ⋮     | ⋮    | ⋮  | ⋮  |
| 169 | -128  | -71   | -37   | -20  | 0  | 1  |
| 170 | 0     | 0     | 0     | 0    | 0  | 1  |
| ⋮   | ⋮     | ⋮     | ⋮     | ⋮    | ⋮  | ⋮  |
| 212 | 5376  | 2982  | 1554  | 840  | 0  | 1  |
| 213 | -5376 | -2982 | -1554 | -840 | 1  | 1  |
| ⋮   | ⋮     | ⋮     | ⋮     | ⋮    | ⋮  | ⋮  |
| 254 | -128  | -71   | -37   | -20  | 1  | 1  |
| 255 | 0     | 0     | 0     | 0    | 1  | 1  |
| 256 | 128   | 71    | 37    | 20   | 1  | 1  |
| ⋮   | ⋮     | ⋮     | ⋮     | ⋮    | ⋮  | ⋮  |
| 297 | 5376  | 2982  | 1554  | 840  | 1  | 1  |
| -42 | -5376 | -2982 | -1554 | -840 | 0  | 0  |
| ⋮   | ⋮     | ⋮     | ⋮     | ⋮    | ⋮  | ⋮  |
| -1  | -128  | -71   | -37   | -20  | 0  | 0  |

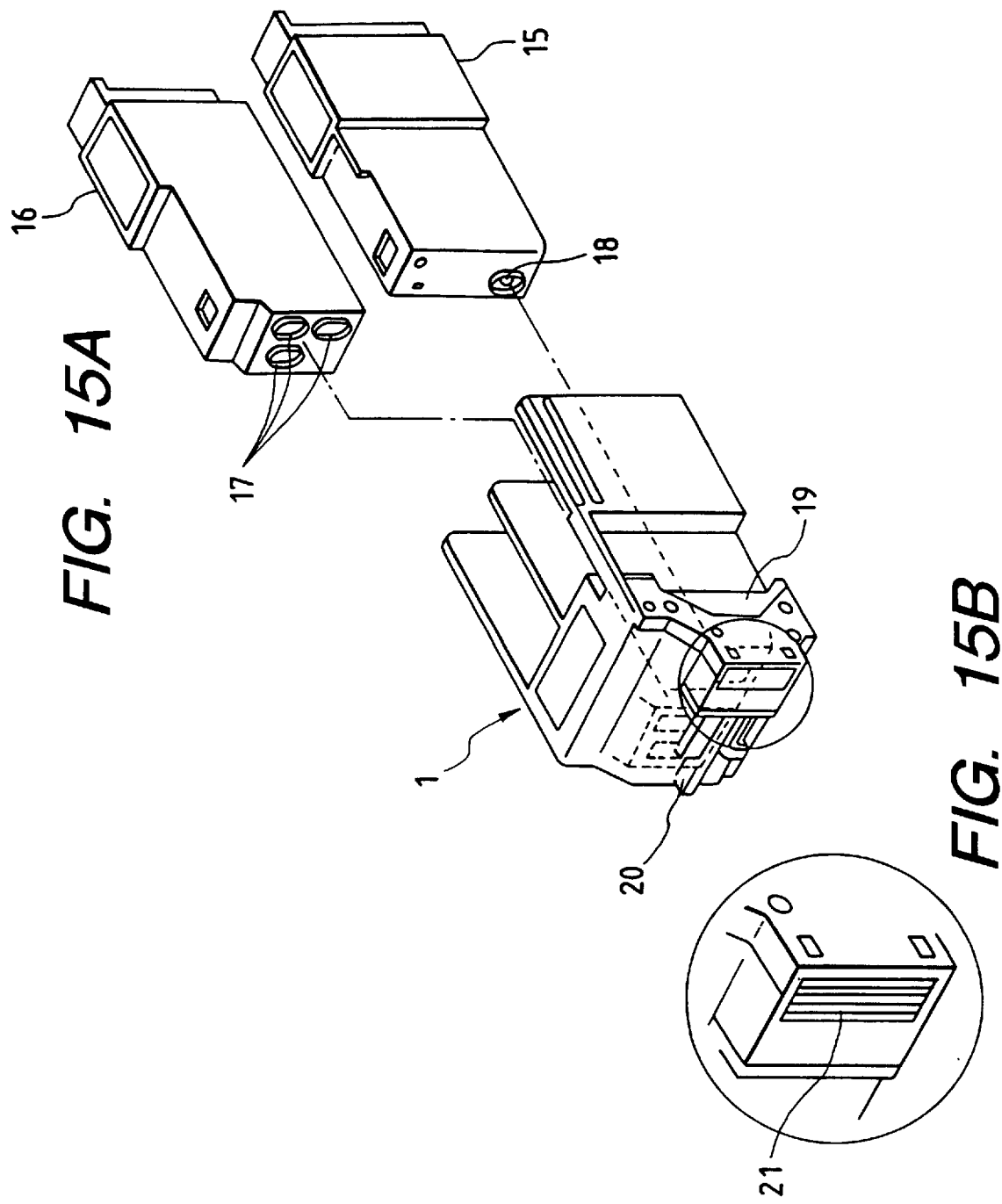

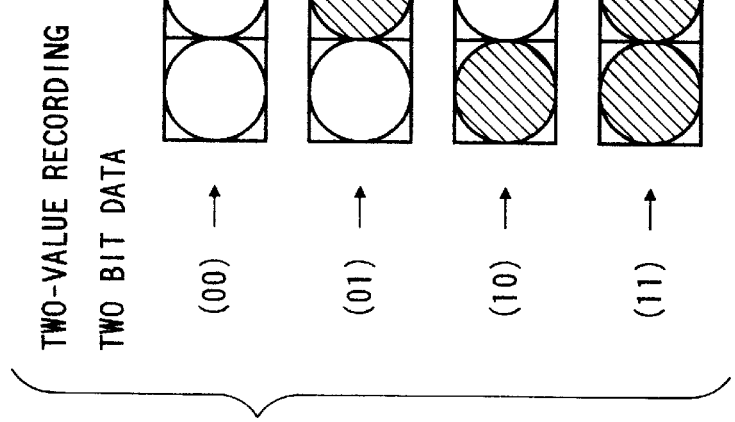
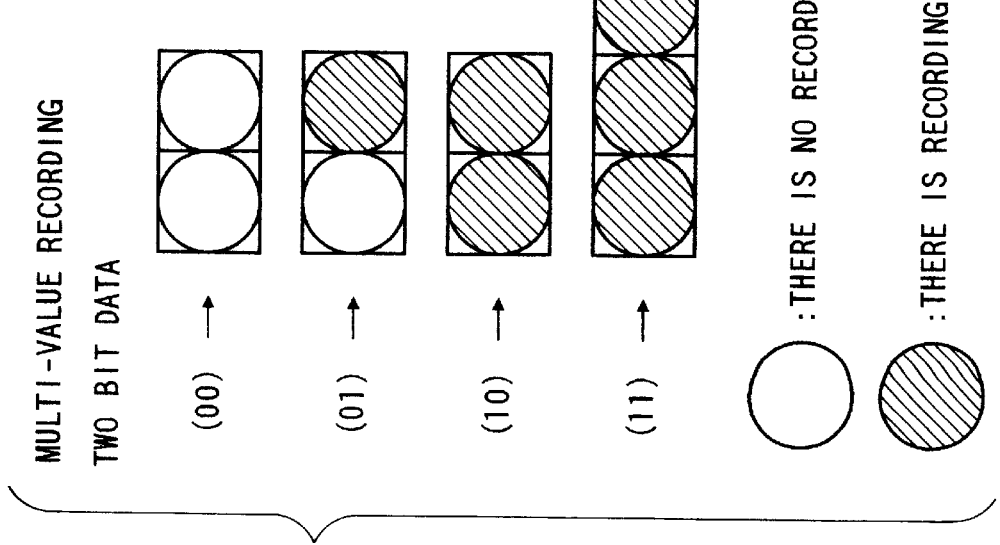

FIG. 23

| TWO BIT DATA | OUTPUT |
|---|---|
| 00 | 000 |
| 01 | 001 |
| 10 | 011 |
| 11 | 111 |

FIG. 25

| TWO BIT DATA | OUTPUT 1 | OUTPUT 2 |
|---|---|---|
| 00 | 00 | 00 |
| 01 | 01 | 00 |
| 10 | 10 | 01 |
| 11 | 11 | 11 |

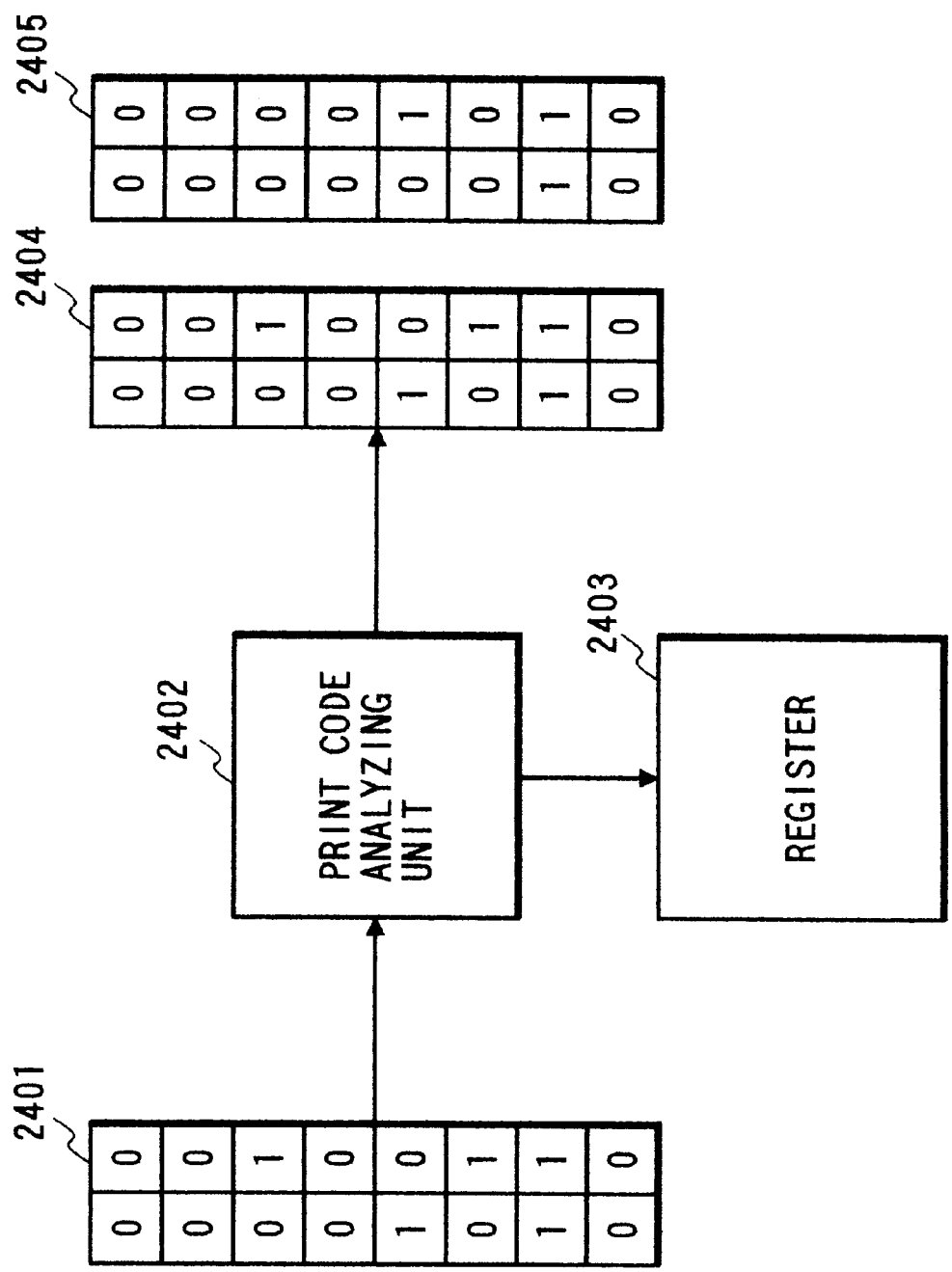

FIG. 26

| DATA QUANTITY FOR ONE PIXEL | THE NUMBER OF GRADATIONS EXPRESSIBLE BY ORDINARY RECORDING METHOD | THE NUMBER OF GRADATIONS EXPRESSIBLE BY RECORDING METHOD OF THE PRESENT INVENTION |
|---|---|---|
| 1 BIT | 2 VALUE | 2 VALUE |
| 2 BIT | 3 VALUE | 4 VALUE |
| 3 BIT | 4 VALUE | 8 VALUE |
| 4 BIT | 5 VALUE | 16 VALUE |
| 5 BIT | 6 VALUE | 32 VALUE |
| 6 BIT | 7 VALUE | 64 VALUE |
| 7 BIT | 8 VALUE | 128 VALUE |
| ⋮ | ⋮ | ⋮ |
| n BIT | (n+1) VALUE | $2^n$ VALUE |

FIG. 27

| TWO BIT DATA | ONE PASS RECORDING METHOD | THREE PASS RECORDING METHOD |
|---|---|---|
| 00 | 000 | 000 |
| 01 | 001 | 001 |
| 10 | 011 | 011 |
| 11 | 011 | 111 |

FIG. 28

| TWO BIT DATA | HIGH SPEED RECORDING | NORMAL RECORDING | HIGH IMAGE QUALITY RECORDING |
|---|---|---|---|
| 00 | 0 | 00 | 000 |
| 01 | 1 | 01 | 001 |
| 10 | 1 | 11 | 011 |
| 11 | 1 | 11 | 111 |

FIG. 29

| TWO BIT DATA | MEDIUM A | MEDIUM B | MEDIUM C |
|---|---|---|---|
| 00 | 000 | 000 | 000 |
| 01 | 001 | 001 | 001 |
| 10 | 001 | 011 | 011 |
| 11 | 001 | 111 | 011 |

FIG. 30

| TWO BIT DATA | MEDIUM A | MEDIUM B | MEDIUM C |
|---|---|---|---|
| 00 | 0 | 000 | 00 |
| 01 | 1 | 001 | 01 |
| 10 | 1 | 011 | 11 |
| 11 | 1 | 111 | 11 |

FIG. 37

| ID | COLORING MATTER DENSITY | DATA | MAXIMUM | CORRESPONDING MEDIA |
|---|---|---|---|---|
| 1 | Y 2.5%<br>M 3.0%<br>C 2.7%<br>K 2.6% | 360×360dpi<br>TWO VALUE | C 100% R 200%<br>M 100% G 200%<br>Y 100% B 200%<br>K 100% | NORMAL PAPER<br>COAT PAPER<br>PICTORIAL PAPER |
| 2 | Y 2.5%<br>M 1.0%<br>C 0.9%<br>K 1.3% | 360×360dpi<br>FOUR VALUE | C 300% R 400%<br>M 300% G 400%<br>Y 100% B 400%<br>K 200% | COAT PAPER<br>PICTORIAL PAPER |
| 3 | Y 2.5%<br>M 0.8%<br>C 0.7%<br>K 0.9% | 360×360dpi<br>FIVE VALUE | C 400% R 500%<br>M 400% G 500%<br>Y 100% B 500%<br>K 300% | PICTORIAL PAPER |

360 dpi
TWO VALUE

360 dpi
FOUR VALUE

360 dpi
FIVE VALUE

◎ EJECTING TWO DOTS ON PIXEL
○ EJECTING ONE DOT ON PIXEL
× NO DOT

RECORDING APPARATUS, RECORDING METHOD, INFORMATION PROCESSING APPARATUS AND RECORDING MEDIUM

BACKGROUND OF THE INVENTION

1. Field of the Invention

The present invention relates to a system enabling recording of a high quality image by area modulation or density modulation of each recording pixel in a dot matrix method, and is applicable to an apparatus for forming a record with ink on a recording medium such as paper, cloth or OHP sheet.

2. Related Background Art

With the recent wide spreading of office automation equipment such as personal computers and word processors, there have been developed various methods for printing the information outputted from such equipment, and, among such methods, the recording means of dot matrix recording method such as wire dot printing method, thermal transfer printing method, ink jet printing method etc. are the currently most popular digital recording systems because they are relatively inexpensive and enable space saving.

In the digital recording methods, the continuous tone is represented in pseudo manner by the covering area of plural dots on the paper, because each dot cannot be adjusted in analog manner. In recent years, however, for attaining a higher image quality, there is a strong demand for an image quality close to that of the analog recording such as the silver halide-based photography.

In such digital recording methods, it is already known that the image recording closer to the analog recording is possible by recording with multiple dots of plural kinds and by receiving multi-value data in the recording apparatus. However the handling of such multi-value data in the recording apparatus itself has not been realistic for the personal use in the recent years, because the hardware configuration required for the data transfer, RAM capacity and data development and the process time and the cost involved therein are all inevitably complex and enormous. Consequently the two-value (binary) recording in which each pixel is represented by a dot has been the mainstream of the currently employed digital recording methods.

However, based on the above-mentioned demand for the higher image quality and on the advent in the performance of the personal computers, there is being developed the multi-value recording in which each pixel is represented by plural dots. In most cases such recording is realized by a higher resolution or a reduction in size of each pixel, wherein the recording apparatus is so designed as to reproduce a higher resolution and each pixel is represented by plural dots by generating multi-value data at the preparation of the image.

FIGS. 1A and 1B show an example of the multi-value recording with plural dots. In contrast to the two-value recording shown in FIG. 1A, in which each pixel is represented by a single dot, FIG. 1B shows a multi-value recording method in which each pixel is represented by four dots. In such multi-value recording, in the image processing, information of 4 dots is generated from each pixel, and such information of 4 dots is transferred to the recording apparatus, which thus realizes the multi-value recording by a recording method identical with that in the two-value recording. More specifically, the recording of information of each bit is same as that in the two-value value recording, and four information, each binarized, are combined to constitute multi-value information.

In the example shown in FIG. 1B, the multi-value recording method is equivalent to the two-value (binary) recording method of a doubled resolution, and the information of each bit controls whether or not to print a dot. Stated otherwise, in comparison with the ordinary two-value recording method, such method is required to transfer and process the image information of four times in volume. This is because the recording apparatus lacks the function to recognize the multi-value information. Such function has been considered as complex and difficult to realize for the personal use.

However, for achieving higher image quality in the digital recording methods, it is required to realize higher reproducibility of gradation, and such requirement is anticipated to increase in the future. The major obstacle in attaining such objective lies in the time required for transfer and processing of the image information.

In the conventional systems, the image processing unit executes the multi-value process and the image information of a data amount, proportional to the number of gradation levels, is transferred to the recording apparatus. Consequently the transferred data amount becomes enormous with the improvement in the tonal rendition. Also in the recording apparatus, the capacity of the memory means, such as the print buffer for storing the information (data) of the image to be recorded, increases proportionally with the amount of the image information, and is multiplied by the number of gradation levels, in comparison with the binary recording in which each pixel is represented in two levels. Thus, such system is extremely disadvantageous in cost and this constitutes a major difficulty in realizing the personal application.

Such difficulty becomes more serious with the increase in the number of gradation levels.

For example, in comparison with the case of representing each dot with three or four levels, the representation with five or more levels by the use of inks of higher and lower densities for each dot poses a larger difficulty.

Such difficulty is not limited to the ink jet recording but is also present in other recording methods. However, the above-mentioned cost problem relating to the memory capacity or the image information transfer time is particularly difficult to resolve in the ink jet recording as it is most commonly utilized for personal applications.

SUMMARY OF THE INVENTION

An object of the present invention is to individually or entirely resolve the above-mentioned difficulties.

Another object of the present invention is to limit the amount of transfer of the image information required for image formation.

Still another object of the present invention is to limit the amount of the image information to be transferred and to enable transfer of the image data of higher tonal rendition.

The foregoing objects can be attained, according to the present invention, by an ink jet recording apparatus, an ink jet recording method, an information processing apparatus and a memory medium storing the process for controlling the functions thereof, capable of realizing a high image quality in the dot matrix recording method adapted for personal use, by limiting the amount of image information to be transferred and processed and at the same time improving the gradation reproducibility.

The foregoing objects can be attained, according to a preferred embodiment of the present invention, by an ink jet recording apparatus employing a recording head provided with plural discharge portions for discharging ink and forming a record by discharging ink from the recording head onto a recording medium according to image data, the apparatus comprising:

a mounting unit capable of interchangeably mounting a first recording head for discharging ink of relatively superior color developing ability and a second recording head for discharging ink of relatively inferior color developing ability;

image processing means for generating multi-value information from the image data; and means for decoding the multi-value information according to the color developing ability of the ink of the recording head mounted on the mounting unit;

wherein, in the information of plural bits representing a pixel, at least a bit may have a meaning different from that of other bits.

Still another object of the present invention is to provide an information processing apparatus and a medium adapted for use with an ink jet recording apparatus of multiple functions.

Still another object of the present invention is to provide an ink jet recording apparatus capable of limiting the amount of transfer of the image information in discharging recording materials, which are of a same hue but are different in density, onto the recording medium.

Still another object of the present invention is to provide an ink jet recording apparatus with novel functions.

Still other objects of the present invention, and the features thereof, will become fully apparent from the following description of the embodiments, to be taken in conjunction with the attached drawings.

BRIEF DESCRIPTION OF THE DRAWINGS

FIGS. 1A and 1B are views showing an example of multi-value recording employing plural dots;

FIG. 9 is a view showing an error distribution window;

FIG. 10 is a view showing error distribution coefficients;

FIG. 11 is a detailed view of an error distribution table;

FIG. 15A is a perspective view of a recording head with detachable ink tanks embodying the present invention and FIG. 15B is an enlargement of a section thereof;

FIGS. 21A and 21B are views showing recording dots represented by two bits per pixel;

FIG. 23 is a view showing an example of a multi-value table in the embodiment 1 of the present invention;

FIG. 24 is a block diagram showing an example of the print data analysis means in the embodiment 1 of the present invention;

FIG. 25 is a view showing an example of a multi-value table in the embodiment 1 of the present invention;

FIG. 26 is a table showing the number of reproducible gradation levels as a function of the data amount per pixel;

FIGS. 27 and 28 are views showing examples of a multi-value table corresponding to the recording mode in an embodiment 2 of the present invention;

FIGS. 29 and 30 are views showing examples of a multi-value table corresponding to the recording mode in an embodiment 3 of the present invention;

FIG. 37 is a table showing the relationship among the dye concentration of ink, data, recording medium and maximum ejection amount in another embodiment of the present invention;

FIGS. 39A, 39B and 39C are views showing the relationship between the print data and the dots in another embodiment of the present invention, respectively in case of two-value data, four-value data and five-value data;

DESCRIPTION OF THE PREFERRED EMBODIMENTS

In the following the present invention will be explained by an embodiment, with reference to the attached drawings.

[Image Processing]

Figure 2:
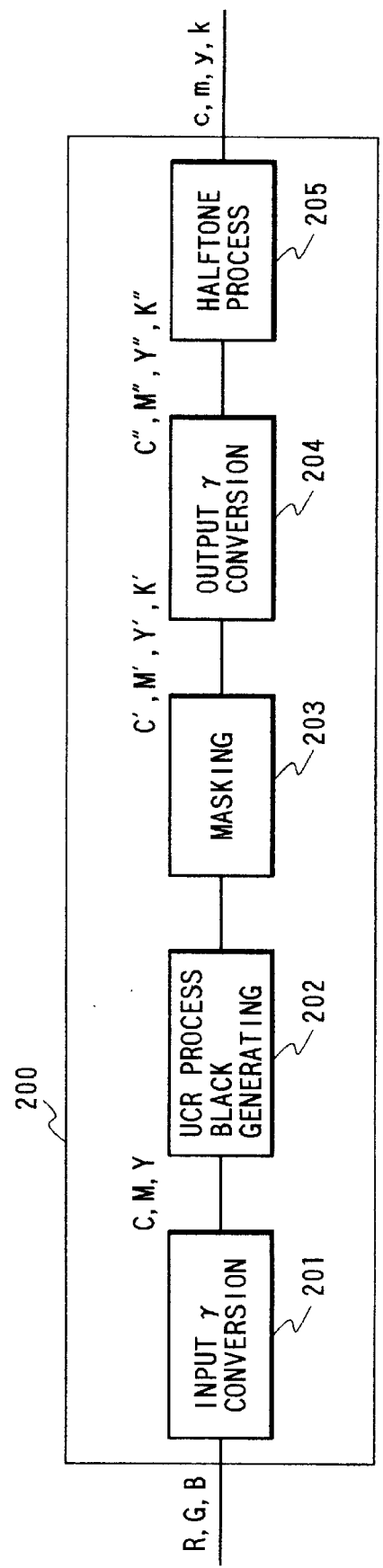
FIG. 2 is a block diagram showing the image processing in an embodiment of the present invention.

At first there will be explained the image processing function for outputting image data to be printed, in the recording apparatus. As shown in a block diagram in FIG. 2, the image processing function 200 is composed of following five components:

1) input gamma conversion 201;
2) UCR (undercolor removal) and black generation 202;
3) masking 203;
4) output gamma conversion 204; and
5) halftone process 205.

Figure 3:
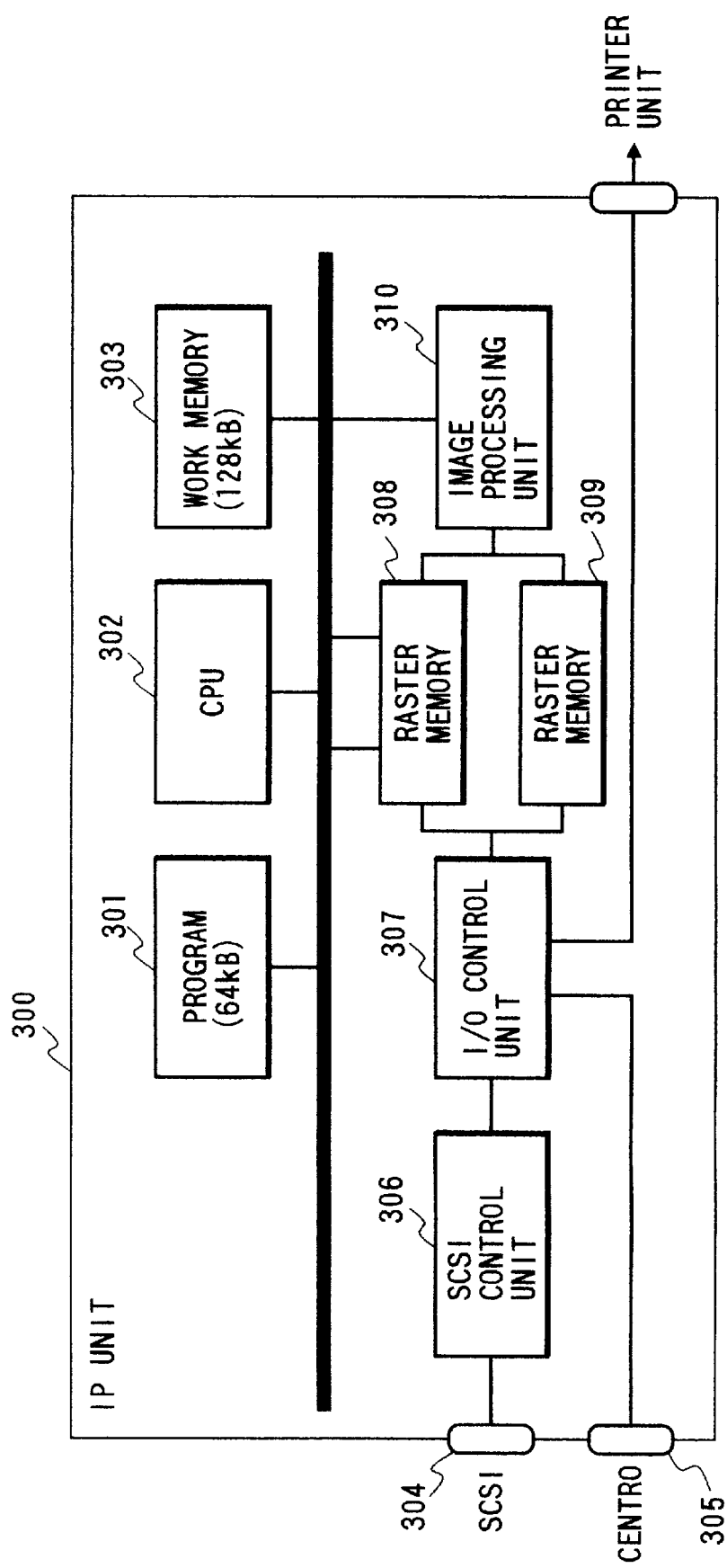
FIG. 3 is a block diagram showing the configuration in a printer embodying the present invention.

In addition to such image processing function, there may be provided a function for enlarging the image data. FIG. 3 is a block diagram showing the entire configuration of the present embodiment, which is provided as shown in FIG. 3, with two input interfaces, namely SCSI 304 and centro 305, for accepting plural input data formats. In addition to the image processing unit 200 mentioned above, there are provided a SCSI control unit 306, an input/output control unit 307, memories 308, 309 of two rasters capable of a toggling operation, a CPU 302 for controlling the foregoing units, a program memory 301, and a work memory 303, which includes an output buffer for storing binarized data obtained in the image processing unit 310.

(1) Input Gamma Conversion

In general, the color image data utilized in computers represent the color by the intensities (light amounts) of R, G and B components, while the recording apparatus represent the same color by the discharge amounts (densities) of cyan (C), magenta (M) and yellow (Y) inks, which are complementary in color to the R, G and B components. Consequently the R, G, B data entered from the computer have to be converted, in a suitable process, into the C, M, Y density data. As the density can be obtained by logarithmic conversion of the reciprocal of the reflectance, the R, G, B (light amount) data are converted into the density data by taking the reciprocals and effecting logarithmic conversion. More specifically, the conversion is executed according to the following equations (1), wherein C, M, Y indicate the density data after conversion:

$$C=-255/a_r \cdot \log(R/255)$$

$$M=-255/a_g \cdot \log(G/255)$$

$$Y=-255/a_b \cdot \log(B/255) \quad (1)$$

Also for reproducing the image on a display, the conversion has to be conducted according to the following equations (1') in order to compensate the non-linearity of the display tube:

$$C=-255/a_r \cdot \log(R^{2.2}/255)$$

$$M=-255/a_g \cdot \log(G^{2.2}/255)$$

$$Y=-255/a_b \cdot \log(B^{2.2}/255) \quad (1')$$

wherein $0 \leq R, G, B, C, M, Y \leq 255$, and $a_r$, $a_g$, $a_b$ are constants.

Figure 4:
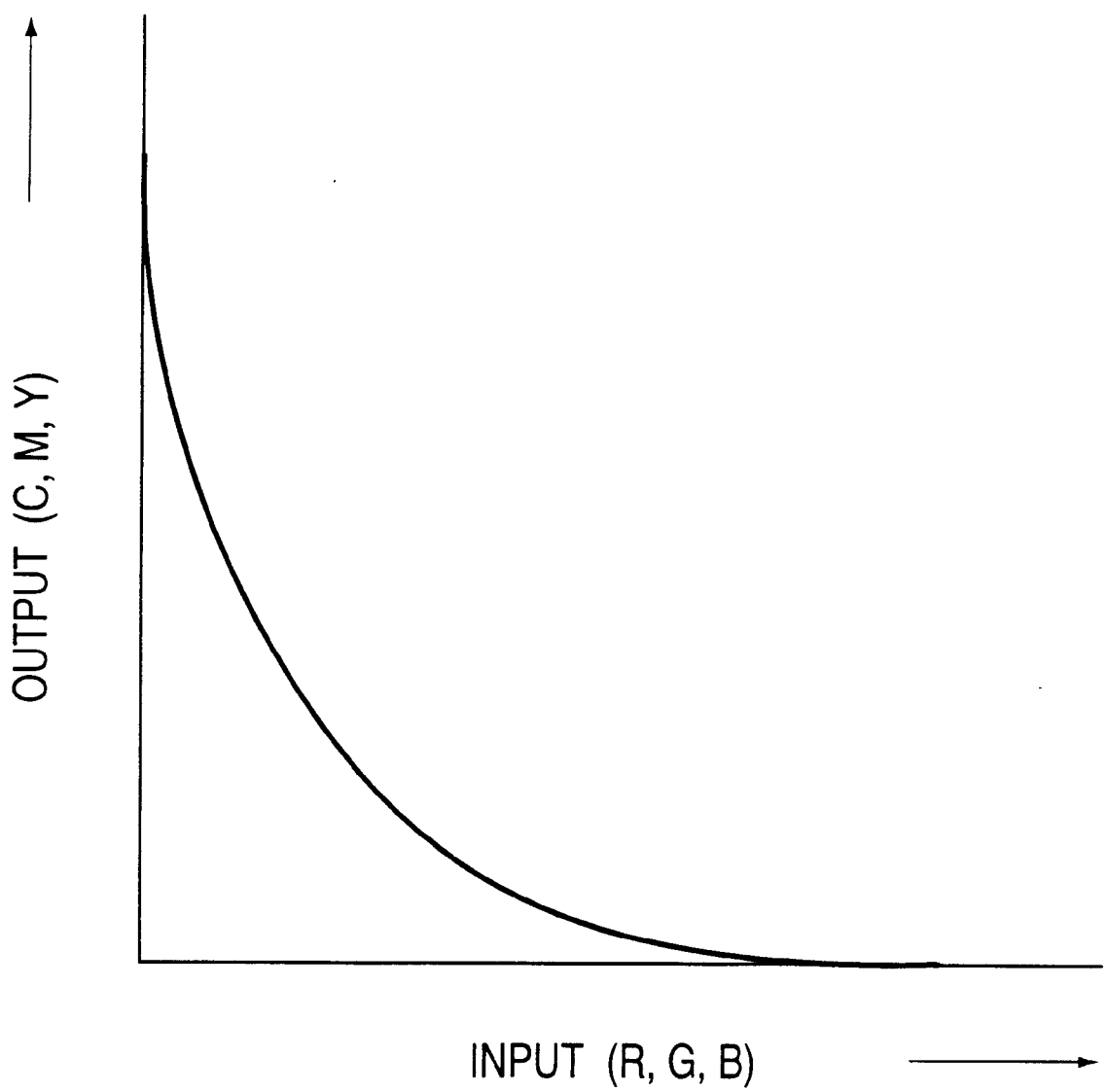
FIG. 4 is a chart showing the (R, G, B)-(C, M, Y) characteristics in the image processing.

In practice, such logarithmic converting function is realized by storing the values calculated according to the equations (1) or (1') in a LUT (look-up table), which releases densities (C, M, Y) corresponding to the inputs (R, G, B) as shown in FIG. 4.

(2) UCR and Black Generation

Figure 5B:
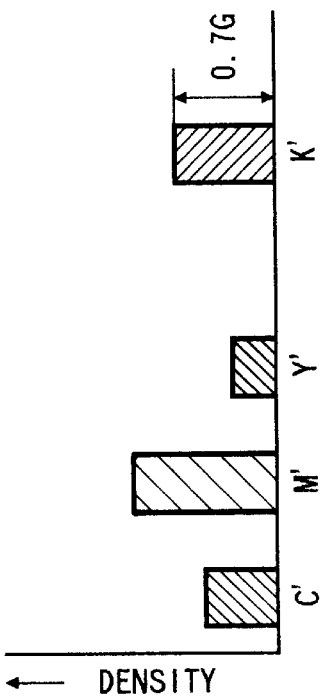
FIGS. 5A and 5B are charts showing a UCR process and a black generating process.
Figure 5A:
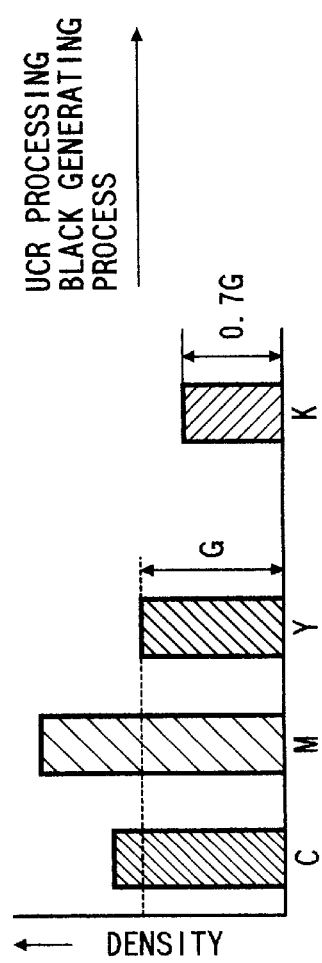

The UCR process is to eliminate from the C, M, Y components, obtained according to the equations (1) or (1'), non-colored components not contributing to the color formation in a certain proportion, while the black generation process is to add a black component (K) in a certain proportion, in order to compensate thus eliminated non-colored components. FIGS. 5A and 5B show the mode of the UCR process and the black generation process. More specifically, FIG. 5A shows the densities of the C, M, Y components obtained by the equations (1) or (1') and the UCR portions (taken as 70% of the smallest density Y in this case), while FIG. 5B shows the densities C', M', Y', K' after the UCR process and the black generation process on the example shown in FIG. 5A. In this example, the amounts of the UCR and the black generation are defined as 70% of the non-colored proportion G, but these amounts are generally determined empirically. The ink densities after the UCR process and the black generation process are represented by the following equations (2):

$$C' \leftarrow C - \alpha_u \cdot \min(C,M,Y)$$

$$M' \leftarrow M - \alpha_u \cdot \min(C,M,Y)$$

$$Y' \leftarrow Y - \alpha_u \cdot \min(C,M,Y)$$

$$K' \leftarrow \alpha_s \cdot \min(C,M,Y) \quad (2)$$

wherein min(C,M,Y) indicates the minimum value of C, M and Y obtained by the equations (1) or (1'), and $\alpha_u$ and $\alpha_s$ are coefficients respectively determining the amounts of UCR and of black generation.

In the color printing, the black ink is employed principally for the following two reasons:

1) to increase the density of the high density area, than that formed with cyan, magenta and yellow inks only; and
2) to decrease the amount of ink ejected onto the recording paper.

(3) Masking

The C, M and Y inks, which are complementary in colors to the R, G and B components, should be ideally such that the C ink absorbs the R light component only, the M ink absorbs the G light component only and the Y ink absorbs the B light component only. The actual inks do not, however, have such ideal absorbing characteristics. For example the C ink absorbs not only the R component but also the G and B components in non-negligible amounts, and other inks likewise absorb the components other than the complementary color components. The masking is to correct such unnecessary absorptions according to the following equations (3):

$$C'=P_{11} \cdot C+P_{12} \cdot M+P_{13} \cdot Y$$

$$M'=P_{21} \cdot C+P_{22} \cdot M+P_{23} \cdot Y$$

$$Y'=P_{31} \cdot C+P_{32} \cdot M+P_{33} \cdot Y \qquad (3)$$

wherein parameters $P_{11}$–$P_{33}$ are so determined as to minimize the difference between the color of the input image represented by R, G and B and the color reproduced by C', M' and Y'.

The following equations (4) show an example of the UCR, black generation and masking employed in the present embodiment:

$$C'=P_{11} \cdot C+P_{12} \cdot M+P_{13} \cdot Y+P_{14} \cdot Bk+P_{15} \cdot Bk^2$$

$$M'=P_{21} \cdot C+P_{22} \cdot M+P_{23} \cdot Y+P_{24} \cdot Bk+P_{25} \cdot Bk^2$$

$$Y'=P_{31} \cdot C+P_{32} \cdot M+Py_{33} \cdot Y+P_{34} \cdot Bk+P_{35} \cdot Bk^2$$

$$K'=P_{41} \cdot C+P_{42} \cdot M+P_{43} \cdot Y+P_{44} \cdot Bk+P_{45} \cdot Bk^2 \qquad (4)$$

wherein Bk=min(C,M,Y). The equations (4) also take a second-order Bk term (Bk2) into consideration. This term has little influence in the highlight area of the image data but becomes more significant in the high density area. Usually the UCR and the black generation are not executed in the highlight area of the image but in the area where the density exceeds a predetermined value. Such effect can be attained by utilizing the above-mentioned term Bk2.

(4) Output Gamma Conversion

The output gamma conversion function is to convert the ink densities C', M', Y' and K' obtained through the UCR, black generation and masking operations explained above, by synthesizing three tables of gradation correction, luminance adjustment and color balance.

Figure 6A:
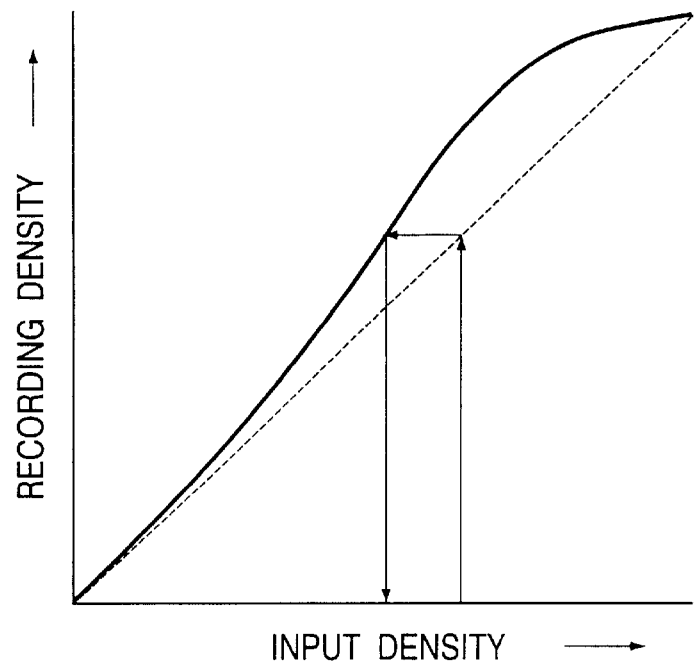
FIGS. 6A and 6B are charts showing the gradation characteristics of the recording density and the correction table characteristics.
Figure 6B:
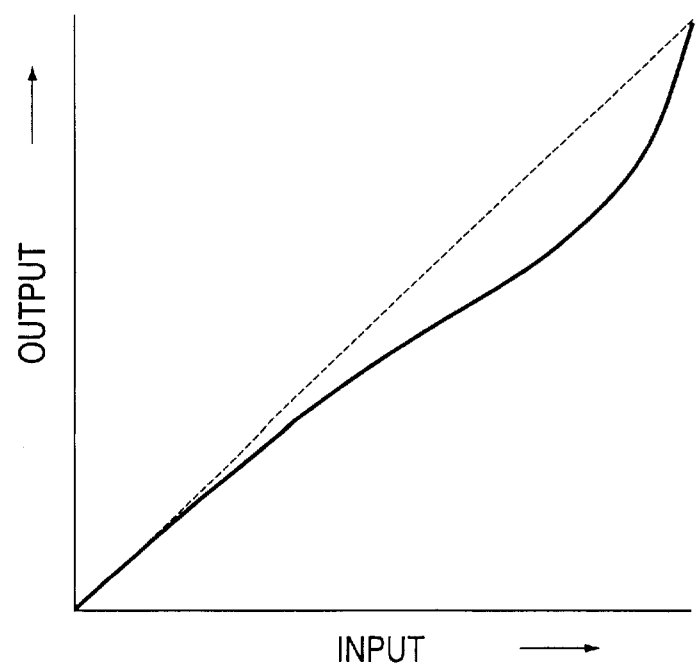

The gradation correction effects correction so as to obtain linear recording density. The gradation characteristics of the recording density are generally dependent on the kind of the ink used, the size of the ink droplet, the kind of the recording paper and the method of the pseudo halftone process. The correction can be achieved in a simple manner by preparing, in advance, a correction table for the input density so as to obtain a linear recording density and to correct each of the ink densities C', M', Y', K' obtained by the above-explained color correcting function with such correction table. Thus corrected ink densities C", M", Y", K" are supplied to the pseudo halftone process. The correction table is prepared for each color. FIG. 6A shows the gradation characteristics of the recording density without the correction, and FIG. 6B shows the correction (conversion) table to be employed in such case.

Figure 7:
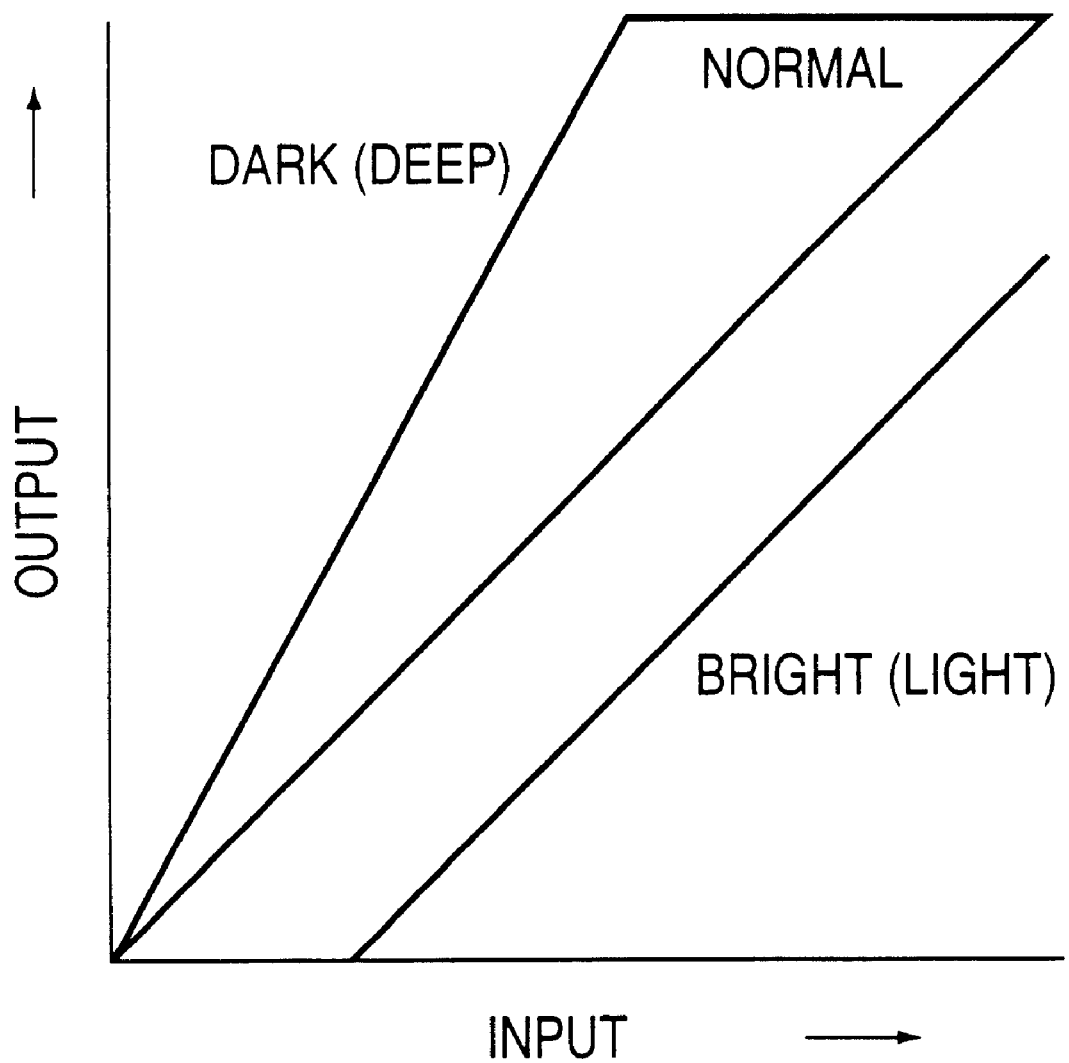
FIG. 7 is a chart showing the recording density adjustment.

The luminance adjustment is to adjust the luminance of the recording density, by converting each ink density uniformly as shown in FIG. 7. The color balancing is achieved by converting the ink density independently for each color.

(5) Halftone Process

The halftone process function executes a pseudo halftone process by representing a gradation image with the number of dots per unit area. Based on multi-value C", M", Y" and K" data, there are generated quantized multi-value c, m, y and k data which constitute the image data actually used for printing in the recording apparatus. Such pseudo halftone process includes, for example, the dither method and the error diffusion method which are already well known. The error diffusion method is popularly used recently, because it can provide excellent gradation characteristics without losing the apparent resolution.

In the following there will be explained an example of the image processing for generating n-bit multi-value data, based on the error diffusion method. It is to be noted, however, that the error diffusion method employed in the present embodiment is merely an example, and there can be conceived various modifications. For example, if the ink used is available in different densities, it is possible to separate the image data for the ink of higher density and that of lower density and to effect the error diffusion process independently for each. Also in such case where the ink is available in plural densities, there may be employed already known various methods for processing the image signal.

(Quantization of n Levels)

Figure 8B:
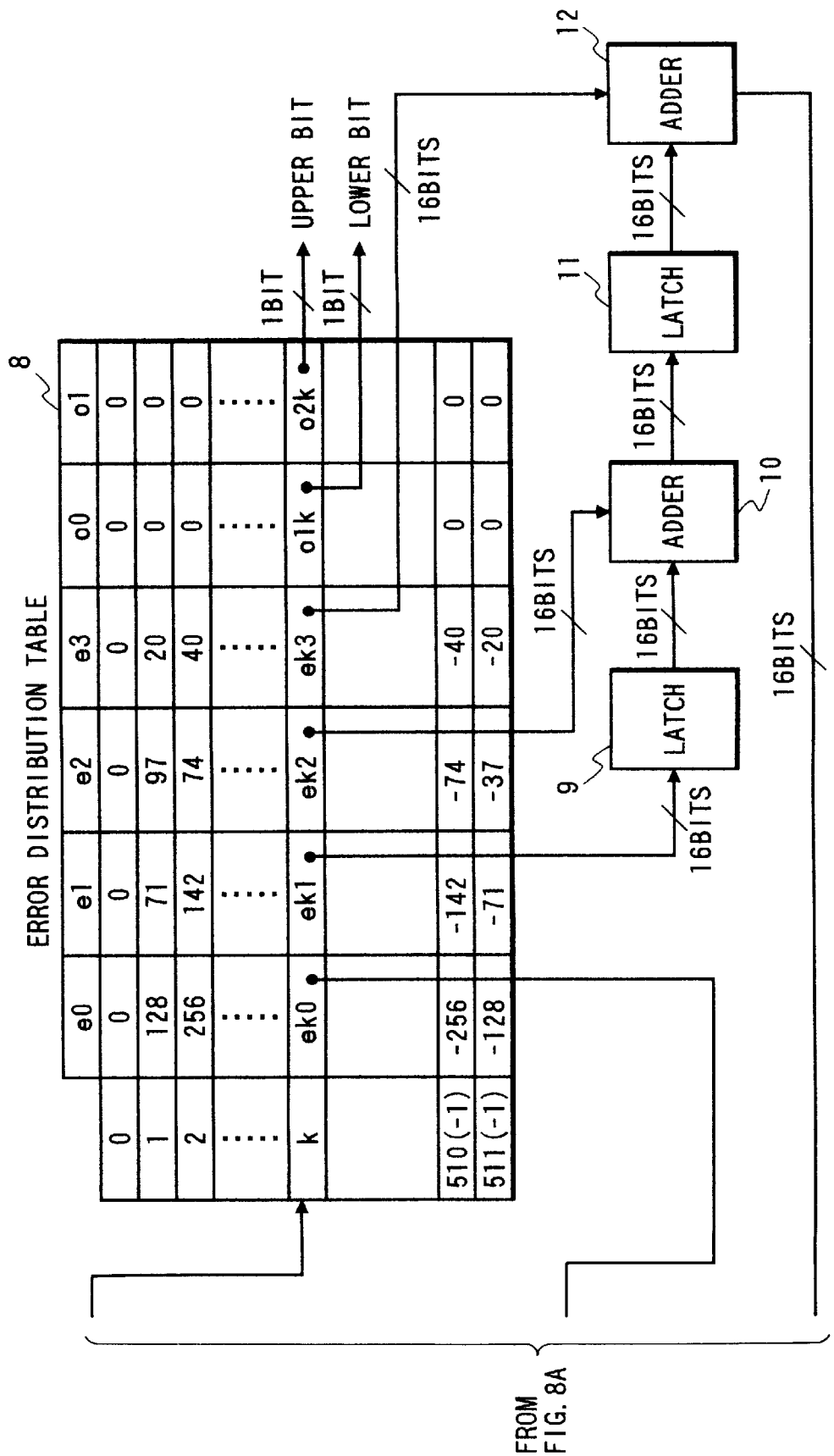
FIG. 8, which is composed of FIGS. 8A and 8B, comprises block diagrams showing the configuration of an image processing apparatus constituting an embodiment of the present invention.

FIGS. 8A and 8B are block diagrams showing an example of the configuration of the image processing apparatus involving n-level quantization. The present embodiment provides an example of pseudo halftone process of representing each pixel with two-bit multi-value information employing 4 dots at maximum, thereby quantizing the input image data into 4 levels. However, this process is also applicable to the case of generating multi-value information of 3 or more bits, thereby quantizing the input image data into 8 values ($2^3$ =8) or more.

Referring to FIGS. 8A and 8B, the input image pixel data, entered from the left-hand side, are 8-bit multi-value image data and are at first supplied to a look-up table (LUT) 1, which compensates the linearity of the output with respect to the input data in the following pseudo halftone process and releases a 16-bit value in response to the 8-bit input value. The LUT 1 also effects multiplication of the denominator of the distribution coefficients used for distributing the errors in the input data (denominator being 256 in case of the distribution coefficients shown in FIG. 10). An adder 2 adds, to the 16-bit data from the LUT 1, the error data from the pixel which has already completed the quantization to 4 levels.

More specifically, the adder 2 adds, to the 16-bit data from the LUT 1, a rounding error (a remnant error generated in the distribution of the error) from a latch 7, an error from the preceding line released from an error buffer 14, and an error from an adjacent pixel at the right or at the left, released from a latch 13.

In the present embodiment, employing the error distribution coefficients as shown in FIG. 10, the denominator of the error distribution coefficients is a power of 2 ($2^8$). The data from the adder 2 is divided by such denominator, and this division is achieved by bit shifts. Within the result of calculation in the adder 2, the upper 9 bits including the sign bit correspond to the quotient in the division of the data from the adder 2 with $2^8$, and the sign bit and the lower 8 bits correspond to the remainder in such division.

The quotient (upper 9 bits from the adder 2) is used as a reference value for referring to the error distribution table 8, while the remainder (lower 8 bits from the adder 2) is entered, as a rounding error less than 1, into a latch 6.

The error distribution table 8 refers to the upper 9 bits released from the adder 2. The latches 6, 7 are used for distributing the rounding error to the pixels other than those indicated by the error distribution table, and such rounding error is entered into the adder 2 again after a delay of two pixels. The quotient, constituted by the upper 9-bit data from the adder 2, is given as a reference value to the error distribution table 8. The error distribution table 8 is a look-up table formed in a RAM (random access memory) or a ROM (read-only memory), and contains, for each value of the quantization error, two-value data corresponding to a predetermined weighting coefficient multiplied by the value of the denominator. The error distribution table 6 contains, as shown in FIG. 9, values corresponding to an error distribution window, wherein each value corresponds to the value of the quantization error, multiplied by the denominator of the error distribution coefficients, and is represented by a 16-bit number.

In the present embodiment, two error distribution windows which are laterally symmetrical as shown in FIG. 9 are switched for every raster according to the direction of processing, but there can be employed only one error distribution table since the error distribution windows are laterally symmetrical. In response to the quotient supplied from the adder, the error distribution table 8 releases four values ek0, ek1, ek2 and ek3, which respectively correspond to the values e0, e1, e2, e3 of the error distribution window shown in FIG. 9. Consequently the output ek0 is entered into a latch 13, and, after a delay of a pixel, is supplied again to the adder 2. The output ek1 is entered into a latch 9, then, after a delay of a pixel, is supplied to an adder 10 and added with the output ek2. The output of the adder 10 is entered into a latch 11, then, after a delay of a pixel, is entered into an adder 12 and added with the output ek3. Then the output of the adder 12 is written into an error buffer 14.

As an example, in case the quotient constituted by the upper 9-bit data from the adder 2 is 1 and the remainder constituted by the lower 8-bit data is 50, error data of 128 is distributed to e0, 71 to e1, 37 to e2 and 20 to e3, while error data of 50 is distributed to a pixel at the right of e0.

In the present embodiment, the error is written into a second pixel to the left or right of the object pixel, depending on the direction of quantization, and such direction of quantization is switched for every raster. More specifically, the circuit shown in FIGS. 8A and 8B switches a process from left to right and a process from right to left, for every line of the input data. Such switching is achieved by changing the position of storage of the error data from the adder 12 into the error buffer 14, and such control is executed by an unrepresented control circuit. Such zigzag process, by switching the processing direction for every line, prevents the generation of a specific stripe pattern, encountered in the conventional error diffusion method.

The error distribution table 8 stores in advance the data after the quantization process and releases values o0 and o1, respectively corresponding to the multi-value data of the lower and upper bits, according to the quotient constituted by the upper 9 bits released from the adder.

The above-explained procedure executes the pseudo halftone process for an input data. Thus the pseudo halftone process for entire image can be realized by repeating the above-explained procedure with successive displacement of the position of processing by a pixel in the direction of processing.

Figure 12:
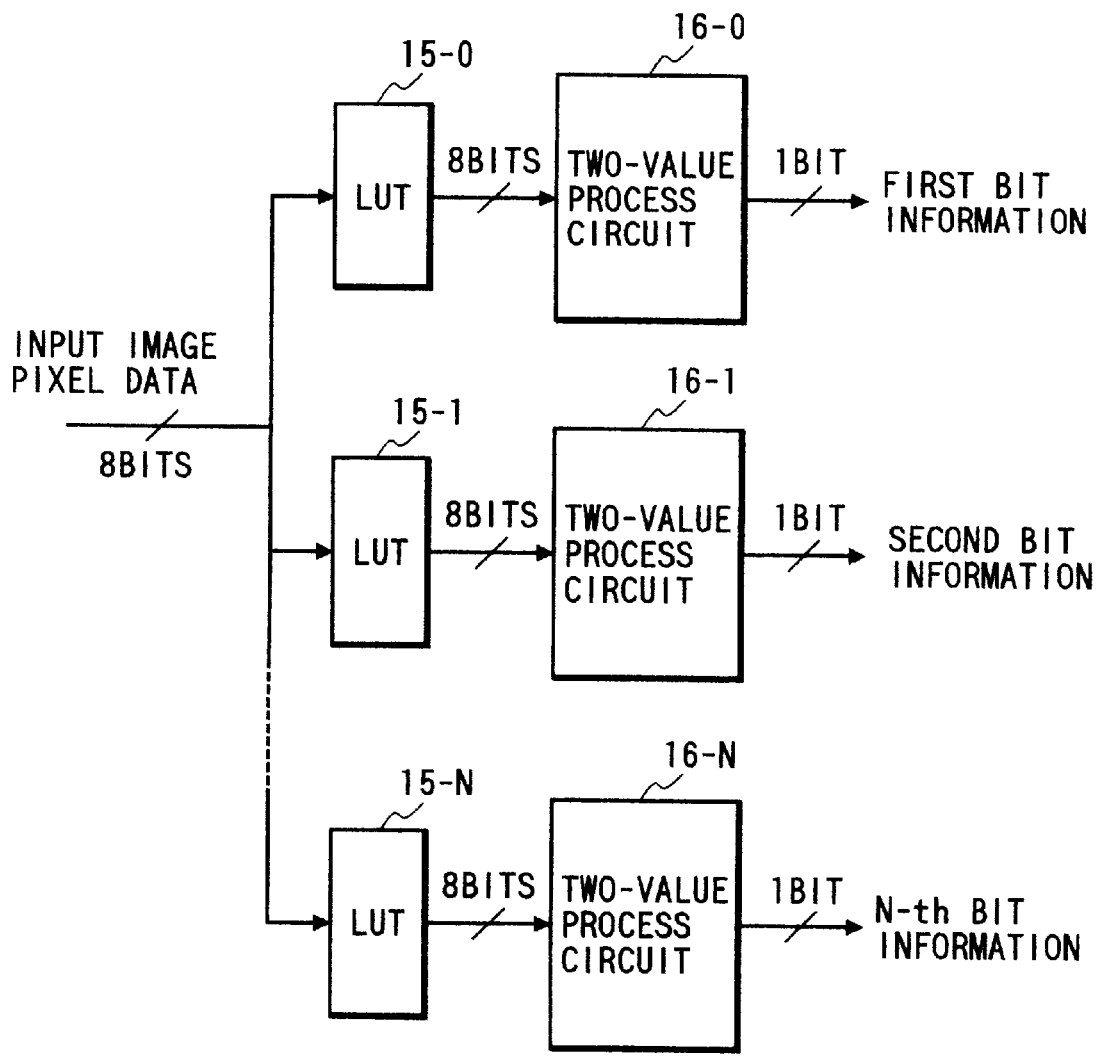
FIG. 12 is a schematic view showing the correspondence with the conventional plural recording dots.

FIG. 11 shows the details of the error distribution table. The quantization of the input data into at least 4 levels by the error diffusion method can be achieved with a simple circuit configuration, without the quantizing process for each level as shown in FIG. 12, since the results of quantization are stored in advance in the table.

The lower 8-bit data from the adder 2 in the present embodiment assume one of the values 0–255, but, since the LUT 1 effects multiplication of 256 on the input data, the 8-bit remainder data corresponding to the input 8-bit data (0–255) assume values 0–255/256, smaller than 1. Thus the value of the rounding error can be made and smaller and there can be improved the image quality particularly in the highlight area of the image.

As explained in the foregoing, the binarization errors obtained by multiplying the weighting coefficients with the denominator and the quantized data of at least 4 levels are calculated in advance and stored in the tables, so that there can be dispensed with the multiplier and the divider for each weighting coefficient and a high speed processing is rendered possible with a reduced magnitude of circuitry. Also the sum of the density of the input pixel and the errors distributed from the surrounding pixels is calculated to select an error value stored in the table for distribution in the surrounding pixels and the remainder is also distributed in the surrounding pixels, whereby the weighting coefficients can be given flexibility. Also the rounding error can be maintained within a range from 0 to 1, thereby enabling improvement in the image quality, including the highlight area.

In the above-explained embodiment, the input image pixel data are 8-bit multi-value image data, but there may also be employed multi-value data of 4, 12, 16 bits etc. Also in the present embodiment, the error distribution window is composed of 4 pixels, but there may naturally be employed a larger or smaller window. Also the output multi-value data are composed of 2-bit data, but the present embodiment can be easily adapted to the recording with multi-value data corresponding to a larger number of gradation levels, merely by expanding the error distribution table. Consequently it is adaptable to various multi-value recording methods such as recording with multiple droplets, recording with inks of a same hue with different densities or recording with discharge amount modulation employing dots of different discharge amounts, by the simple expansion of the error distribution table. Furthermore, though the present embodiment merely defines the 8-bit multi-value image data, there can be naturally provided a color image processing apparatus capable of receiving color multi-value image data of N bits for each of R, G and B components.

As explained in the foregoing, the present embodiment stores, for each value of density information, a calculated binarization error obtained by multiplying a predetermined weighting coefficient with the denominator value in a table, and dividing the sum of the density of the object pixel and the errors distributed from the surrounding pixels with the denominator of the weighting coefficient, by bit shifts, to obtain the remainder, thereby maintaining the rounding error within a range from 0 to 1. Also there is provided means for distributing such rounding error outside the weighted surrounding pixels, whereby it is rendered possible to dispense with the multiplier and the divider for each weighting coefficient while giving flexibility thereto, thus enabling high-speed processing with a reduced magnitude of circuitry and achieving improvement of the image quality in the highlight area.

In the foregoing embodiment, the 4-level quantization has been explained by the error diffusion method, but it can also be realized by the dither method such as Fatting method or Bayer method. Also in case of utilizing inks of different densities, the dither process may be applied to each of such inks.

(Flow of Image Information)

In the following the entire flow of the image information will be explained with reference to FIG. 13. At first multi-value image data 1310 are separated, by recording element separating means 1311, into the multi-value data of each recording element. Then n-value process means 1312 executes an n-value process for each recording element as explained in the foregoing, thereby effecting conversion into image information of n values per pixel for each recording element. Then encoding means 1313 converts the above-mentioned n-value image information into a code of a command form recognizable in the recording apparatus. The above-explained process is executed in an image processing unit 1301, which may be incorporated in the recording apparatus but is usually realized by the cooperation of a software, called printer driver, of the host computer with a basic software called operation software (OS), on the CPU or RAM of the host computer.

The above-mentioned encoded information is transferred through an interface 1314 to the recording apparatus 1302, which develops thus transferred information in a reception buffer 1315. Then print code analysis means 1316 analyzes the code of the information in the reception buffer, and recording buffer development means 1317 develops the analyzed recording image data on a print buffer 1318 for each recording element. Then recording element drive means 1319 drives a recording device of each recording element based on the information in the print buffer, thereby recording an image on a recording medium. In the configuration of the present invention, the image recording is achieved by analyzing the multi-value image information transferred from the image processing unit and decoding such information into information recognizable by the recording device drive unit of the recording apparatus.

(Configuration of Recording Apparatus)

In the following there will be explained the configuration of the main part of the recording apparatus.

Figure 14:
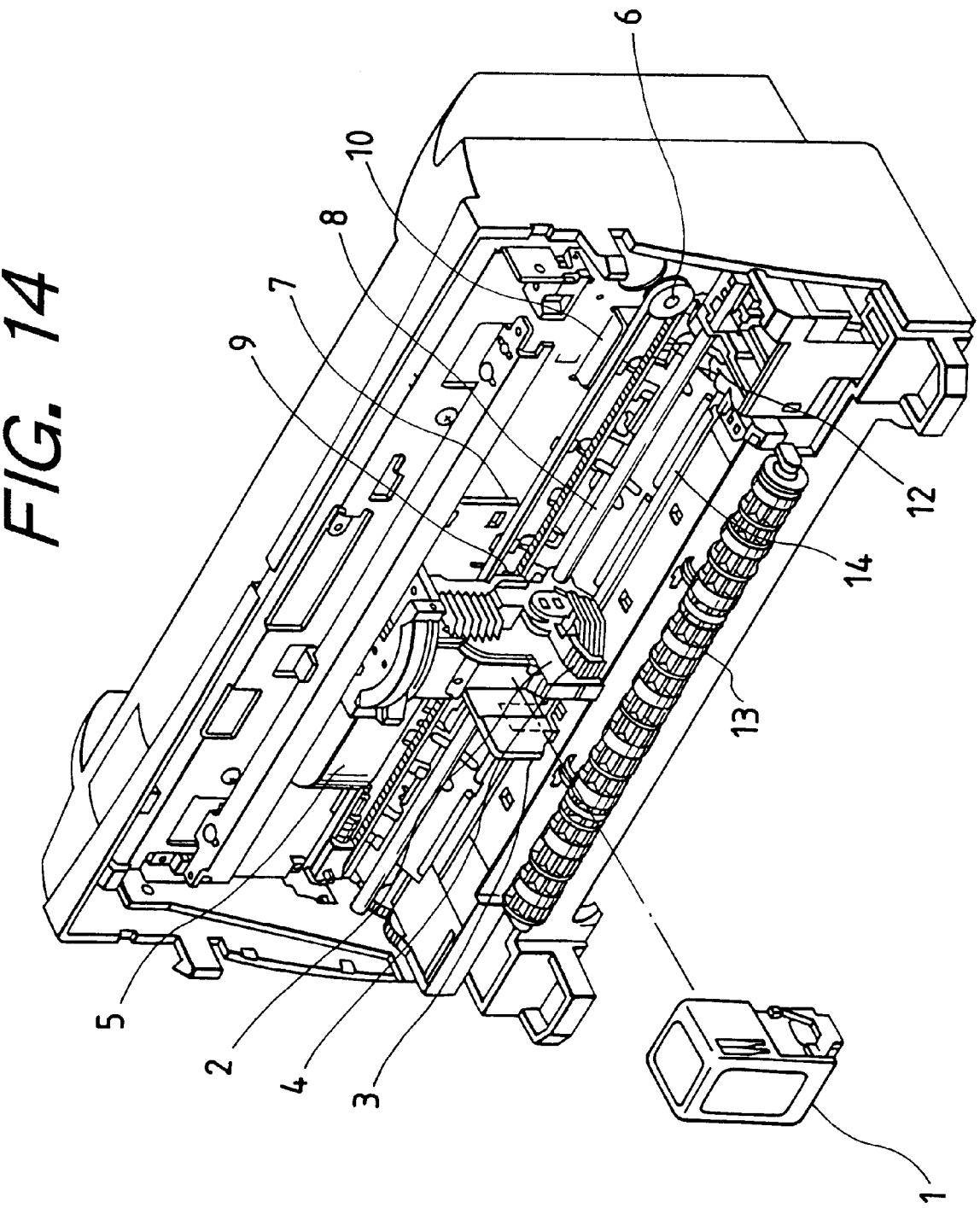
FIG. 14 is a perspective view showing the recording unit in an ink jet recording apparatus constituting an embodiment of the present invention.

FIG. 14 illustrates the mechanical configuration of a recording apparatus with interchangeable cartridge, suitable for use in the present invention. In FIG. 14, a front cover is removed to expose the internal structure. There are shown an interchangeable ink jet cartridge 1; a carriage unit 2 for supporting the ink jet cartridge 1; and a holder 3 for fixing the ink jet cartridge 1. The holder 3 is linked with a cartridge fixing lever 4 and is adapted to press, by the movement thereof, the cartridge to the carriage unit 2 after the cartridge 1 is mounted therein, thereby fixing the position thereof and forming an electrical contact therefor. There are also provided a flexible cable 5 for transmitting electrical signals to the carriage unit 2; a carriage motor 6 for causing reciprocating motion of the carriage unit 2 in the main scanning direction; a carriage belt 7 driven by the carriage motor 6 thereby moving the carriage unit 2; a guide shaft 8 supporting the carriage unit 2; a home position sensor 9 consisting of a photocoupler for determining the home position of the carriage unit 2; a light shield plate 10 for detecting the home position; and a home position unit 12 including a recovery system for the recording head. The recovery unit includes a capping unit for preventing the drying of the ink discharge openings of the recording head, a pump unit for effecting a sucking operation for removing the smear on the ink discharge openings and in the interior of the recording head, a wiping unit for removing the smear on the ink discharge openings, and a used ink process unit for effecting a preliminary ink discharge in the course of the recording operation. There are further provided a sheet discharge roller 13 for discharging the recording medium from the recording apparatus, in cooperation with a spur wheel unit (not shown), and a line feed unit 14 for transporting the recording medium by a predetermined amount in the sub scanning direction.

FIG. 15 is a detailed view of the ink jet cartridge employed in the present invention.

There are shown an interchangeable Bk ink tank 15; an interchangeable ink tank 16 for C, M and Y inks; ink tank connecting portions 17 adapted to be coupled with the ink jet cartridge 1 for ink supply thereto; and a similar ink tank connection portion 18. The connecting portions 17, 18 are to be connected to ink supply tubes 20 for ink supply to a recording head 21. An electrical signal contact portion 19 is connected with the flexible cable 5 shown in FIGS. 1A and 1B, for transmitting signals to the recording head.

Figure 16B:
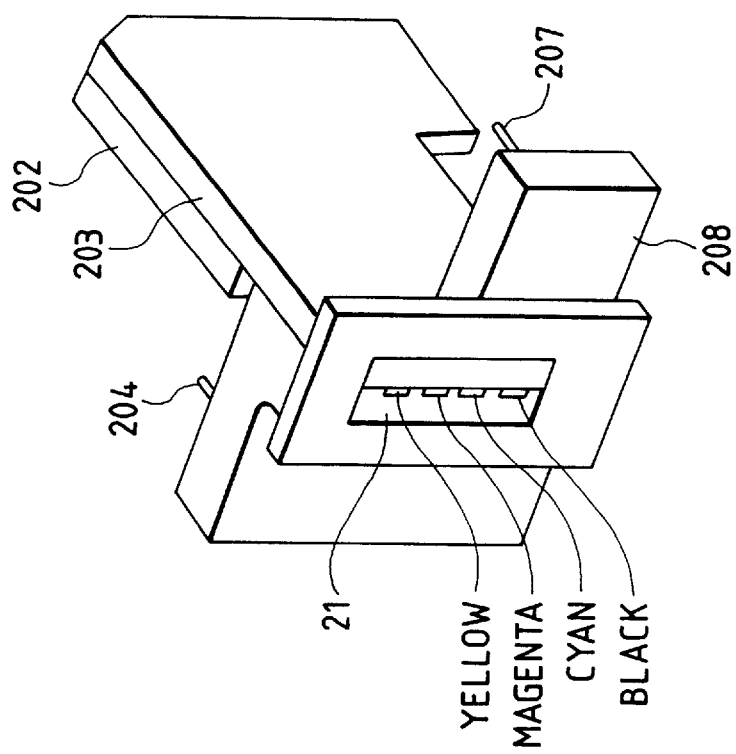
FIGS. 16A and 16B are perspective views showing the configuration of a recording head to be employed in the ink jet recording apparatus embodying the present invention.
Figure 16A:
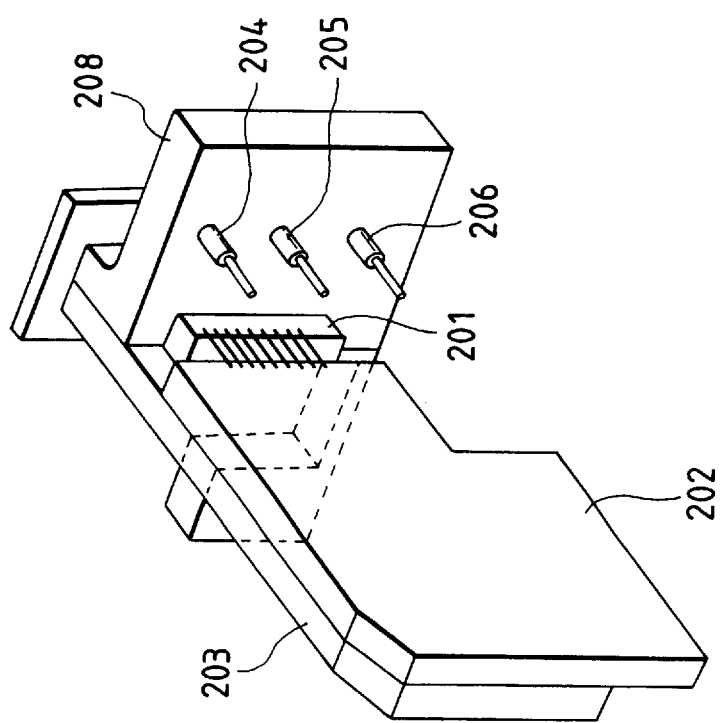

In the following there will be given a detailed explanation on the recording head in such ink jet cartridge. FIGS. 16A and 16B illustrate the recording head portion of the ink jet cartridge. On the front face of the recording head, there are linearly arranged groups of the discharge openings for yellow, magenta, cyan and black inks. In these groups, there are formed 24 discharge openings for each of yellow, magenta and cyan colors and 64 openings for black color, and the groups of different colors are mutually separated by a distance larger than the pitch of the discharge openings.

Each discharge opening is provided with an ink path communicating therewith, and, behind such ink paths there is provided a common liquid chamber for ink supply to the ink paths. In the ink path corresponding to each discharge opening there are provided an electrothermal converting member for generating thermal energy utilized for causing the discharge of ink droplet, and electrode wirings for electric power supply to the converting member. The electrothermal converting members and the wirings are formed by a film forming process on a substrate 201 for example of silicon. The discharge openings, ink paths and common liquid chamber mentioned above are formed by placing partitions, a cover plate etc. of a resinous or glass material on the substrate. Further in the back, there is provided a driving circuit in the form of a printed circuit board, for driving the above-mentioned electrothermal converting members according to the recording signals.

The above-explained configuration may be obtained by laminating the substrate with a grooved cover plate (orifice plate) provided thereon with partitions for defining the plural ink paths and a common liquid chamber, instead of the glass member mentioned above. Such grooved cover plate is formed by integral molding and is preferably composed of polysulfone resin, but other molding resins may also be employed.

The silicon substrate 201 and the printed circuit board 202 are provided parallel to an aluminum plate 203. Pipes 204–207, protruding from a plastic member 208, called distributor and spreading perpendicularly to the silicon substrate, communicate with liquid paths therein, which communicate with the common liquid chambers.

The distributor contains therein four liquid paths, respectively for yellow, magenta, cyan and black inks, connecting the respectively common liquid chambers and the above-mentioned pipes.

The present embodiment employs a configuration allowing independent ink tank replacement for the color inks and for the black ink, but there may also be employed a disposable recording head in which the ink tanks and the recording head are integrally constructed.

Each of the discharge openings for yellow, magenta and cyan inks provided on the recording head 102 discharges ink of about 40 ng, while that for black ink discharges ink of about 80 ng.

Examples of the compositions of the ordinary inks are shown in the following:

1. Y (yellow)

| | |
|---|---|
| C.I. Direct Yellow 86 | 3% |
| diethyleneglycol | 10% |
| isopropyl alcohol | 2% |
| urea | 5% |
| acetylenol EH (Kawaken Chemical) | 1% |
| Water | 79% |

2. M (magenta)

| | |
|---|---|
| C.I. Acid Red 289 | 3% |
| diethyleneglycol | 10% |
| isopropyl alcohol | 2% |
| urea | 5% |
| acetylenol EH (Kawaken Chemical) | 1% |
| Water | 79% |

3. C (cyan)

| | |
|---|---|
| C.I. Direct Blue 199 | 3% |
| diethyleneglycol | 10% |
| isopropyl alcohol | 2% |
| urea | 5% |
| acetylenol EH (Kawaken Chemical) | 1% |
| Water | 79% |

4. Bk (black)

| | |
|---|---|
| C.I. Direct Black 154 | 3% |
| diethyleneglycol | 10% |
| isopropyl alcohol | 2% |
| urea | 5% |
| Water | 80% |

In contrast to the black ink, the C, M or Y ink contains 1% amount of acetylenol EH for improving the permeability. These inks may further contain surfactants, alcohols etc. as additives.

It is also possible to reduce the dye concentration in each ink composition, for example, to adopt 3% for Y without change but to adopt a dilution to ⅓ or 1% for M and C and a dilution to ½ or 1.5% for Bk. In such case the total amount of deposited dye can be maintained substantially same by increasing the ink amount ejected onto the recording medium. It is therefore possible to select plural levels of the number of ejections of the ink of a color, and such number of ejections corresponds to the number of gradation levels. Thus there can be achieved multi-value recording utilizing the number of ejections of the ink of a same color.

Figure 17:
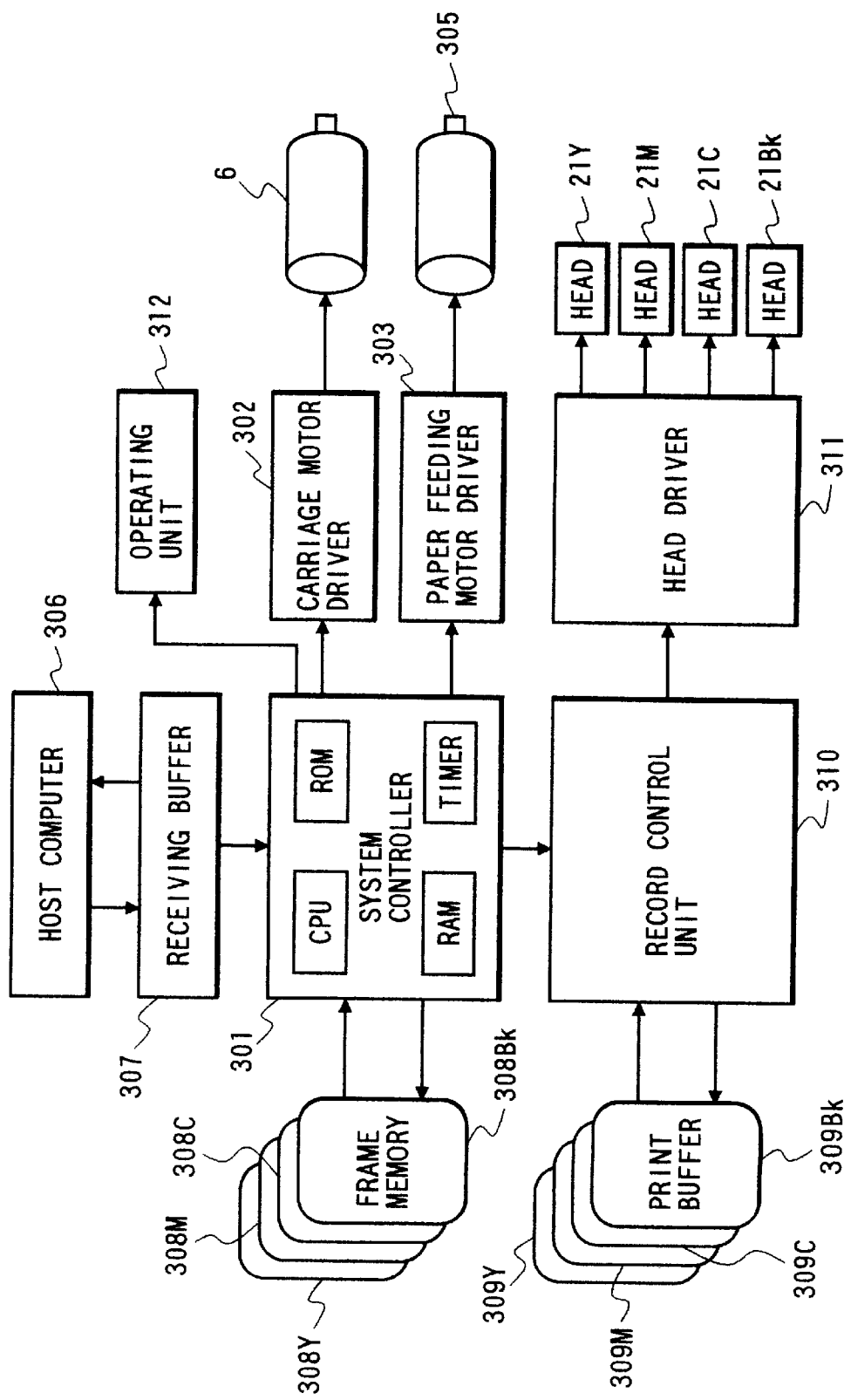
FIG. 17 is a block diagram showing the configuration of a recording system employing the ink jet recording apparatus embodying the present invention.

FIG. 17 is a block diagram of the electric control system of the ink jet recording apparatus explained above.

A system controller 301 for controlling the entire apparatus is provided therein with a microprocessor, a memory device (ROM) storing control programs, and a memory device (RAM) to be used by the microprocessor in the process execution.

Drivers 302, 303 drive the recording head respectively in the main and sub scanning directions, and motors 304, 305 respectively corresponding to the drivers 302, 303 function according to the information on the velocity and the moving distance received therefrom.

A host computer 306 serves to transfer the print information to the printing apparatus of the present invention.

A reception buffer 307 temporarily stores the data from the host computer 306, until data are read from the system controller 301.

A frame memory 308 is provided for developing the print data into image data, and has a memory size required for printing. In the present embodiment it is assumed to have a capacity corresponding to a printing sheet, but the present invention is not limited by the size of the frame memory.

A memory device 309 temporarily stores the print data, and has a memory capacity which is dependent on the number of nozzles of the recording head.

A recording control unit 310 suitably controls the discharge speed, the number of print data etc. of the recording head, according to commands from the system controller.

A head driver 311 for driving recording heads 102Y, 102M, 102C, 102Bk are controlled by the signals from the recording control unit 310.

Figure 18B:
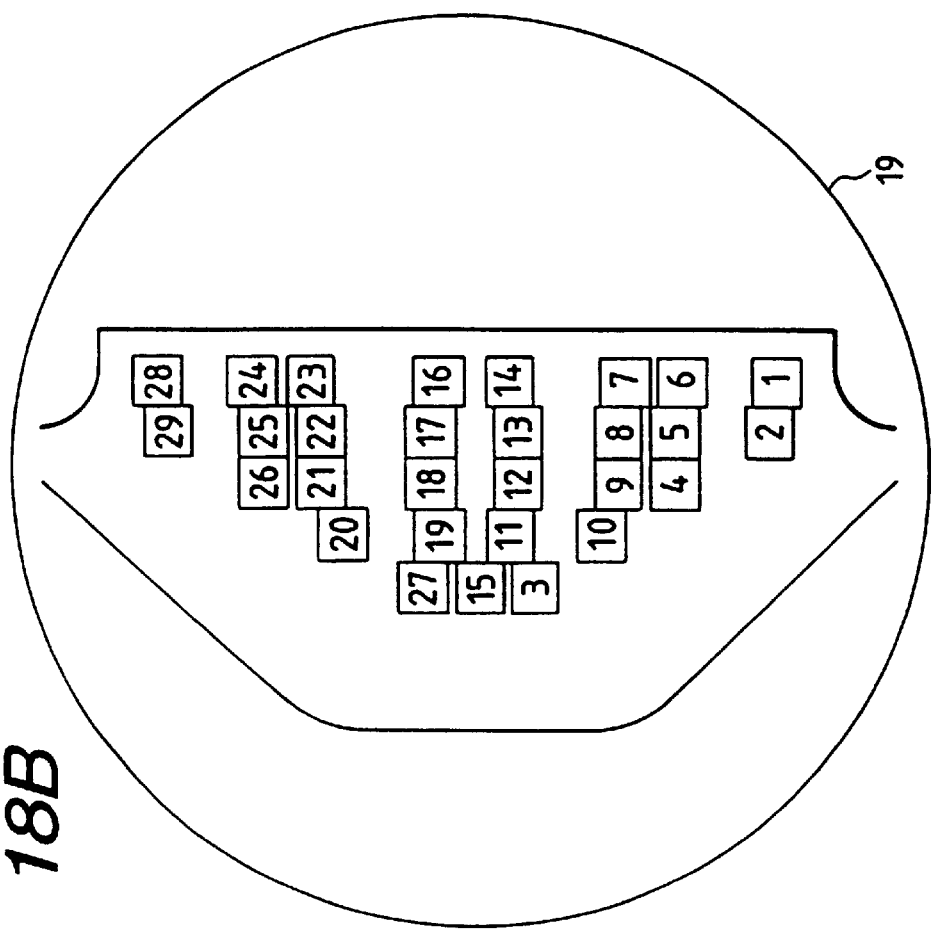
FIG. 18A is a perspective view showing a contact portion of the recording head embodying the present invention and FIG. 18B is an enlargement of a section thereof.
Figure 18A:
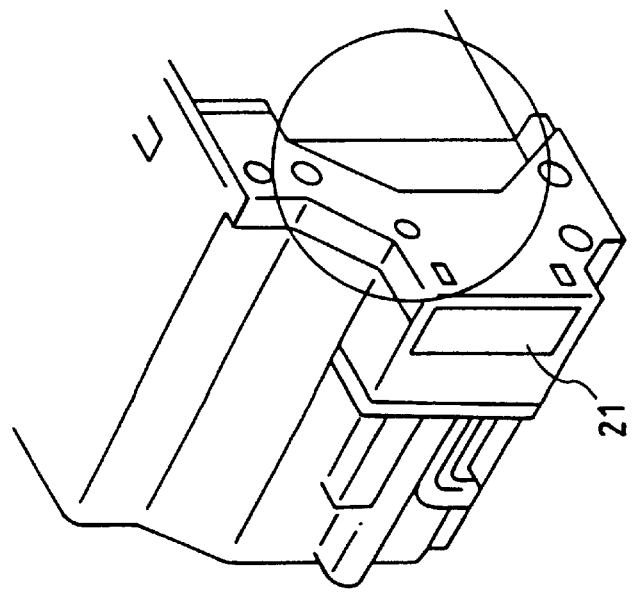

FIG. 18A is a detailed view of the contact portion 19 of the ink jet cartridge 1 and FIG. 18B is an enlargement of a portion thereof. The signals for the ink discharge and the ID signal for identifying the cartridge are communicated with the recording apparatus through the contact portion 19. The recording head can be identified by the ID signal of the contact portion.

(Detection of Recording Head)

Figure 19:
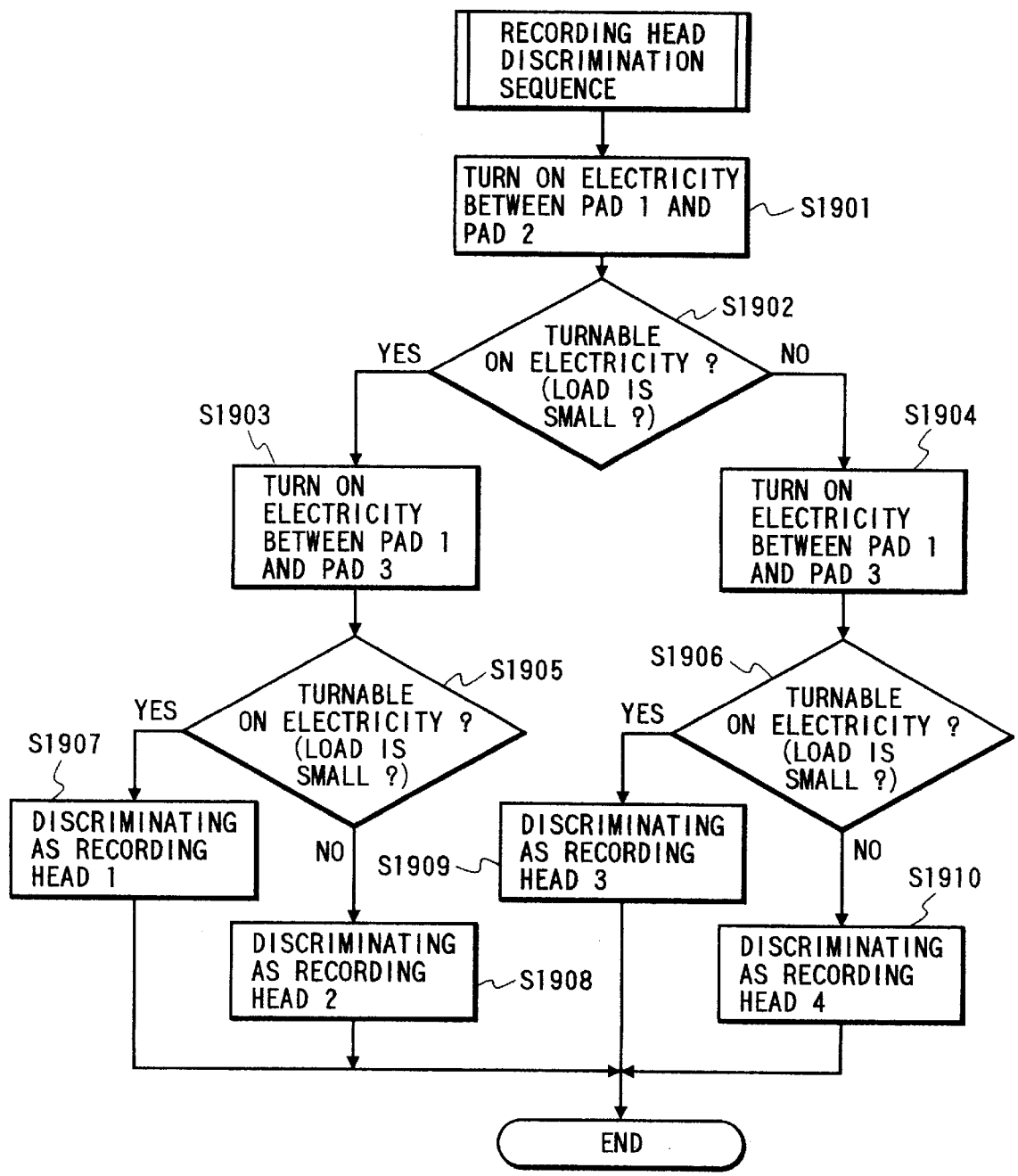
FIG. 19 is a flow chart showing a process for identifying the recording head embodying the present invention.

FIG. 19 is a flow chart showing a process for identifying the recording head by the ID signal of the contact portion. There are utilized three electrode pads of the contact portion, in which an electrode pad 1 is continuously connected, and the recording head can be identified by the states of electrode pads 2 and 3.

At first a step S1901 applies a voltage between the electrode pads 1 and 2, and a step S1902 discriminates whether a current flows therebetween, by judging whether resistance under the voltage application is in the order of several megaohms (insulated state) or several ohms (conductive state).

If a current flow is identified in the step S1902, a step S1903 applies a voltage between the electrode pads 1 and 3, and a step S1905 discriminates whether a current flows therebetween. If a current flow is identified, the sequence proceeds to a step S1907, which identifies "a recording head 1", because all the electrode pads are in a mutually conductive state. If the step S1905 identifies that the electrode pads 1 and 3 are mutually non-conductive, the sequence proceeds to a step S1908 to identify "a recording head 2" because of the insulated state of the electrode pad 3 only.

On the other hand, if the step S1902 identifies that the electrode pads 1 and 2 are in a mutually non-conductive state, the sequence proceeds to a step S1904 to apply a voltage between the electrode pads 1 and 3 as in the step S1903, and a step S1906 discriminates whether a current flows therebetween. If the electrode pads 1 and 3 are in a mutually conductive state, the sequence proceeds to a step S1909 to identify "a recording head 3" because of the insulated state of the electrode pad 2 only. If the step S1906 identifies that the electrode pads 1 and 3 are in a mutually non-conductive state, a step S1910 identifies "a recording head 4" because of the insulated state of both the electrode pads 2 and 3. The mounted recording head can thus be identified by the current flow states of the contact portion.

The present embodiment utilizes three electrode pads, but the number of the electrode pads may be increased for distinguishing a larger number of the recording heads.

Such identification in the present invention may also be achieved by other methods, for example by providing the recording head with a ROM storing ID information and reading such information from the ROM. The present invention is not limited by such method of identification.

[Embodiment 1 for Handling Multi-value Data]

In the following there will be explained handling of multi-value data in the present embodiment, from the generation and decoding of multi-value image information to the decoding thereof and the image recording.

In the present embodiment, the multi-value data per pixel in the image processing unit of the host computer are composed of 8-bit (256 values) data for each recording element. At first the image processing unit of the host computer generates, for each color component, multi-value data according to the n-value process explained in the foregoing. In the following there will be explained, as an example, multi-value data for representing 4 gradation levels with 2-bit data.

Then the 2-bit data a re transferred through an interface. The 2-bit data obtained after the multi-value value process are represented in a binary number "0" or "1". Consequently such data are identical in the format with the ordinary binary data, except that the size is doubled. Consequently the recording apparatus is require d to judge whether such 2-bit data are generated by a multi-value process or by a binarization process.

Figure 20:
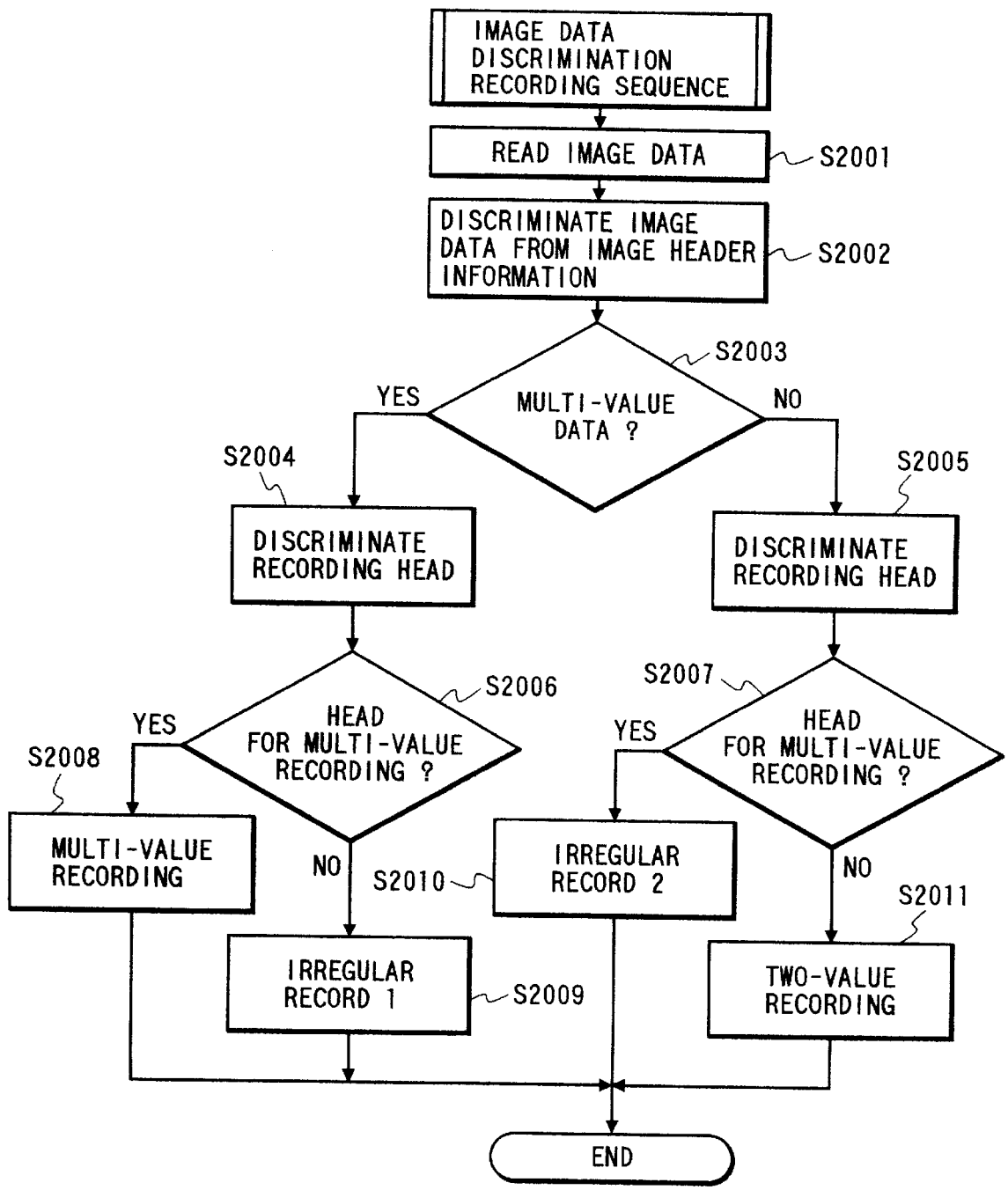
FIG. 20 is a flow chart showing a process for setting the recording method by identifying image data of an embodiment 1 of the present invention.

FIG. 20 shows a sequence for identifying the image data and executing appropriate recording for such image, for realizing the present invention. This sequence inspects image header information attached to the image data, thereby identifying the nature of the ensuing data. It also identifies the recording head to be used, and executes recording by selecting appropriate recording means by a ppropriately matching the image data and the recording head.

At first a step S2001 fetches the image data transferred from the host computer into the reception buffer of the recording apparatus. Then a step S2002 identifies, based on the image header information attached to the image data, the nature of the transferred image data. The image header information is generally attached at the starting portion of the image data and consists of information on the image such as image size, image format, image resolution etc., and information on the recording method such as printing method, sheet feeding method etc. Such image header information is generated at the image processing for example in the printer driver, and the conditions of image generation are also included in the information. The image format information can include information indicating whether the image data are two-value data or multi-value data and the number of such values, and the image data are identified by such information.

Then a step S2003 discriminates whether the transferred image data are obtained by a multi-value process or a two-value process. In the former case, the sequence proceeds to a step S2004 for identifying the mounted recording head, according to the head identifying sequence shown in FIG. 19. Then a step S2006 discriminates whether the mounted recording head is for multi-value recording or for two-value (binary) recording. In the former case, the sequence proceeds to a step S2008. In this case, the transferred image data are multi-value data and the mounted recording head is that for multi-value recording, providing a proper combination. Thus a multi-value recording method is selected to execute the multi-value recording. On the other hand, if the step S2006 identifies a two-value recording head, the sequence proceeds to a step S2009. In this case the transferred image data are multi-value data while the mounted recording head is that for two-value recording, corresponding to an irregular combination, so that there is selected an irregular recording 1 to execute the irregular recording.

In case the step S2003 identifies that the transferred image data are not the multi-value data but the two-value data, the sequence proceeds to a step S2005 to identify the mounted recording head, according to the head identifying sequence shown in FIG. 19. Then a step S2007 discriminates whether the mounted recording head is for multi-value recording or for two-value (binary) recording. The multi-value recording head is designed to discharge ink of inferior color developing ability, and to provide a required density, in case of a high density, by superposing plural dots.

In case a multi-value recording head is identified, the sequence proceeds to a step S2010. In this case the transferred image data are two-value data while the mounted recording head is that for multi-value recording, corresponding to an irregular combination, so that there is selected an irregular recording 2 to execute the irregular recording. In case a two-value recording head is identified in the step S2007, the sequence proceeds to a step S2011. In this case the transferred image data are two-value data while the mounted recording head is that for two-value recording, corresponding to a proper combination, so that there is selected a two-value recording to execute the two-value recording. As explained in the foregoing, the appropriate recording method can be selected by the combination of the image data and the recording head. It is therefore rendered possible, in a same recording apparatus, to select the recording method for the multi-value processed image data and the two-value processed image data, according to the format of the transferred image data.

In the following there will be explained the recording methods, including the irregular recordings.

(1) Multi-value Recording Method

In the following there will be explained the details of the multi-value recording, taking an example of recording two-bit multi-value data.

FIGS. 21A and 21B respectively show examples of recording dots for the multi-value recording in which a pixel is represented by 2-bit image data and recording dots of binary recording. In the multi-value recording, 2-bit data (00) provide no recording dot. Data (01) provide one recording dot, while data (10) provide two recording dots, and data (11) provide three dots.

The lower bit and the upper bit of the data have different meanings. The lower bit indicates whether a dot is to be recorded, while the upper bit indicates whether a 2-dot recording is to be executed. Therefore, the two-bit data (11) can provide 3 recording dots because of such difference in the meaning of the bits.

In this manner four gradation levels can be represented by the number of recording dots, according to the 2-bit data per pixel.

Now let us consider another example of the multi-value recording. In this case, 2-bit data (00) provide no recording dot. Data (01) provide one recording dot, while data (10) provide two recording dots, and data (11) provide four dots. In this manner four gradation levels can likewise be represented by the number of recording dots, according to the 2-bit data per pixel. In this case, in the 2-bit data (11), both the upper and lower bits indicate whether or not to execute 2-dot recording. On the other hand, in the data (01) providing only one recording dot, the lower bit indicates whether or not to execute 1-dot recording. Consequently the lower bit may have different meanings. In this manner four gradation levels can be represented by the number of the recording dots.

The dot information for the actual recording is generated from the 2-bit multi-value information explained above, by record data analyzing means to be explained later.

In the two-value (binary) recording, 2-bit data (00) provide no recording dot. Data (01) provide one recording dot, while data (10) provide one recording dot, and data (11) provide two dots. Since data (01) and (10) provide a same number of recording dots, there can be produced only three gradation levels, instead of four gradation levels that should be attainable with the 2-bit data. This is because each bit corresponds to one dot, so that the multi-value recording is more efficient in terms of the amount of data transfer.

In the following there will be explained the actual image recording operation in the multi-value recording, at first in case of recording with a single scanning operation.

Figure 13:
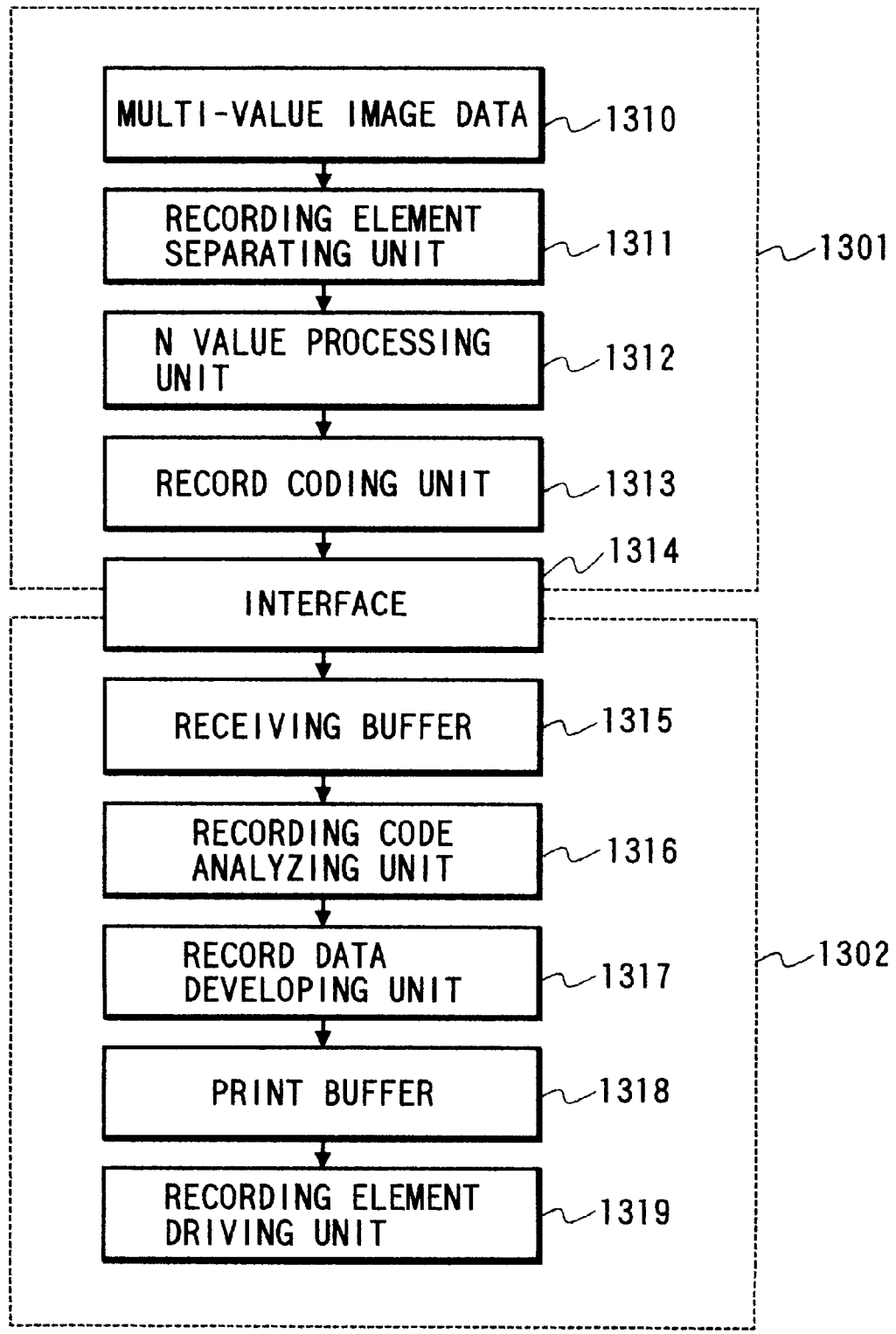
FIG. 13 is a flow chart showing the flow of image information.

The flow of the image data is same as shown in FIG. 13. The print code of the multi-value data developed on the reception buffer is analyzed, and the recording buffer development means develops the recording data on the print buffer. The recording head, or the recording devices of the respective recording elements, are driven according to the information in the print buffer to form an image on the recording medium.

Now the print code analyzing means, or the function of decoding the multi-value information, will be explained with reference to FIG. 22. At first the multi-value processed 2-bit data 2201 are entered in the print code analyzing means 2202, which decodes the multi-value information while referring to the multi-value table stored in a shift register 2203, and develops the output 2204 as the recording data on the print buffer. In the present recording method, the print buffer has a capacity of 3 columns for a pixel, in order to enable multi-value recording.

FIG. 23 shows an example of the multi-value table, stored in the register and constituting a conversion table for generating 3-bit binary information from 2-bit multi-value information.

Figure 22:
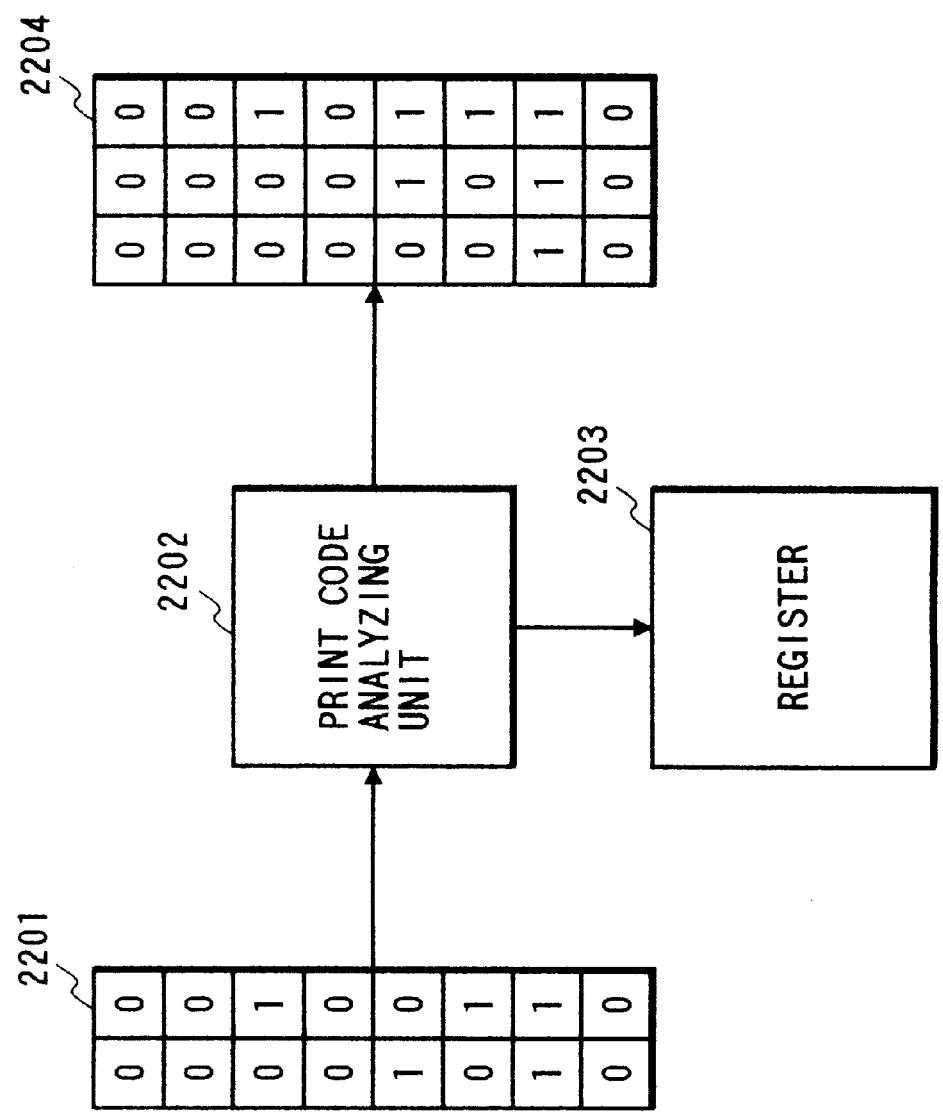
FIG. 22 is a block diagram showing an example of the print data analysis means in the embodiment 1 of the present invention.

FIG. 24 shows another example of the print code analyzing means, which is identical in configuration with that shown in FIG. 22 but is different in the multi-value table as shown in FIG. 25, wherein two outputs 2404, 2405 are developed on the print buffer. In this recording method, the print buffer has a capacity of 2 columns for a pixel, thereby enabling multi-value recording. In this case, the data developed on the print buffer are recorded in first and second scanning motions. The multi-value recording is achieved by separating the data development on the print buffer in two operations and completing the recording with two scanning motions.

In the following there will be explained the recording method with the data developed on the print buffer.

The example shown in FIG. 22 records the dots of triple amount for a pixel. Consequently, for completing the recording in a scanning operation, there is employed a tripled driving frequency, in comparison with the ordinary driving method. Otherwise, the recording may be completed in three scanning operations.

The example shown in FIG. 24 records the dots of four times for a pixel, in two or more recording operations. Consequently, for completing the recording in two scanning operations, there is employed a doubled driving frequency, in comparison with the ordinary driving method. The two scanning operations may be conducted bidirectionally, in the forward and reverse directions. Also the recording operations may be divided into three or more operations. Otherwise, the recording may be completed in three scanning operations.

As explained in the foregoing, the multi-value recording is attained by utilizing the print data analyzing means for decoding the multi-value information and selecting the capacity of the print buffer, the number of recording scan operations and the driving frequency accordingly.

(2) Irregular Recording 1

This is the case where the multi-value image data are transferred but the multi-value recording head is not mounted. The mounted recording head is for the ordinary binary recording, with a print buffer for binary recording. The data decoded by the print data analyzing means have a triple data amount, for example in case of FIG. 22. Consequently, the recording in this state provides an image extended three times in the scanning direction, and the image data not recordable on the recording medium are discarded in the recording apparatus. Such result allows the user to recognize that the recording has been executed in a wrong combination. It is also possible, in the step S2006 in FIG. 20, to display an error message indicating the improper combination of the image data and the recording head, thereby requesting the interruption of the recording operation to the user.

(3) Irregular Recording 2

This is the case where the non-multi-value image data are transferred while the multi-value recording head is mounted. The mounted recording head is for the multi-value recording, with a print buffer for multi-value recording. The print data analyzing means cannot be used since the transferred image data are binary data. For example, in case of a multi-value recording head capable of recording dots of a triple amount, there are provided a print buffer of triple capacity, so that there is provided an image reduced to ⅓ in the scanning direction. Such result allows the user to recognize that the recording has been executed in a wrong combination. It is also possible, in the step S2006 in FIG. 20, to display an error message indicating the improper combination of the image data and the recording head, thereby requesting the interruption of the recording operation to the user.

Also in such improper recording, there may be employed a skipping mask or the like at the recording operation for reducing the number of recorded dots, in order to suppress the wasted ink consumption.

(4) Binary Recording Method

This is the case where the non-multi-value image data are transferred and the multi-value recording head is not mounted. Namely this is the combination of the ordinary binary image data and the binary recording head, so that the ordinary binary recording is conducted.

As explained in the foregoing, the multi-value recording is achieved by identifying the multi-value image data from the header information of the image data transferred from the image processing means generating the multi-value information, also identifying the multi-value recording head mounted in the recording apparatus, and utilizing the print data analyzing means for decoding the n-bit data to generate the image data of $2^n$ gradation levels.

In this manner there is enabled formation of a $2^n$-value image that can be represented by n-bit data, while at the same time achieving the suppression of the amount of transferred and processed image information and the realization of higher tonal rendition intended in the present invention, thereby providing high-quality multi-value recording in the dot matrix recording system suitable for personal use.

FIG. 26 shows the number of gradation levels in the conventional recording method and the recording method of the present invention, for a same data amount. For example, for representing 4 gradation levels, the conventional recording method requires 3 bits while the recording method of the present invention only requires 2 bits. Also for representing 8 gradation levels, the conventional recording method requires 7 bits while the recording method of the present invention only requires 3 bits. Thus the recording method of the present invention minimizes the data amount required per pixel, even for a large number of gradation levels.

[Embodiment 2]

In the following there will be explained a second embodiment in which the multi-value table is varied for each recording mode, for setting a multi-value table matching each recording mode.

At first there will be explained a case with two recording modes, namely a 1-pass recording method in which the recording of an image area is completed by a single recording scan and a 3-pass recording method in which the recording of an image area is completed by three recording scans. FIG. 27 shows an example of the multi-value table corresponding to the recording modes for 2-bit data. In the 1-pass recording method, since an image area is recorded by a single recording scan, there may result, with an increase in the number of recording dots, image defects such as a jointing streak at the boundary between the recording scans, resulting from the order of ink ejections. Therefore, in such 1-pass recording, in order to limit the number of the recording dots, image data (011) are released corresponding to 2-bit data (11). On the other hand, such image defects do not occur in the 3-pass recording method, because each image area is recorded by 3 recording scans. Consequently image data (111) are released corresponding to 2-bit data (11).

In the following there is explained a case with recording modes for high speed recording, ordinary recording and high quality recording, namely the recording mode is distinguished by the image quality.

FIG. 28 shows an example of the multi-value table corresponding to the recording modes for 2-bit data. In the high speed recording, giving emphasis on the recording speed, 1-bit data are outputted from the 2-bit data. In the ordinary recording mode, 2-bit output data are provided in order to achieve the reasonable speed in combination with the reasonable tonal rendition. In this case the gradation is secured up to 3 levels. In the high quality recording giving emphasis to the gradation, 3-bit data are generated to represent 4 gradation levels. Also the configuration of the print buffer and the method of use thereof are varied according to the released data amount, namely according to the recording mode. The present embodiment can adopt the image data identifying sequence shown in FIG. 20, and the recording apparatus can identify the recording mode by the header information, which contains the recording mode.

The print data analysis matching the recording mode can be achieved by varying, as explained in the foregoing, the multi-value table according to the recording mode.

In this manner there is enabled multi-value recording matching different recording modes, thereby realizing high-quality multi-value recording in the dot matrix recording system suitable for personal use.

[Embodiment 3]

In the following there will be explained a third embodiment in which the multi-value table is varied according to the recording medium, for selecting a multi-value table matching each recording medium.

At first there will be explained a case for selecting three recording media. FIG. 29 shows an example of the multi-value table corresponding to the recording media for 2-bit data. A medium A is easily blotted and cannot accept a large number of recording dots, so that there is selected the recording with 1 dot at maximum. A medium B has a higher ink absorption amount, so that 3 recording dots at maximum are accepted for a dot, thereby representing 4 gradation levels. A medium C has no blotting tendency but tends to cause beading with an increased ink amount, so that 2 dots at maximum per pixel are selected to achieve 3 gradation levels without the image defect.

FIG. 30 shows an example of the multi-value table for 2-bit data corresponding to the recording media, in case of varying the output data amount according to the recording medium. The number of recording dots for each recording medium is same as that in FIG. 29, but the amount of the output image data or the data amount developed on the print buffer is different. For example, for the medium A, 1-bit image data only is released per pixel. Consequently the configuration of the print buffer is varied according to the recording medium. The present embodiment can adopt the image data identifying sequence shown in FIG. 20, and the recording apparatus can identify the recording medium by the header information, which contains the setting of the recording medium.

The print data analysis matching the recording medium can be achieved by varying, as explained in the foregoing, the multi-value table according to the recording medium.

In this manner there is enabled multi-value recording matching different recording media, thereby realizing high-quality multi-value recording in the dot matrix recording system suitable for personal use.

[Embodiment 4]

In the following there will be explained an embodiment of the irregular recording 2 explained in the embodiment 1.

Figure 31:
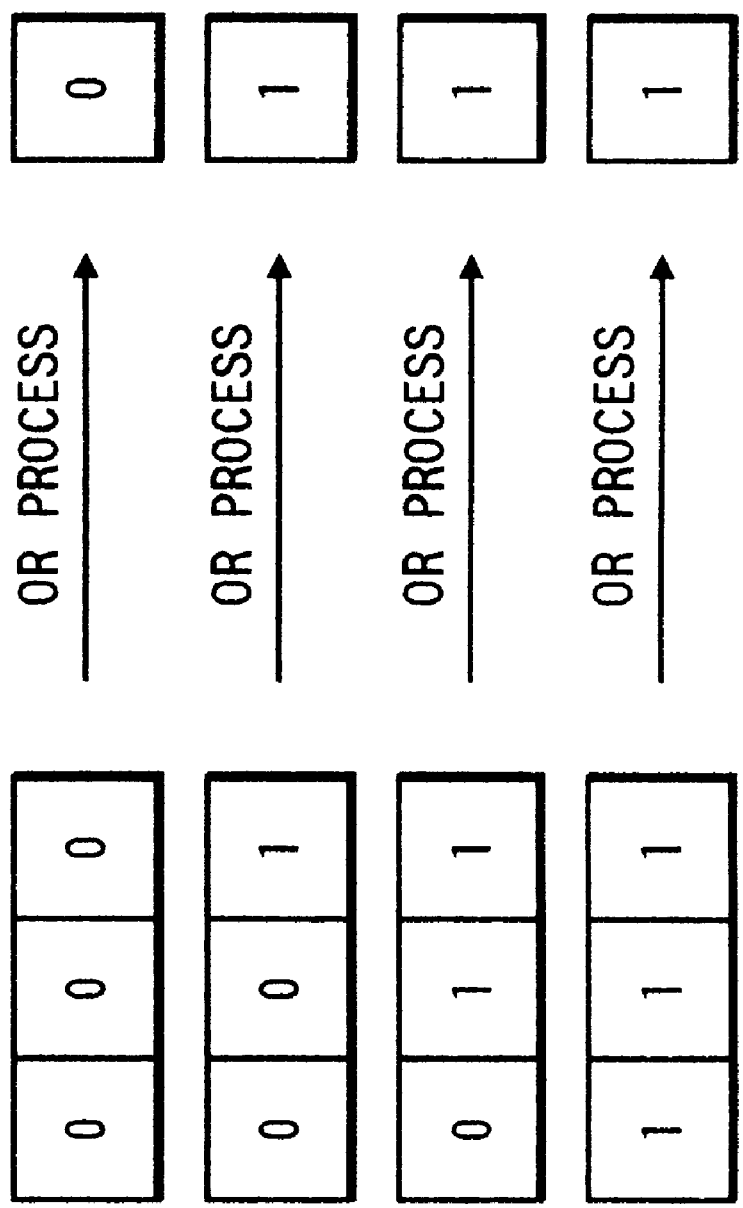
FIG. 31 is a view showing an OR process in an irregular recording method in another embodiment of the present invention.

In case image data not subjected to the multi-value process are transferred but a multi-value recording head is mounted, there is executed a compression and a skipped recording. For example, in case of the multi-value recording head capable of recording the dots of triple amount and provided with the print buffer of a triple amount, the recording is executed with data skipping to ⅓ in combination with compression. FIG. 31 shows an example of skipped recording method for the data developed in 3 bits. This embodiment does not execute the skipped recording with a skipping mask, but generates image data by OR data of the transferred 3-bit image data. Thus data (1) is always recorded except for (000). Consequently the lack of image data can be avoided even in the skipped recording. In case of the skipping recording with a skipping mask, there may result the lack of coordination between the skipping mask and the image data. More specifically, since such skipping employs an AND process between the skipping and the image data, the output after the skipping operation may become all 0. In such case there is given no recording at all, so that the user is unable to judge whether the situation is an irregular recording, a defect in the recording head etc., a trouble in the image data transfer or a trouble in the recording apparatus itself.

As explained in the foregoing, the present embodiment prevents such lack of image data, thereby securely causing the user to recognize the irregular recording state.

[Embodiment 5]

In the following there will be explained another embodiment of the present invention, effectively utilizing the feature that a large number of gradation levels can be represented by a reduced data amount per pixel and achieving halftone recording with interchangeable ink tanks or ink cartridges containing coloring materials (inks) of "a same hue but different luminocities". The coloring materials having such feature are assumed, in the following description, to be inks with different dye concentrations. Before going into the detailed explanation, there will at first be explained the features of the present embodiment.

(1) In response to a change in the ink dye concentration by the interchange of the cartridge, at least either of the ink ejection amount and the maximum ink ejection amount is varied according to the combination of the dye concentrations, by identification of ID information or by a separate data entry. There is provided means for varying the amount of the coloring material to be ejected onto the recording medium or the maximum value thereof.

(2) In a further improved embodiment, in case of using a color material with a relatively low dye concentration, the maximum ejection amount of the coloring material is not simply in proportion to the ratio of the dye concentration, but is determined for each of n-th order color components, by effecting color separation into primary color components and secondary color components for each pixel. Also in such determination, the maximum ejection amounts are not simply increased but are independently increased with limitation in the ejection amount, up to the maximum amounts respectively defined to each of n-th order color. In this manner it is rendered possible, even with the coloring materials of relatively low dye concentrations and even for the primary color and the secondary color, to obtain a reflective optical density substantially equal to that obtainable with the coloring materials of relatively high dye concentrations, while limiting the increase in the ejected ink amounts and reducing the running cost.

(3) With respect to the output from the color processing module such as the printer driver, the recording data for each color can be switched as binary data or multi-value data, according to the dye concentration of the coloring material to be used in recording. Also there is provided a function for outputting multi-value data of high-resolution data in a mode requiring higher tonal rendition.

In the following the present embodiment will be explained in detail, with reference to the attached drawings.

Figure 32:
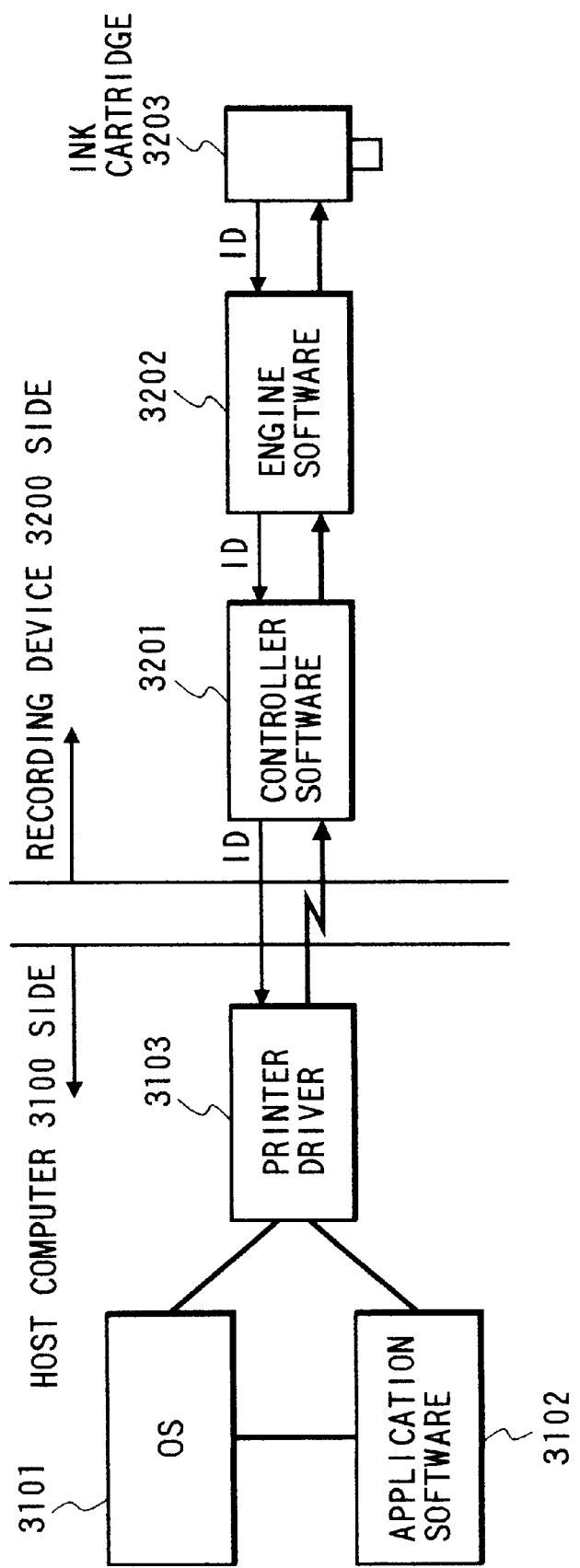
FIG. 32 is a block diagram showing the entire configuration of a recording system, including a host computer and a recording apparatus, constituting another embodiment of the present invention.

FIG. 32 is a view showing the functional configuration of a recording system of the present embodiment including a host computer 3100 and a recording apparatus (ink jet printer) 3200.

In the host computer 3100, various data are exchanged and controlled between an OS (operating system) 3101 and an application software 3102 functioning thereon, thereby providing recording data capable of representing a large number of gradation levels with a limited data amount, as already explained in the foregoing embodiments 1 to 4. Such data are processed among the OS 3101, the application software 3102 and a printer driver 3103, and are transmitted therethrough to the recording apparatus 3200. Such printer driver 3103 is stored in a recording medium in a form readable by the host computer.

In the following there will be explained the data flow in case printing a color image with the recording apparatus 3200, utilizing an application software 3102 capable of handling a pictorial image.

In case of a pictorial image, the image data prepared and edited on the application software 3102 are transferred, in the form of multi-value RGB signals, to the printer driver 3103. On the multi-value RGB signals received from the application software 3102, the printer driver 3103 executes a color process and a halftone process and converts such signals normally into binary C (cyan), M (magenta), Y (yellow) and K (black) signals, which are supplied to an interface of the host computer 3100 to the recording apparatus 3200 or an interface to a filing memory device.

In the present embodiment, the signals are supplied through the interface to the recording apparatus 3200 for sending data to a controller software 3201 thereof, in order to check the recording mode and the matching with an ink cartridge 3203. Subsequently the data are transferred to an engine software 3202, which receives such data in the recording mode and the data structure designated by the controller software 3201 and converts the recording data into discharge pulses for supply to the ink cartridge (recording head) 3203. In response the ink cartridge 3203 discharges the coloring materials to form a record. On the other hand, the ID information or the ink tank ID information of the ink jet cartridge 3203 is supplied to the engine software 3202, and the memory assignment and various optimization are executed according to such information of the ink jet cartridge 3203. Also such information is sent to a controller unit and is used, with reference to the print commands, for decoding the data supplied from the printer driver 3103.

Figure 33:
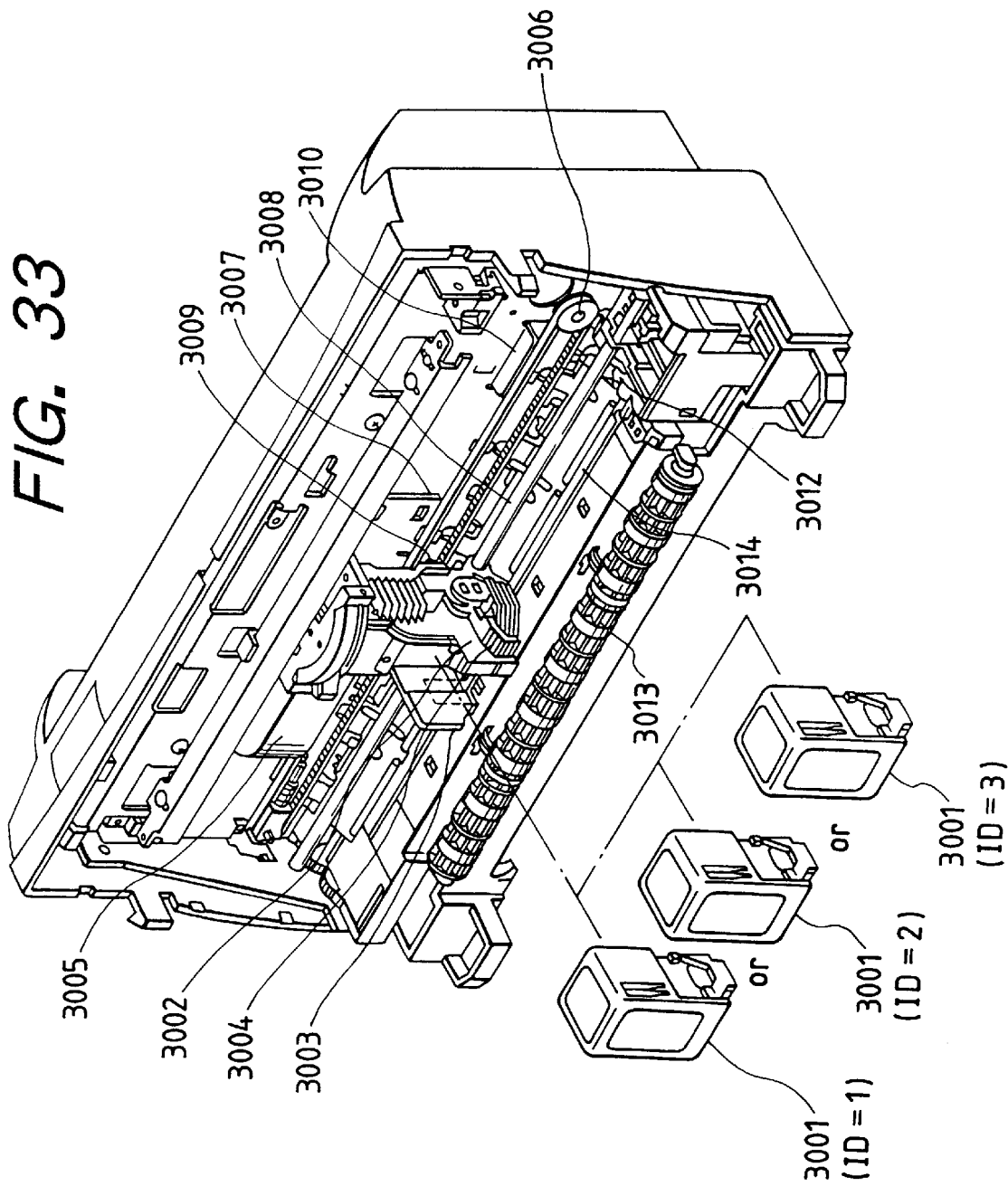
FIG. 33 is a perspective view of an ink jet recording apparatus, from which a front cover is removed to expose the internal mechanisms, of another embodiment of the present invention.

FIG. 33 is a view showing the mechanical structure of an ink jet recording apparatus 3200 with interchangeable cartridge, adapted for use in the present invention, wherein a front cover is removed to expose the internal configuration.

The configuration shown in FIG. 33 is similar to that in FIG. 14, except that the interchangeable ink cartridge 3001 corresponds to 3203 in FIG. 32. Other components equivalent to those shown in FIG. 14 are indicated with numbers starting from 3000.

The ink cartridge 3001 and the contact portion thereof employed in the present embodiment are equivalent to those shown in FIGS. 15 and 18, but are different in that an ID signal for identifying the ink cartridge 3001, in addition to the signals relating to the ink discharge, is communicated with the recording apparatus through the contact portion and the electrode pads.

Figure 34B:
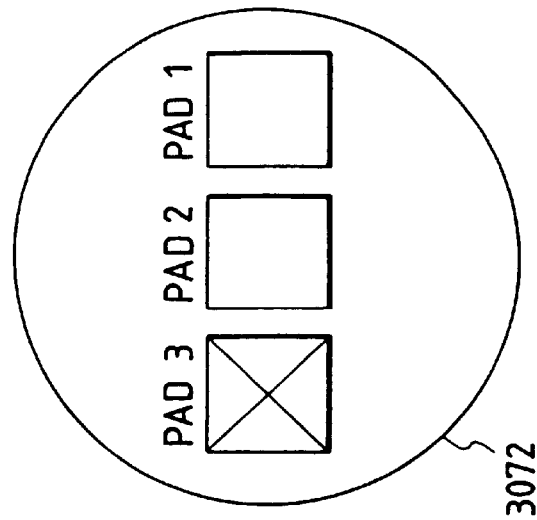
FIG. 34B is an enlargement of a section thereof.
Figure 34A:
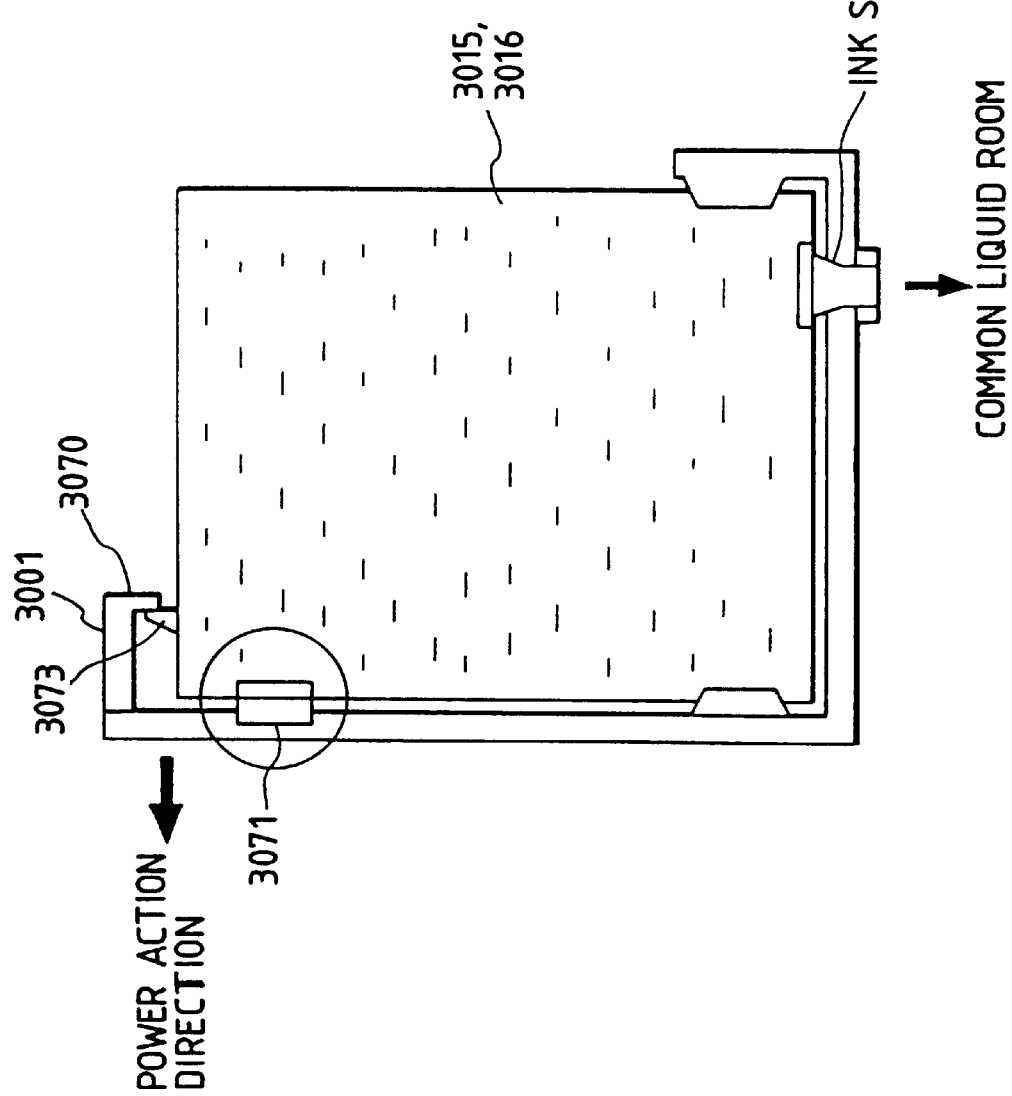
FIG. 34A is a view showing another method for detecting the kind of the ink tank in an ink cartridge 1, in another embodiment of the present invention

FIG. 34A shows another method for detecting the kind of the ink tank in the ink cartridge 3001 employed in the present embodiment and FIG. 34B is an enlargment of a section thereof. Such method, similar to that already explained for example in relation to FIGS. 18A and 18B, will be explained in the following.

Ink tanks 3015, 3016 are mounted on the ink cartridge 3001 and are fixed thereon by the engagement of a hook 3070 with a tank projection 3073. In the direction of the force of the hook 3070, there is provided a contact portion 3071 for detecting the kind of the mounted ink tank. Such tank detecting contact portion 3071 is provided on both of the ink cartridge 3001 and the ink tanks 3015, 3016. A magnified view 3072 shows the details of the contact portion 3071, which is provided with three electrode pads 1, 2, 3. Though omitted from the illustration, the ink cartridge 3001 is also provided with similar electrode pads of a same number, for forming electrical contacts at the contact portion 3071. It i s assumed that, in the contact portion of the ink tanks 3015, 3016, the electrode pads 1 and 2 are in a mutually conductive state while the pad 3 is insulated, and that such state is provided for ink tanks containing ordinary inks. The recording apparatus of the present embodiment can detect the kind of the ink contained in the mounted ink tank, by applying a voltage to these electrode pads through the contact portion of the cartridge 3001.

More specifically, in the example shown in FIGS. 34A and 34B, a current flows between the electrode pads 1 and 2 but not between the pads 1 and 3 or between the pads 2 and 3. The recording apparatus stores such state in advance, for example in a ROM, corresponding to the state with the ordinary ink tank. On the other hand, in an ink tank containing ink of lower density, the electrode pad 3 is, for example, made conductive to allow distinction from the ordinary ink tank.

The present embodiment employs three electrode pads for identifying the ink tanks, but the number of such electrode pads may be increased for identifying a larger number of kinds of the ink tanks.

It is also possible to detect whether the ink cartridge 3001 has been replaced, by inspecting the conductive state through the contact portion of the ink cartridge 3001.

Figure 35:
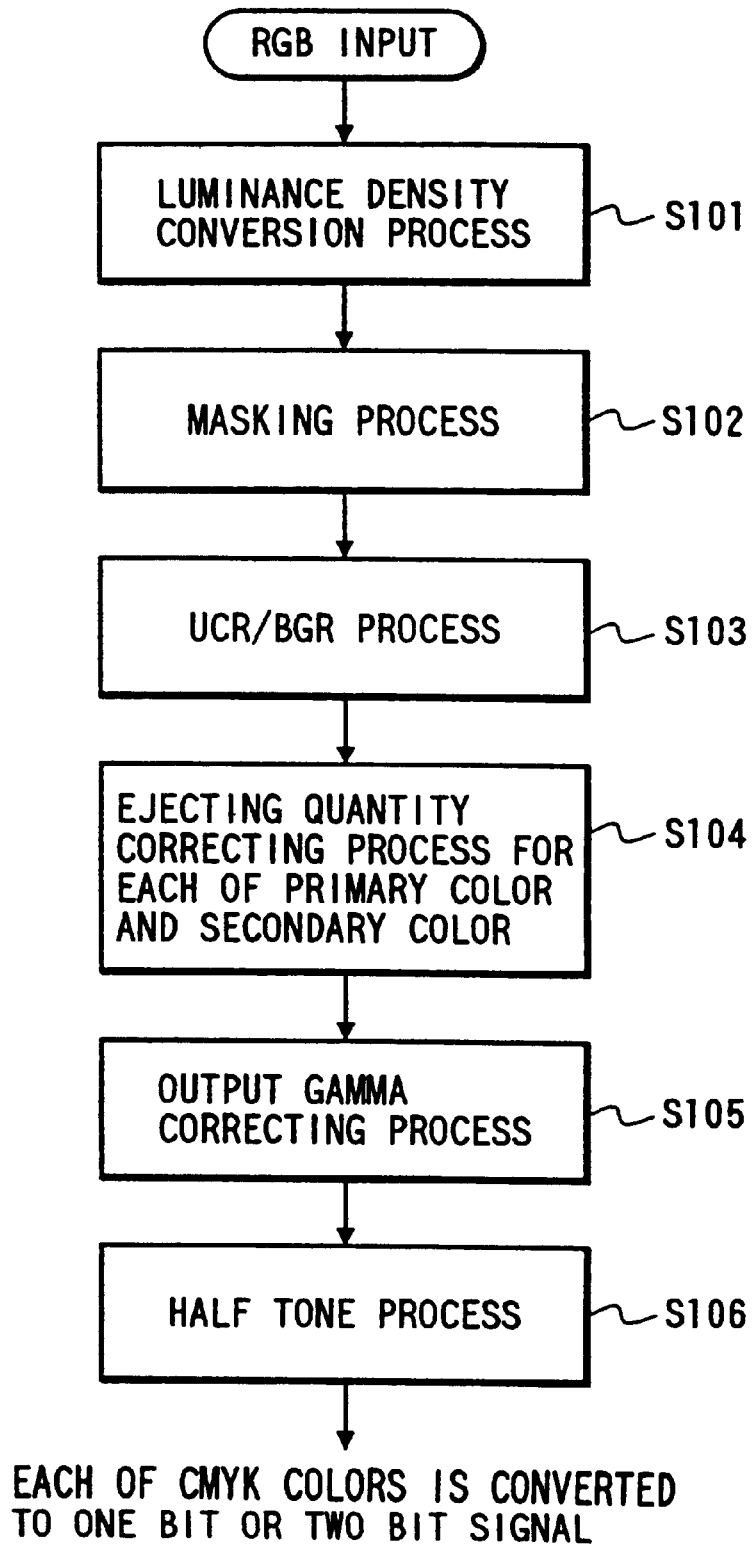
FIG. 35 is a flow chart showing the process in a color process module of the printer driver in another embodiment of the present invention.

FIG. 35 is a flow chart showing an example of image processing, in the image processing module of the printer driver 3103 of the present embodiment.

At first a step S101 executes a luminance-density conversion for converting the RGB luminance signals, having 8 bits for each of R, G and B components or 24 bits in total, into CMY density signals having 8 bits for each of C, M and Y components or 24 bits in total, or 32 bits for C, M, Y and K components. Then a step S102 executes a masking process, for compensating the unnecessary color components of the dyes used in the C, M, Y coloring materials. A next step S103 executes a UCR/BGR process for removing the under color and extracting the black component. Then a step S104 sets, for each pixel, limits on the discharge amount respectively for the primary color and the secondary color. In the present case, the primary color is limited to 300%, while the secondary color is limited to 400%.

Then a step S105 executes output gamma correction to obtain linear output characteristics. The foregoing steps are executed with multi-bit outputs of 8 bits for each color. A next step S106 executes a halftone process on the 8-bit signals, thereby converting the data of each of C, M, Y, K colors into 1-bit or 2-bit signals. The halftone process in this step S106 is executed for example by the error diffusion method or by the dither method.

FIG. 37 is a table showing the contents of control by the control unit of the recording apparatus, based on the head identification signal or the ink tank ID signal from the contact portion 19 of the ink cartridge 1.

In the present embodiment, there can be identified four kinds by the ID information, among which three kinds (color cartridges) only are illustrated. More specifically, ID=0 (not shownf) indicates a monochromatic cartridge, while ID=1, 2 or 3 indicate color cartridges. FIG. 37 shows an example of classification of the color cartridges, wherein the dye concentration is lowered in at least one of the coloring materials with the increase in the ID number.

In the present embodiment, a cartridge with ID=1 is assumed to have high dye concentrations (high densities) employed in the conventional color printers.

A cartridge or tanks with ID=2 have lower dye concentrations in the coloring materials, except for the yellow coloring material, as employed in the present embodiment. A cartridge or tanks with ID=3 contain inks of still lower dye concentrations, to be employed in the present embodiment for recording a high-quality pictorial image.

Thus defined ID values at first allow recognition of the difference in the dye concentrations. The difference in the dye concentration corresponds to the difference in the maximum reflective optical density in each primary color, and may involve a change in the dye itself. In such sense, the ID value can be said to indicate the difference in the maximum reflective optical density of each primary color or the difference in the maximum saturation. In the present embodiment, for the purpose of simplicity, it is described as the difference in the dye concentration.

For ID=1 and ID=2, the yellow ink has a same dye concentration (2.5%), but the magenta dye concentration for ID=2 is ⅓ of that for ID=1, while the cyan dye concentration is similarly reduced to ⅓, and the black dye concentration is reduced to about ½. Also for ID=1 and ID=3, the yellow ink has a same dye concentration (2.5%), but the magenta dye concentration for ID=3 is about ¼ of that for ID=1, while the cyan dye concentration is similarly reduced to about ¼, and the black dye concentration is reduced to about ¼.

Figure 36:
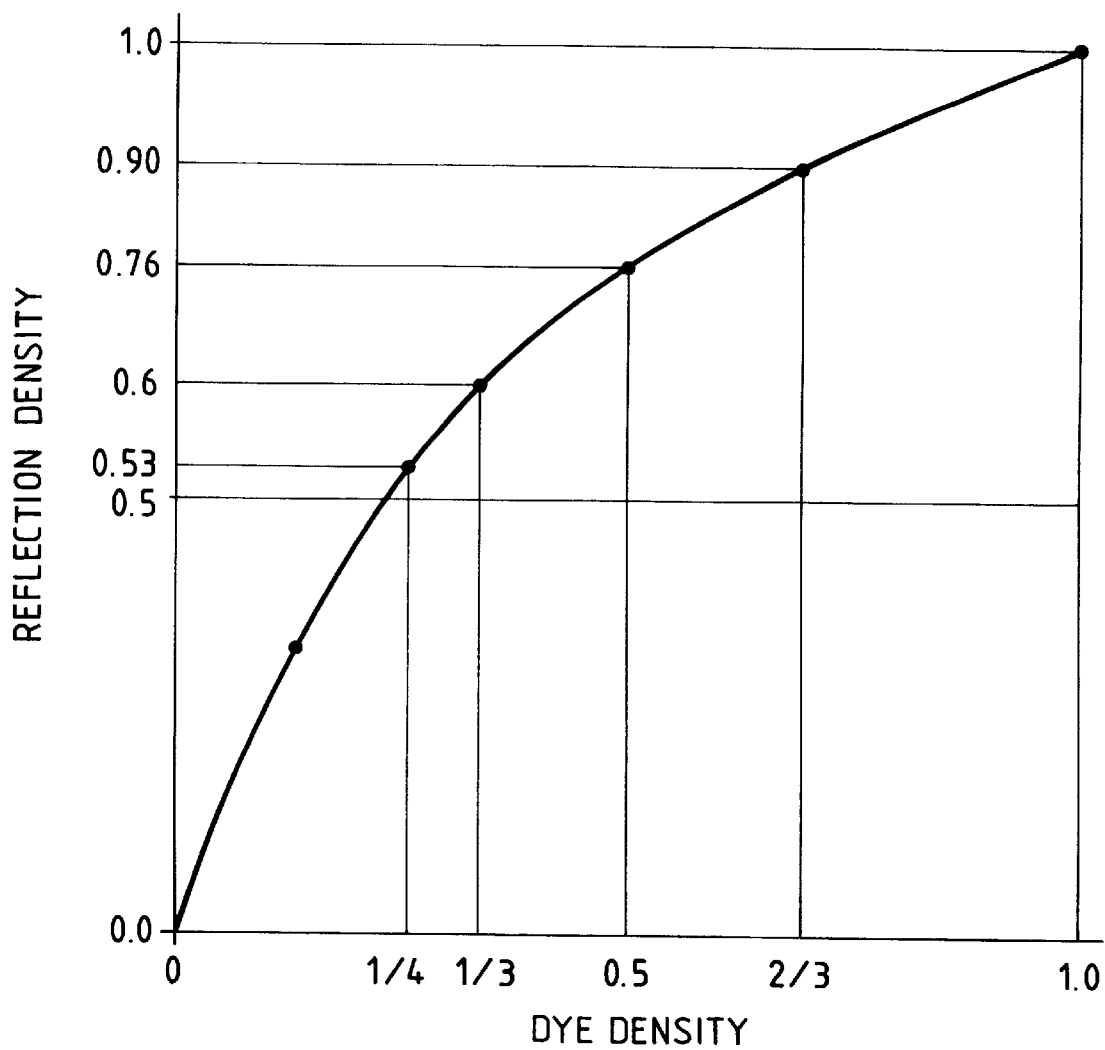
FIG. 36 is a chart showing the relationship between the dye concentration and the reflective density of ink in another embodiment of the present invention.

In the present embodiment, as shown in FIG. 36, the reflective optical density changes to about 76% when the dye concentration is reduced to ½, about 60% with the dye concentration of ⅓, about 53% with the dye concentration of ¼ and about 90% with the dye concentration of ¾. This relationship has been found to be constant regardless of the color.

In FIG. 37, a "data" portion indicates the depth of structure of the data in each ID sent from the printer driver 103 to the recording apparatus 200. There are shown changes for varying the maximum ejection amount, while increasing the number of gradation levels of the recording data, in response to the change in the dye concentrations in the coloring materials. At the same time there may be added a change involving a variation in the discharge amounts of the coloring materials by the ink cartridge. Such variations are basically determined by the amounts of the coloring materials, or the dyes therein, per unit area, and are also included in the present invention. In the present embodiment, there will be explained a case with constant discharge amount. In the present embodiment, the resolution is selected as 3×360 dpi regardless of the ID value, and there are assumed two-value data, four-value data and five-value data respectively in case ID=1, 2 and 3. The number of gradation levels can also be increased by improving the resolution, while fixing the data at two values.

The "corresponding medium" in FIG. 37 indicates the recording medium capable of matching with the ink cartridge 3001 of each ID value.

Such recording medium can be selected by various parameters, but, in the present embodiment, by the difference in the maximum absorbing ability for the coloring material. In the present embodiment, the pictorial medium (pictorial paper) is highest in the coloring material absorbing ability, which is about 500%. The coated paper comes next, with a value of about 400%, and the ordinary paper is lowest with a value of about 200%.

"The maximum ejection amount" in FIG. 37 is different between the CMYK system and the RGB system. This figure indicates the maximum ink ejection amount per pixel, limited by the printer driver 3103. For a constant expression, the areal density of the coloring material for each color density is so modified that the amount of pigment becomes substantially equal in areas of a same color density. The present embodiment (in case of ID=2 or 3) is featured by a fact that, in comparison with the conventional case (ID=1), the maximum ejection amount for the secondary colors (RGB) is not doubled with respect to that for the primary colors (CMYK).

As will be apparent from FIG. 37, the variations in the "dye concentration" and the "maximum ejection amount" are mutually correlated in the following manner.

For cyan, magenta and yellow (C, M, Y) colors, the dye concentrations of the coloring materials of a substantially same hue (substantially same color) are compared between different ID values, then there is determined at least a ratio between a high dye concentration and a low dye concentration, and the maximum ejection amount is varied at least to the sum of the maximum value and the minimum value of such ratio.

As an example, in the comparison of the cartridge with ID=3 and the cartridge with ID=2, the ratio of the dye concentrations in a substantially same hue is largest in C and M, wherein the ratio being "3" in M and also "3" in C (maximum value). On the other hand, the minimum value is "1" for Y. Therefore, the sum of such maximum and minimum values is "4". Consequently, the maximum ejection amount in this case is at least 4 (=3+1) or 400%. More specifically, the maximum ejection amount for ID=2 is selected as tripled or 300% for the primary colors (CMY) and quadrupled or 400% for the secondary colors (RGB) in comparison with the case of ID=1.

The maximum ejection amount thus determined allows, for the primary colors C and M, to obtain an image of the reflective optical density substantially equal with that obtainable with an ink cartridge containing inks of high dye concentrations as in the case of ID=1. The maximum ejection amount for Y is 100% as it can be same as the case of ID=1. Now, taking an example shown in FIGS. 6A and 6B, three discharges of ink with a dye concentration of ⅓ triples the ejected dye amount, and, since the diluting water is absorbed in the recording medium or is evaporated, there can be obtained an approximately tripled reflective optical density. On the other hand, the reflective density is equal to or higher than 0.9 and becomes substantially saturated at a dye concentration of ⅔ or higher as will be apparent from FIGS. 6A and 6B, so that the difference in the reflective density depending on the dye concentration becomes scarcely noticeable.

Now there will be considered the case of secondary colors, for example red, green and blue (R, G, B). The maximum ejection amounts represented by such secondary colors correspond to the ink absorbing ability of the recording medium. In the example shown in FIG. 34, the ink absorbing ability is lowest (200%) in the ordinary paper, medium in the coated paper (400%) and highest in the pictorial paper (500%).

At first, red color R is represented by the dyes of the inks M+Y. As explained before, the maximum ejection amount for Y is 100% because of the high dye concentration (high luminosity), while that for M is set at 300%. Consequently R, or (M+Y), can be represented with 400%, thus providing a reflective optical density substantially equal to that of R color in case of ID=1. Similarly G is represented by C+Y), and, since the maximum ejection amount for C is set at 300%, the maximum ejection amount for (C+Y) is defined as 400%, thus providing a reflective optical density substantially equal to that of G color in case of ID=1. Also in case of B which is represented by (C+M), the maximum ejection amount is given by (300% +300%=) 600%, but, with such setting, the reflective optical density does not increase in proportion to the ink ejection amount, and it is more practical to select 400% (=C+M=200%+200%). The reflective optical density of the pixel recorded under such setting is about 90% of that obtainable with the ink cartridge in case of ID=1.

Calculations for the ink cartridge for ID=3 are also made in a similar manner. In consideration of the relationship between the cases of ID=1 and ID=3, the maximum ejection amount is 400% for the primary colors (C, M) and 500% or higher for the secondary colors (R, G, B). Under such setting, a reflective optical density substantially equal to that in case of ID=1 can be obtained except for the secondary color B. For the color B, the maximum ejection amount may be selected as 600% since the reflective optical density at 500% becomes somewhat lower than that in the case of ID=1. In any case, such change in the maximum ejection amount poses a certain limitation in the "corresponding medium", as shown in FIG. 37. Therefore, for obtaining a pictorial image, the dye concentrations are lowered, then the maximum ejection amount is varied according to such dye concentrations, and there can be selected a "corresponding medium" optimum for the pictorial image.

The above-explained procedure allows to obtain maximum effect from the change in the maximum ejection amount.

In the actual case, even if the maximum ejection amount for the medium cannot be changed ideally, it is still possible to design the relationship between the input and the output as shown in FIG. 36, for example by clipping the data in the upper part of the gradation (in the portion of higher density), or employing a curve of a higher order, or selecting the output level slightly lower than the ideal level.

Even in case the increase in the maximum ejection amount is suppressed by data clipping, a similar effect can be obtained up to a certain gradation level.

In such case, the dye density per unit area can be maintained at a substantially same level, regardless of the dye, until the data clipping is executed.

Figure 38B:
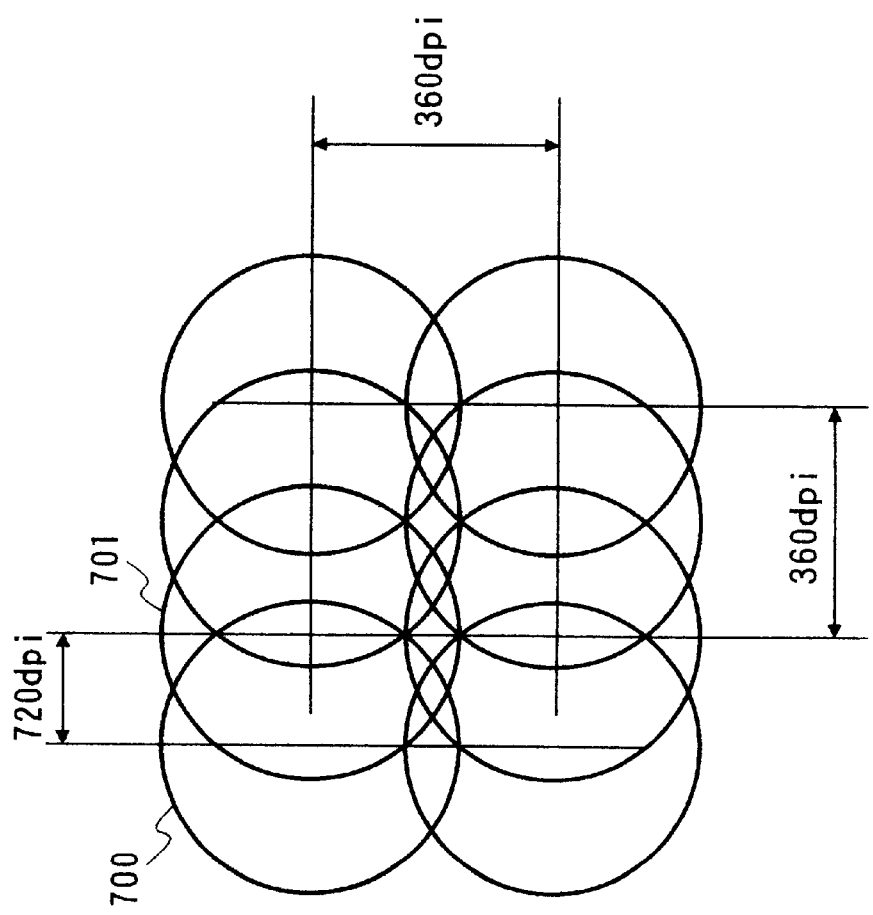
FIGS. 38A and 38B are views showing the dot arrangement on the recording medium in the ink jet recording apparatus of another embodiment of the present invention, respectively in the recording at 360 dpi and in the recording based on multi-value data.
Figure 38A:
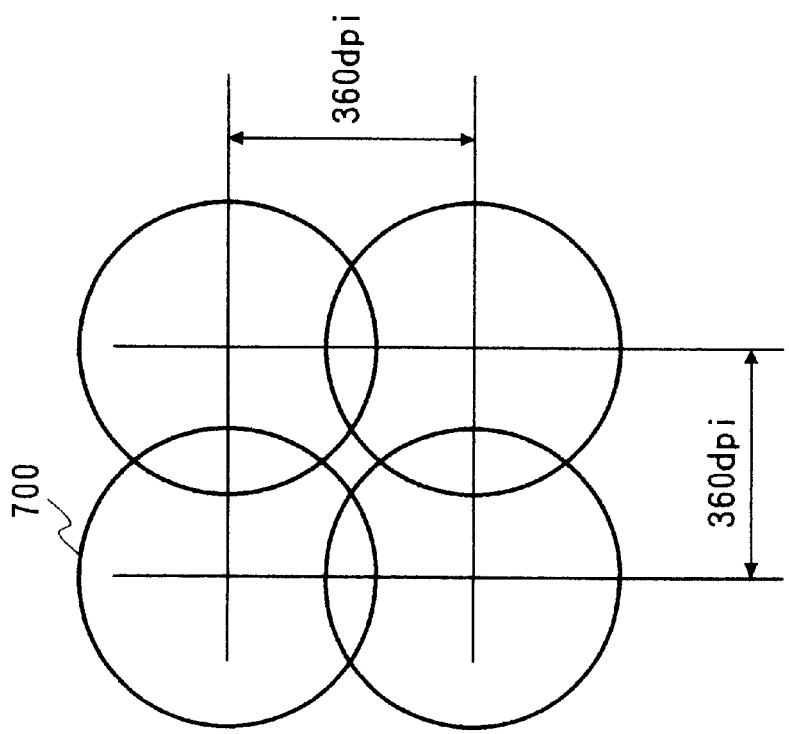

FIGS. 38A and 38B show the arrangement of the recorded dots.

FIG. 38A shows the arrangement of the dots on the recording medium in case of recording binary data with 360 dpi×360 dpi, while FIG. 38B shows that in case of recording 4- or 5-value data with 360 dpi×360 dpi.

FIG. 38A corresponds to an ejection rate of 1 dot per pixel, and this state is defined as 100%. Consequently the state shown in FIG. 38B is defined as 200%. In any of 2-, 4- and 5-value data, the variation of the ink discharge amount for each cartridge may be made with a value obtained by multiplying 100% with the rate of such variation, even if all the dots exist corresponding to the pixels.

FIGS. 39A, 39B and 39C show the relationship between the dot arrangement recorded on the recording medium by the ink jet recording apparatus 200 of the present embodiment, and the data format.

FIG. 39A shows two-value data at 360 dpi, while FIG. 39B shows 4-value data at 360 dpi, and FIG. 39C shows 5-value data at 360 dpi. The 2-value data shown in FIG. 39A are recorded with the dot arrangement shown in FIG. 38A. In this case, the data of each pixel corresponds one-to-one with the recorded dot, so that data "0" does not record a dot, while data "1" records a dot in each pixel position in a resolution of 360 dpi ×360 dpi. Such recording method is executed, in the present embodiment, in case the ink cartridge 1 of ID=1 is mounted.

FIG. 39B shows the recording with 4-value data, executed in case the ink cartridge of ID=2 is mounted. In this case the recording is achieved with sub-dots recorded at addresses corresponding to 360 dpi×360 dpi (700 in FIG. 38B) and at addresses corresponding to 720 dpi×360 dpi (701 in FIG. 38B). The data in this case are given by 2-bit signals, wherein "00" does not record any dot, while "01" records a dot at an address corresponding to 360 dpi×360 dpi. Data "10" are decoded in the ink jet recording apparatus and provide a dot in an address (700) corresponding to 360 dpi×360 dpi and a dot in an address (701) corresponding to 720 dpi×360 dpi. This state corresponds to an ink ejection state of 200%, in comparison with the state of 360 dpi×360 dpi shown in FIG. 38A. Also data "11" record two superposed dots in an address (700) corresponding to 360 dpi× 360 dpi and a dot in an address (701) corresponding to 720 dpi×360 dpi. In this manner an ink ejection rate of 300% is achieved, in comparison with the state shown in FIG. 38A.

FIG. 39C shows, as an example, a case of generating 5 levels with 4-bit data, but other methods are also adoptable. The recording in FIG. 39C is different from that in FIG. 39B in that 5-value data "1111" record two superposed dots at an address (700) corresponding to 360 dpi×360 dpi and at an address (701) corresponding to 720 dpi×360 dpi. Thus the 5-value data enable ink ejection of 400% at maximum in the primary colors. Naturally the dot arrangement may be made according to the decoding shown in FIG. 39B.

In order to execute the above-mentioned recording method with increased number of gradation levels, the known multi-path recording is essential because two dots have to be superposed in a pixel position.

As another embodiment, the recording may be made with a cartridge having a higher density of arrangement of the recording devices, in 1-pass or multi-pass recording.

For example, instead of the cartridge having the recording elements arranged with a pitch of 360 dpi, there may be employed another cartridge with a pitch of 720 dpi for increasing the number of gradation levels according to the present invention.

Figure 40:
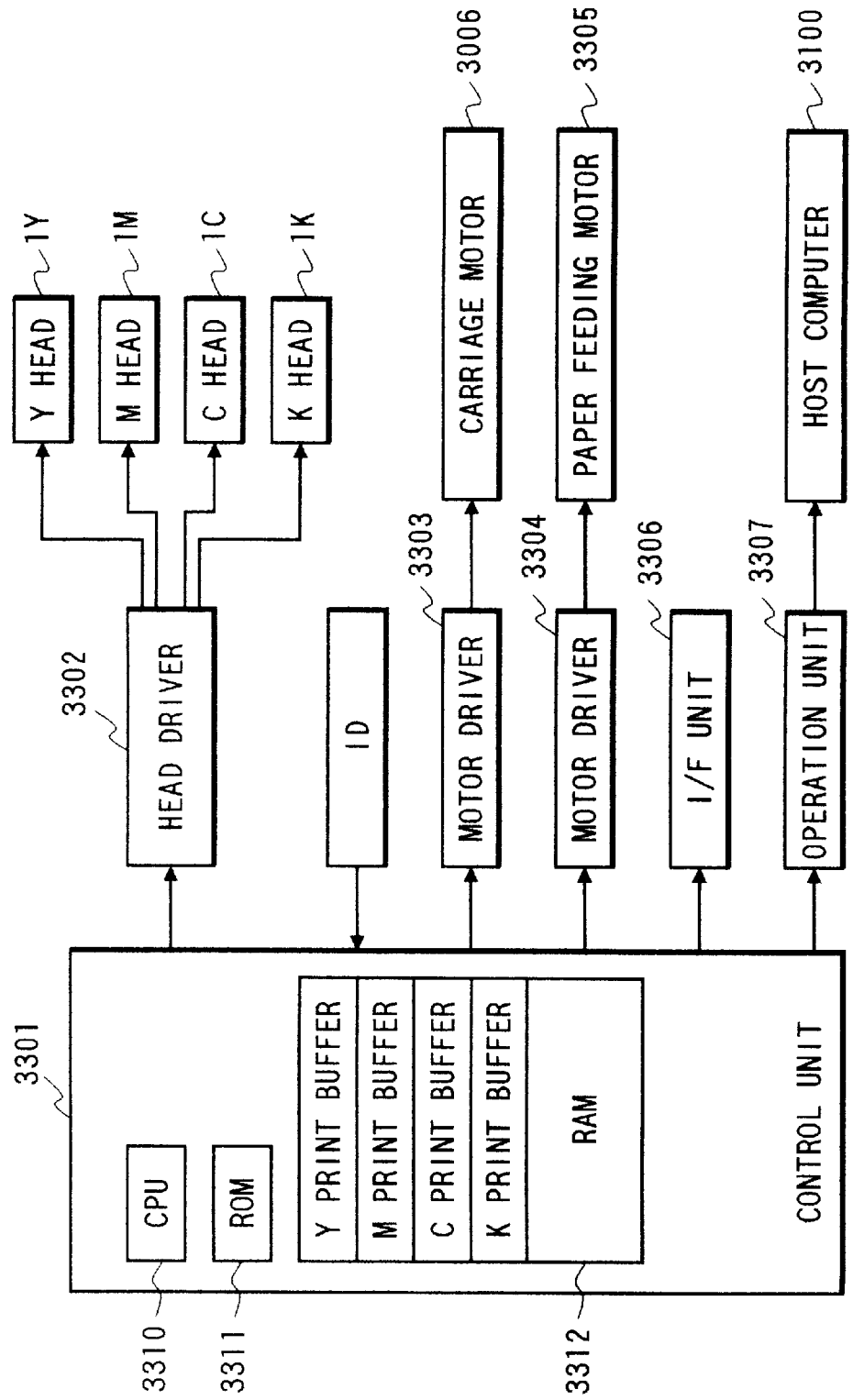
FIG. 40 is a block diagram showing the configuration of the ink jet recording apparatus constituting another embodiment of the present invention.

FIG. 40 is a block diagram showing the configuration of the ink jet recording apparatus 200 of the present embodiment, wherein components equivalent to those in the foregoing drawings are represented by corresponding numbers.

A control unit 3301 for controlling the entire apparatus is provided with a CPU 3310 such as a microprocessor, a ROM 3311 storing control programs to be executed by the CPU 3310 and various data, and a RAM 3311 used as a work area of the CPU 3310 and serving to temporarily storing various data. The RAM 3312 includes a reception buffer for storing the recording codes received from the host computer 3100, and print buffers corresponding to Y, M, C, B colors and storing print data corresponding to recording heads 1Y, 1M, 1C, 1B.

A head driver 3302 constituting the ejection amount control means together with the control unit 3301 drives the yellow recording head 1Y, magenta recording head IM, cyan recording head 1C and black recording head 1B according to the print data of different colors supplied from the control unit 3301. Motor drivers 3303, 3304 respectively drive a carriage motor 3006 and a paper feeding motor 3305. An interface unit 3306 controls the interface between the ink jet recording apparatus 3302 and the host computer 3100. An operation unit 3307 is provided with various keys to be operated by the user and a display unit such as a liquid crystal display.

Figure 41:
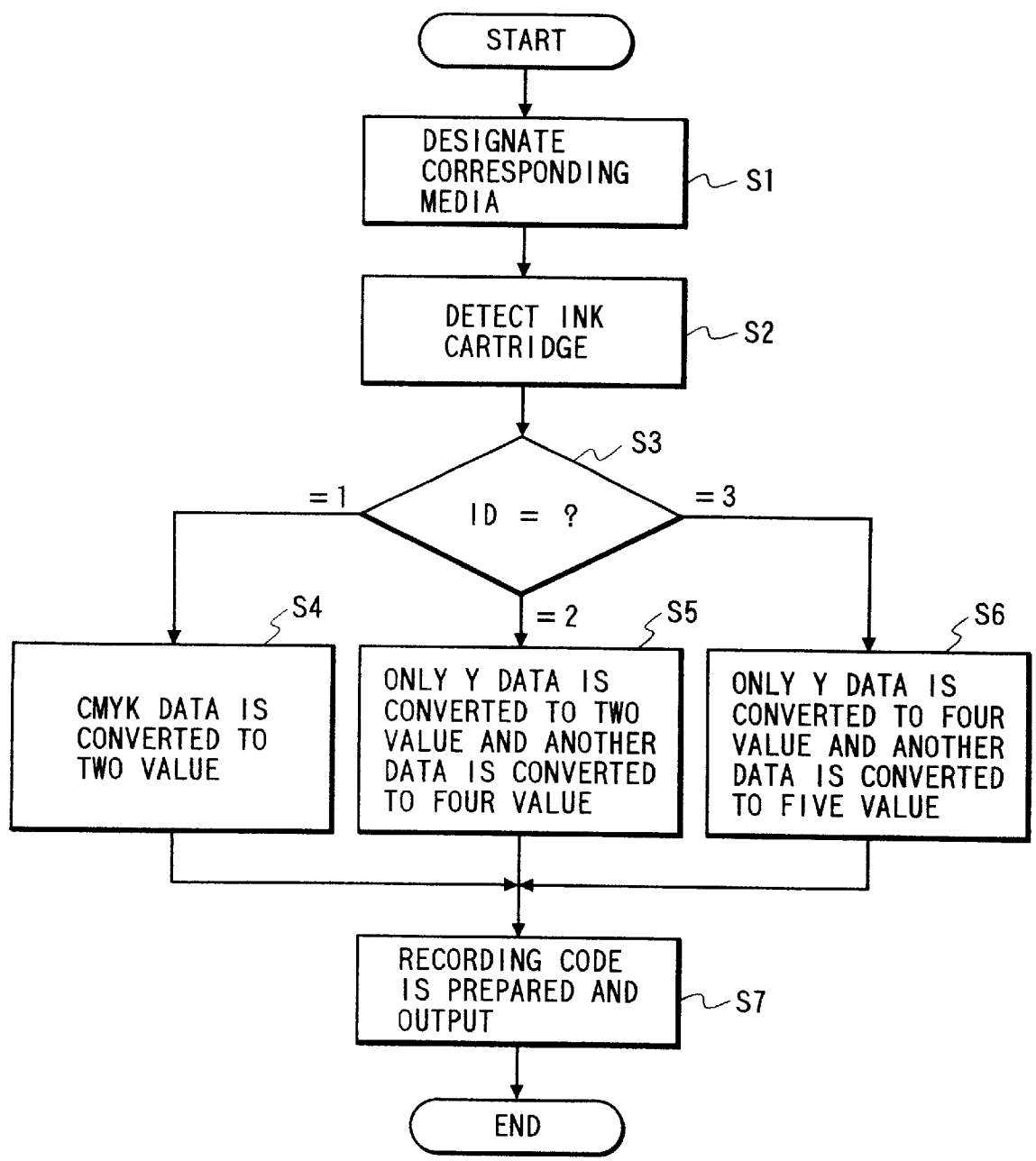
FIG. 41 is a flow chart showing an encoding process in the printer driver of the host computer in another embodiment of the present invention.

FIG. 41 is a flow chart showing the preparation process for the recording codes to be executed by the host computer 3100, and this flow chart is executed for example by the printer driver 3103.

At first a step S1 designates the medium to be used in the recording apparatus 3200, and a step S2 discriminates, according to the signal therefrom, the kind (ID) of the ink cartridge mounted thereon. Such medium designation or the cartridge discrimination can be made by selecting the mode of the recording apparatus 3200 on an image displayed by the operating system 101 of the host computer 3100. Then a step S3 discriminates the kind of the ink cartridge 1 mounted on the apparatus 3200, and, if it is a cartridge of ID=1, the sequence proceeds to a step S4 to effect binarization of the image data of each color component in the known manner.

If the step S3 identifies the mounting of a cartridge 3001 of ID=2, the sequence proceeds to a step S5 to convert the Y data into two-value data and the data of other colors into 4-value data. If the step S3 identifies the mounting of a cartridge 3001 of ID=3, the sequence proceeds to a step S6 to convert the Y data into two-value data and the data of other colors into 5-value data. Based on the recording data converted in the step S4, S5 or S6, a step S7 prepares recording codes and sends them to the recording apparatus 3002 through the interface 306.

Figure 42:
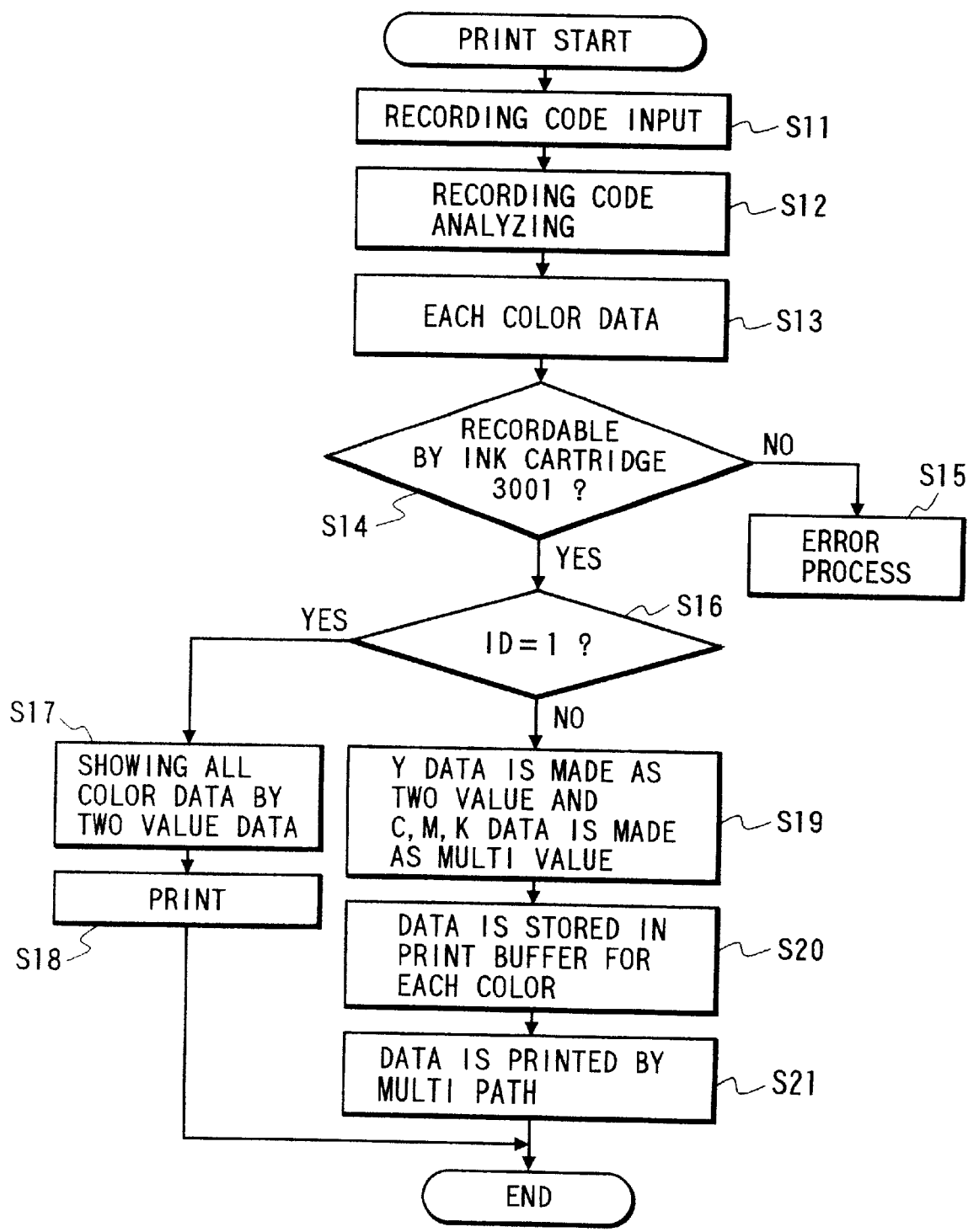
FIG. 42 is a flow chart showing the process in the ink jet recording apparatus in another embodiment of the present invention.

FIG. 42 is a flow chart showing the recording process in the ink jet recording apparatus 3200 of the present embodiment, and a control program executing such process is stored in the ROM 3311.

At first a step Sll read the recording code received from the host computer 3100 and stored in the reception buffer, and a step S12 analyzes the thus read recording code. Then a step S13 effects conversion to print data corresponding to each color, according to the result of such analysis. A next step S14 discriminates whether the received data are recordable with the currently mounted cartridge 3001, and, if not, a step S15 displays an error message on the operation unit 3307 and the sequence is terminated.

If the recording is possible with the mounted cartridge 3001, the sequence proceeds to a step S16 to discriminate whether the cartridge ID is "1", and, if so, a step S17 converts all the color data into binary print data and develops such data in the print buffers and a step S18 executes the ordinary 1-pass recording.

On the other hand, if the step S16 identifies that the cartridge ID is not "1", the sequence proceeds to a step S19 to convert the Y data into binary data and the data of other colors into 4- or 5-value data. This process may be uniquely determined by the recording code or independently executed in the recording apparatus based on the ID of the mounted cartridge. Then a step S20 stores the print data, developed according to the colors of the mounted cartridge, in the print buffers corresponding to the respective colors. Then a step S21 executes multi-pass printing in the manner as already explained in FIGS. 38A, 38B, 39A, 39B and 39C.

Figures 43, 43A:
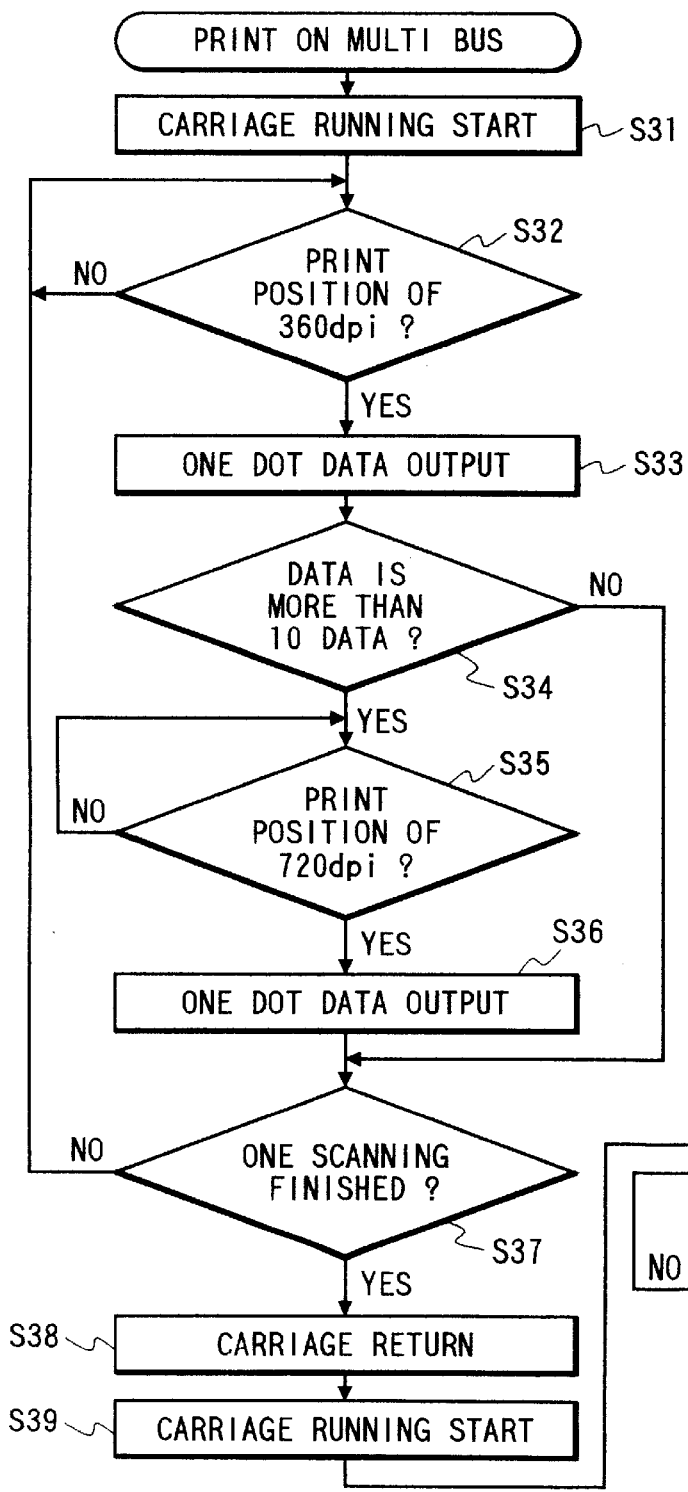
FIG. 43, which is composed of FIGS. 43A and 43B, comprises flow charts showing a multi-path recording process in the ink jet recording apparatus in another embodiment of the present invention.
Figure 43B:
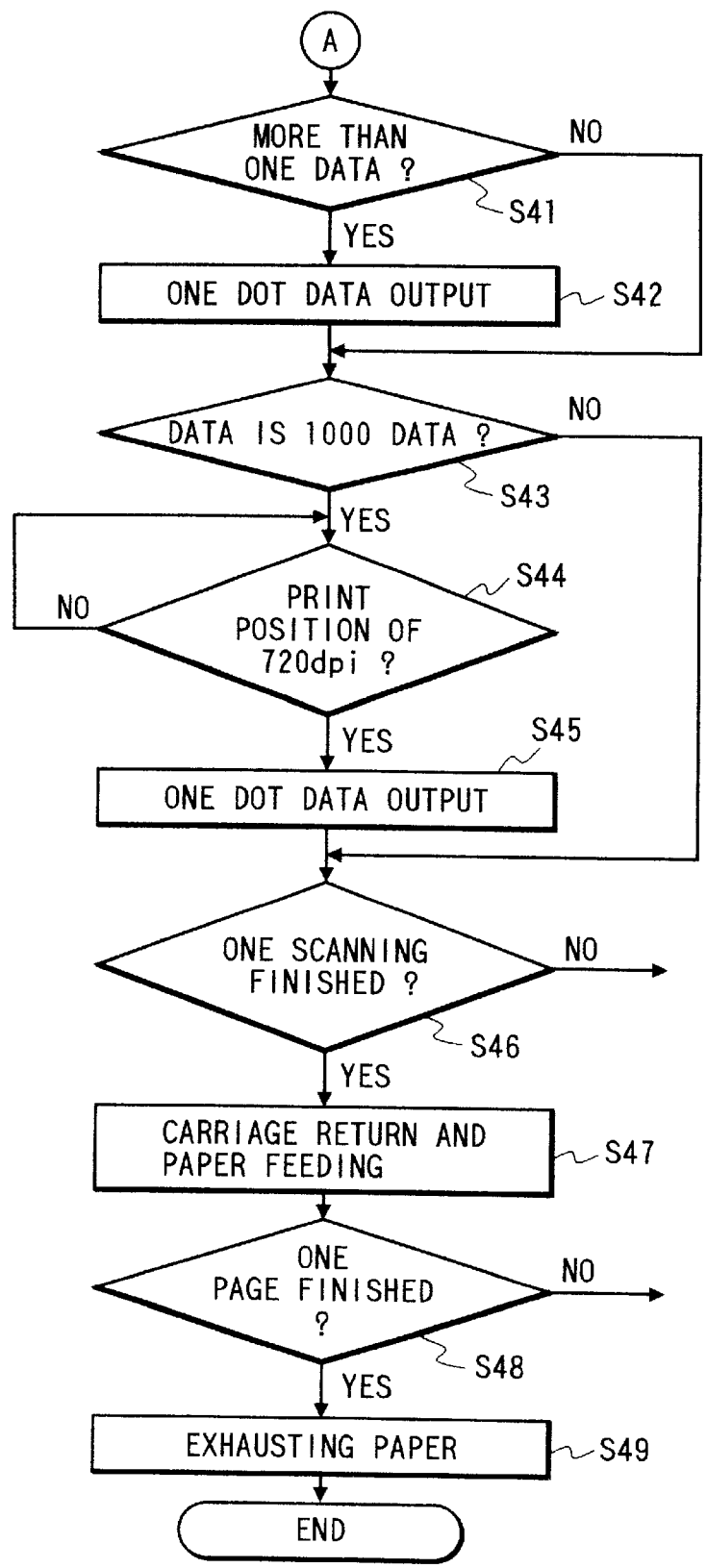

FIG. 43A and 43B are flow charts of the recording process in such multi-pass recording (step S21).

At first a step S31 starts to drive the carriage motor 3006, and a step S32 reads the print data of the color to be printed next, from the print buffer of the corresponding color, and discriminates whether the print timing has been reached for printing with a resolution of 360 dpi (position 700 in FIG. 35). When such print timing is reached, a step S33 sends the print data of respective colors to the heads 1Y, 1M, 1C, 1B through the head driver 3202, thereby recording a dot in the position 700 shown in FIGS. 38A and 38B (except for data "0" or "00"). Then a step S34 discriminates whether data at least equal to "10" are present in the multi-value data other than those of Y color. If not, there is required recording of only one dot as shown in FIGS. 39A, 39B and 39C so that the sequence proceeds to a step S37.

If data at least equal to "10" are present, the sequence proceeds to a step S35 to discriminate whether the timing has been reached for printing a dot at a position 701 of 720 dpi shown in FIGS. 38A and 38B. If reached, a step S36 sends the print data to the heads 1M, 1C and 1B of the corresponding colors to effect recording. Then a step S37 discriminates whether the recording operation of a scanning line has been completed, and, if not, the sequence returns to the step S32 to repeat the above-explained process.

If the step S37 identifies the completion of the recording operation of a scannig line, a step S38 effects a carriage returning operation to return the recording head to the home position. Then a step S39 drives the carriage motor 3006 again in the forward direction. Then a step S40 discriminates, as in the step S32, whether the recording position at 360 dpi has been reached, and, if reached, the sequence proceeds to a step S41 to discriminate whether the print data contain data at least equal to "11", and, if such data are present, record a dot in such position. Then a step S43 discriminates whether print data contain data "1000" (maximum value in the 5-value data), and, if present, a step S44 discriminates whether the print position at 720 dpi has been reached. When such timing is reached, a step S45 records a dot in such position.

When a step S46 identifies the completion of the recording operation of a scanning line, a step S47 executes a carriage returning operation to return the carriage unit 2 to the home position and drives the paper feeding motor 3305 to advance the recording sheet by an amount corresponding to the recording elements of the recording head of the different colors. In this manner there is recorded an image corresponding to the recording width of the recording head. Then a step S48 discriminates whether the recording of a page has been completed, and, if not, the sequence returns to the step S1 to prepare the print data to be recorded in the next recording scan and store such data in the print buffers of the different colors. Upon completion of the recording of a page, a step S49 discharges the recorded sheet and the sequence is terminated.

In the present embodiment the process in the host computer and that in the recording apparatus are separated, but the present invention is not limited to such embodiment and these functions may be executed in a single apparatus or in a single unit.

Among various ink jet printing systems, the foregoing embodiments can achieve higher resolution and higher definition in the record particularly in a system provided with means (such as electrothermal converting member or laser beam) for generating thermal energy to be used for discharging ink and adapted to induce a state change of the ink by such thermal energy.

As to its representative configuration and principle, for example the one practiced by the use of the basic principle disclosed in the U.S. Pat. Nos. 4,723,129 and 4,740,796 is preferred. This system is applicable to either of the so-called on-demand type and the continuous type. Particularly the case of the on-demand type is effective because, by applying at least one driving signal which gives rapid temperature elevation exceeding nucleus boiling corresponding to the recording information on an electrothermal converting member arranged corresponding to the sheets or liquid channels holding liquid (ink), thermal energy is generated at the electrothermal converting member to induce film boiling at the heat action surface of the printing head, and a bubble can be consequently formed in the liquid (ink) corresponding one-to-one to the driving signals. By discharging the liquid (ink) through a discharge opening by the growth and shrinkage of the bubble, at least a droplet is formed. By forming the driving signals into pulse shapes, growth and shrinkage of the bubble can be effected instantly and adequately to accomplish more preferable discharging of the liquid (ink) particularly excellent in the response characteristics.

As the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat action surface.

As the configuration of the printing head, in addition to the combinations of the discharging orifice, liquid channel and electro-thermal converting member (linear liquid channel or right-angled liquid channel) as disclosed in the above-mentioned respective specifications, the configuration by the use of the U.S. Pat. Nos. 4,558,333 and 4,459,600 disclosing the configuration having the heat action portion arranged in the flexed region is also included in the present invention. In addition, the present invention can also be effectively applied to the configuration of Japanese Patent Laid-Open Application No. 59- 123670 using a slit common to a plurality of electrothermal converting members as the discharging portion of the electrothermal converting members or of Japanese Patent Laid-Open Application No. 59-138461 having the opening for absorbing a pressure wave of thermal energy corresponding to the discharging portion.

In addition, the present invention is effective in an exchangeable chip-type printing head enabling electrical connection with the main body of the printing device or ink supply from such main body by being mounted on the main body, or the printing head of a cartridge type in which an ink tank is integrally provided in the printing head itself.

Also in the configuration of the printing device of the present invention, the addition of discharge restoration means for the printing head, preliminary auxiliary means etc. is preferable, because the effect of the present invention can be further stabilized. Specific examples of these may include, capping means, cleaning means, pressurization or aspiration means, preliminary heating means for effecting heating by an electrothermal converting member, another heating element or a combination thereof, and preliminary discharge means for effecting an idle discharge independent from that for printing.

Furthermore, the present invention is not limited to a recording mode for recording a single main color such as black, but is extremely effective also in the printing head for recording plural different colors or full color by color mixing, wherein the printing head is either integrally constructed or is composed of plural units.

In the foregoing embodiments, the inks are assumed to be liquid, but there may also be employed ink which is solid below room temperature but softens or liquefies at room temperature, or ink which is liquid when the recording signal is given, since the ink in the ink jet recording is usually subjected to temperature control within a range from 30° C. to 70° C., for maintaining the ink viscosity within a stable discharge range.

Besides the present invention can employ ink which is solid in the normal state and liquefies when heated, in order to avoid temperature elevation with thermal energy by the state change from solid to liquid. Thus the present invention is applicable also to the case of liquefying the ink by the thermal energy provided corresponding to the recording signal and discharging thus liquefied ink, or the case of using ink which starts to solidify upon reaching the recording medium. In these case the ink may be supported as solid or liquid in recesses or holes of a porous sheet, as described in Japanese Patent Laid-Open Application Nos. 54-56847 and 60-71260, and placed in an opposed state to the electrothermal converting member. The present invention is most effective when the above-mentioned film boiling is induced in the ink of the above-mentioned forms.

Furthermore, the recording apparatus of the present invention may assume the form an integral or separate image output terminal for an information processing equipment such as a computer, or a copying apparatus combined with a reader or the like.

The present invention is applicable not only to a system consisting of plural pieces of equipment, but also to an apparatus consisting of a single piece of equipment. Also the present invention is naturally applicable to a case where the present invention is attained by the supply of a program to a system or an apparatus. In such case, a memory medium storing a program relating to the present invention constitutes the present invention, and, by reading such program from the memory medium, the system or the apparatus functions in the predetermined manner.

In the foregoing embodiments, the host computer divides the multi-value image data into data corresponding to respective colors and executes the two- or multi-value process according to the respective color, but the present invention is not limited to such embodiments and such function may be given to the recording apparatus itself. Also, instead of the supply of the recording code from the host computer to the recording apparatus, the developed print data may be supplied from the host computer to the recording apparatus.

As explained in the foregoing embodiments, the recording apparatus can record with inks of different dye concentrations, by interchange of the ink cartridge or the ink tank. Also in response to the change in the dye concentration in the ink, resulting from the interchange of the cartridge, the ejection amount of ink or the maximum ejection amount at the recording operation is changed according to the combination of the ink dye concentrations, thereby determining the maximum dye amount to be discharged onto the recording medium. Thus the recording operation can be executed according to the kind of the recording medium to be employed in the recording.

Also in the foregoing embodiments, in case of using the coloring materials of lower dye concentrations, the maximum ejection amounts of such inks are not simply increased in proportion to the ratio of the dye concentrations but are determined for each coloring material, for each n-th order color component and for each kind of the recording medium, by effecting color separation into the primary and secondary color components in each pixel.

Such function allows, even with the coloring materials of lower dye concentrations, to obtain a reflective optical density, both in the primary and secondary colors, substantially equal to that obtainable with the coloring materials of higher dye concentrations.

The present invention is basically featured by a fact that, even with the coloring materials of different dye concentrations, the dye amount per unit area on the recording medium can be varied by the interchange of the cartridge or the ink tank. Such substantially same dye density allows to obtain a substantially same maximum density, while reducing the granularity of the image.

Also the foregoing embodiments allow to suppress the amount of inks ejected onto the recording medium, thereby reducing the load applied thereto, and to reduce the running cost. These embodiments, being capable of varying the ink ejection amounts according to the dye concentrations of the used inks and finely controlling the ink ejection amount for each color, are particularly effective in the general-purpose ink jet recording apparatus utilizing recording media with a low limit of the ink ejection amount.

The color developing ability conceptually means the intensity of color formation of the ink itself, or the intensity of color formation in the state deposited on the recording medium.

It means, in case of a color, the level of color formation, or, in case of absence of color, the level of luminosity. In such meaning, it corresponds to the dye concentration if a same dye or pigment is considered.

In case of comparison in the printed state on the recording medium, it means the reflective optical density or the comparison of the maximum saturation in the substantially same hue.

The high color developing ability is generally defined by a high color forming ability.

The ink is not necessarily liquid but can also be solid.

The foregoing embodiments have disclosed an apparatus for discharging inks onto a recording medium as an embodiment of the recording apparatus, but the information processing apparatus of the present invention is not limited to such embodiment and the present invention is likewise applicable to other recording apparatuses such as a thermal or sublimation color recording apparatus. Thus the present invention covers any and all apparatuses utilizing dots in image recording.

The objects of the present invention can also be attained by supplying a system or an apparatus with a memory medium storing program codes of a software, called a printer driver, realizing the functions of the foregoing embodiments, and by reading and executing such program codes, stored in the memory medium, by a computer (or CPU or MPU) of the system or the apparatus.

In such case the program codes read from the memory medium realize the functions of the aforementioned embodiments and the memory medium storing such program codes constitutes the present invention.

The memory medium for supplying the program codes can be, for example, a floppy disk, a hard disk, an optical disk, a magneto-optical disk, a CD-ROM, a CD-R, a magnetic tape, a non-volatile memory card or a ROM.

In addition to the case of realizing the functions of the foregoing embodiments by the execution of the read program codes by the computer, the present invention also includes a case where an operating system or the like functioning on the computer executes all the actual processes or a part thereof according to the instruction of such program codes, thereby attaining the functions of the aforementioned embodiments.

The present invention further includes a case where the program codes read from the memory medium are written in a memory provided in a function expanding board inserted into or connected to the computer and a computer or the like provided on such function expanding board executes all the actual processes or a part thereof according to the instruction of such program codes, thereby attaining the functions of the foregoing embodiments.

The embodiments explained in the foregoing enable formation of a multi-value image representing $2^n$ gradation levels by multi-value information of consecutive n bits. It is thus made possible to achieve reduction in the amount of image information to be transferred and processed, and at the same time to achieve improvement in the tonal rendition, as intended in the present invention, thereby providing high-quality multi-value recording in the dot matrix recording system suitable for personal use.

The foregoing embodiments have disclosed an ink jet recording apparatus and an ink jet recording method as an example suitable for the application of the present invention, but the present invention is not limited to such ink jet recording and is likewise applicable to other recording methods such as thermal transfer recording or electrophotographic recording method.

Also the foregoing embodiments allow to select a recording method according to and adapted for the combination of the image data and the recording head mounted on the recording apparatus. Also in case of an improper combination, there can be conducted irregular recording, thereby causing the use to recognize such improper combination.

Also the foregoing embodiments allow multi-value recording in different recording modes, by having multi-value tables corresponding to such recording modes.

Also the foregoing embodiments allow multi-value recording in different recording media, by having multi-value tables corresponding to such recording media.

In addition to the foregoing effects, there can be obtained high-quality halftone recording with reduced granularity, without deterioration in the actual resolution and with minimum kinds of inks for each color.

There are employed interchangeable cartridges containing coloring materials of different densities and there can be obtained a high-quality image by the interchange of such cartridges.

The recording with changes in the densities of the coloring materials provides a high-quality image with significantly reduced granularity.

Also the image can be recorded with optimum ink ejection amounts, determined according to the densities of the coloring materials and the kind of the recording medium, used in the recording operation.

Furthermore, in recording with the coloring materials of low densities, the foregoing embodiments control the amounts of such coloring materials thereby preventing blotting on the recording medium and still obtaining densities substantially equal to those obtainable with the coloring materials of higher densities.

What is claimed is:

1. A recording apparatus for executing a recording operation with plural kinds of recording heads according to image data, comprising:
    a mounting unit capable of mounting a first recording head or a second recording head different from said first recording head;
    an interface for inputting image information; and
    means for decoding the image information inputted through said interface, according to the recording head mounted on said mounting unit, wherein the reflective optical density of a recording material on the recording medium elected from said first recording head is different from that of said second recording head in the substantially same hue.

2. A recording apparatus according to claim 1, wherein, in the image information, at least a bit within plural-bit information representing a pixel has a meaning different from that of other bits.

3. A recording apparatus according to claim 1, further comprising:
    recording head identification means for identifying said recording head mounted by said mounting unit; and
    a control unit for setting a recording mode according to the reflective optical density of the recording material, based on a result of identification by said recording head identification means.

4. An ink jet recording apparatus according to claim 1, comprising:
    recording head identification means for identifying said recording head mounted on said mounting unit; and
    setting means for setting a driving condition, corresponding to the reflective optical density of the recording material of said recording head mounted on said mounting unit.

5. An ink jet recording method for effecting a recording operation with a recording head having plural discharge units for discharging ink, by discharging ink onto a recording medium from said recording head according to image data, comprising the steps of:
    interchangeably mounting a first recording head or a second recording head different from said first recording head;
    generating multi-value information from the image data; and
    decoding the multi-value information, according to the recording head mounted in said mounting step, thereby generating recording data used in the recording, wherein the reflective optical density of ink on a recording medium ejected from said first recording head is different from that from said second recording head in the substantially same hue.

6. An ink jet recording method according to claim 5, wherein, in the multi-value information, at least a bit within plural-bit information representing a pixel has a meaning different from that of other bits.

7. An ink jet recording method according to claim 5, further comprising the steps of identifying said recording head mounted in said mounting step and setting a recording mode according to the reflective optical density of the ink, based on a result of said identification.

8. An ink jet recording method according to claim 7, wherein said setting step is adapted to set a multi-value recording mode according to the results of identification of the image data and of the recording head.

9. An ink jet recording method according to claim 7, wherein said setting step is adapted to set a specified recording mode according to the results of identification of the image data and of the recording head.

10. An ink jet recording method according to claim 7, wherein said setting step is adapted to set a binary recording mode according to the results of identification of the image data and the recording head.

11. An ink jet recording method according to claim 5, wherein said decoding step is adapted to decode the multi-value information by referring to a multi-value table.

12. An ink jet recording method according to claim 11, wherein said decoding step is adapted to decode the multi-value information by referring to different multi-value tables according to a recording mode.

13. An ink jet recording method according to claim 11, wherein said decoding step is adapted to decode the multi-value information by referring to different multi-value tables according to the recording medium.

14. An ink jet recording method according to claim 5, further comprising the step of:
    identifying said mounted recording head and setting a driving condition for said recording head, according to the reflective optical density of the ink.

15. An information processing apparatus used in combination with a recording apparatus for executing recording based on a given image, utilizing plural kinds of recording heads, comprising:
    designation means for designating an image process for said recording heads;
    interface means for outputting image information to said recording apparatus; and
    encoding means for encoding the image information by a method corresponding to the image process designated by said designation means;
    wherein the plural kinds of recording heads are interchangeably mounted on a mounting unit of said recording apparatus, and
    the reflective optical density of a recording material on a recording medium ejected from a first recording head is different from that of a second recording head in the substantially same hue.

16. An information processing apparatus according to claim 15, wherein, in the image information, at least a bit within plural-bit information representing a pixel has a meaning different from that of other bits.

17. An information processing apparatus according to claim 15, further comprising:

recording head identification means for identifying a recording head mounted on said mounted unit; and a control unit for setting a recording mode according to the reflective optical density of a recording material of the mounted recording head, based on a result of identification by said recording head identification means.

18. An information processing method adapted for use in an information processing apparatus used in combination with a recording apparatus for executing recording based on a given image, utilizatinh plural kinds of recording heads, comprising steps of:

designating an image process for said recording heads;

encoding the image information outputted to an interface means, by a method corresponding to the image process designated in said designation step; and outputting the encoded image information to said recording apparatus, wherein the plural kinds of recording heads are interchangeably mounted on a mounting unit of said recording apparatus, and the reflective optical density of a recording material on a recording medium ejected from a first recording head is different from that of a second recording head in the substantially same hue.

19. An information processing method according to claim 18, wherein, in the image information, at least a bit within plural-bit information representing a pixel has a meaning different for said designation.

20. An information processing method according to claim 18, further comprising a step of providing a user with a guidance for said designation.

21. A medium which stores data representing process steps by an information processing apparatus used in combination with a recording apparatus for executing recording based on a given image, utilizating plural kinds of recording heads, said apparatus steps comprising:

designating an image process for plural kinds of recording heads;

encoding image information outputted to an interface means, by a method corresponding to the image process designated in said designation step; and outputting the encoded image information to a recording apparatus, wherein the plural kinds of recording heads are interchangeably mounted on a mounting unit of said recording apparatus, and the reflective optical density of a recording material on a recording medium ejected from a first recording head is different from that of a second recording head in the substantially same hue.

22. An ink jet recording apparatus for executing a recording operation with a recording head having plural discharge units for discharging ink, by discharging the ink onto a recording medium from said recording head according to image data, comprising:

a mounting unit capable of interchangeably mounting a first recording head or a second recording head different from said first recording head;

image processing means for generating multi-value data from the image data; and means for decoding the multi-value information, according to the recording head mounted on said mounting unit, wherein the reflective optical density of the ink on a recording medium ejected from said first recording head is different from that from said second recording head in the substantially same hue.

23. An ink jet recording apparatus according to claim 22, wherein, in the image information, at least a bit within plural-bit information representing a pixel has a meaning different from that of other bits.

24. An ink jet recording apparatus according to claim 22, further comprising:

recording head identification means for identifying said recording head mounted by said mounting unit; and a control unit for setting a recording mode according to the reflective optical density of the ink, based on a result of identification by said recording head identification means.

25. An ink jet recording apparatus according to claim 24, wherein said setting means is adapted to set a multi-value recording mode according to the results of identifications by said image data identification means and by said recording head identification means.

26. An ink jet recording apparatus according to claim 24, wherein said setting means is adapted to set a specified recording mode according to the results of identifications by said image data identification means and by said recording head identification means.

27. An ink jet recording apparatus according to claim 24, wherein said setting means is adapted to set a binary recording mode according to the results of identifications by said image data identification means and by said recording head identification means.

28. An ink jet recording apparatus according to claim 22, wherein said decoding means is adapted to decode the multi-value information by referring to a multi-value table.

29. An ink jet recording apparatus according to claim 28, wherein said decoding means is adapted to decode the multi-value information by referring to different multi-value tables according to a recording mode.

30. An ink jet recording apparatus according to claim 28, wherein said decoding means is adapted to decode the multi-value information by referring to different multi-value tables according to the recording medium.

31. An ink jet recording apparatus for executing a recording operation with a recording head having plural discharge units for discharging ink, by discharging ink onto a recording medium from said recording head according to image data, comprising:

a mounting unit capable of interchangeably mounting a first recording head or a second recording head different from said first recording head;

image data identification means for identifying whether inputted image data is multi-value information;

recording head identification means for identifying said recording head mounted on said mounting unit;

generation means for generating recording data, to be used in recording, by decoding multi-value information obtained from the image data; and setting means for setting a recording mode, according to a result of identification by said image data identification means and the result of identification by said recording head identification means, wherein the reflective optical density of the ink on a recording medium ejected from said first recording head is different from that from said second recording head in the substantially same hue.

32. An ink jet recording apparatus according to claim 31, wherein, in said multi-value information, at least a bit within plural-bit information representing a pixel has a meaning different from that of other bits.

33. An ink jet recording apparatus for executing a recording operation with a recording head having plural discharge units for discharging ink, by discharging ink onto a recording medium from said recording head according to image data, comprising the step of:

interchangeably mounting a first recording head or a second recording head different from said first recording head;

identifying whether inputted image data is multi-value information;

identifying the mounted recording head, wherein the reflective optical density of ink on the recording medium ejected from said first recording head is different from that from said second recording head in the substantially same hue;

generating recording data, used in recording, by decoding the multi-value information; and setting a recording mode, according to the results of identification of the inputted image data and of the mounted recording head.

34. An ink jet recording method according to claim 33, wherein, in said multi-value information, at least a bit within plural-bit information representing a pixel has a meaning different from that of other bits.

35. An information processing apparatus for controlling a recording apparatus provided with a mounting unit capable of interchangeably mounting a first recording head or a second recording head different from said first recording head and effecting a recording operation with said first or second recording head, comprising:

generation means for generating multi-value information from the image data; and means for controlling said generation means according to the recording head mounted on said mounting unit, wherein the reflective optical density of a dot of recording material on a recording medium ejected from said first recording head is different from that from said second recording head in the substantially same hue.

36. An ink jet recording apparatus according to claim 35, wherein, in the multi-value information, at least a bit within plural-bit information representing a pixel has a meaning different from that of other bits.

37. An ink jet recording apparatus according to claim 35, wherein, in the multi-value information, the multi-value structure thereof is identified by header information contained in the multi-value information.

38. An ink jet recording apparatus comprising:

a mounting unit capable of interchangeably mounting a first ink head for discharging first ink or a second ink jet head, different from said first ink jet head, for discharging second ink;

drive means for supplying a driving condition to the ink jet head mounted on said mounting unit; and record control means for, based on the information of the reflective optical density of ink discharged from the ink jet head mounted on said mounting unit and on the kind of a recording medium, controlling the ink amount supplied in unit time from said recording head to said recording medium, and controling said driving condition according to a ratio of the reflective optical density of said second ink relative to that of said first ink, thereby executing a recording operation by forming color with said second ink with an area density corresponding to that obtained with said first ink.

39. An ink container used in the ink jet recording apparatus according to claim 22, 31 or 38, provided with information indicating the reflective optical density of the ink contained therein.

40. An ink container according to claim 39, comprising ink therein.

41. A head cartridge comprising a combination of an ink container and a recording head used in the ink jet recording apparatus according to claim 22, 31 or 38, provided with information indicating the reflective optical density of the ink contained therein.

42. A head cartridge according to claim 41, comprising ink therein.

43. Ink with reflective optical density adapted for use in the ink jet.recording apparatus according to claim 22, 31 or 38.

44. A recording apparatus for executing a recording operation with plural kinds of recording heads according to image data, comprising:

a mounting unit capable of mounting a first recording head or a second recording head different from said first recording head;

an interface for inputting image information; and means for decoding the image information inputted through said interface, when said first recording head is mounted on said mounting unit, wherein the reflective optical density of a recording material on a recording medium recorded by said first recording head is lower than that from said second recording head in the substantially same hue.

45. A recording method for executing a recording operation with plural kinds of recording heads according to image data, comprising the steps of:

mounting on a mounting unit a first recording head or a second recording head different from the first recording head;

inputting image information through an interface; and decoding the image information inputted through the interface, when the first recording head is mounted on the mounting unit, wherein the reflective optical density of a recording material on a recording medium recorded by the first recording head is lower than that from the second recording head in the substantially same hue.

46. An information processing apparatus used in combination with a recording apparatus for executing recording based on a given image, utilizing plural kinds of recording heads, comprising:

a mounting unit capable of mounting a first recording head or a second recording head different from said first recording head;

an interface for inputting image information; and means for decoding the image information inputted through said interface, when said first recording head is mounted on said mounting unit, wherein the reflective optical density of a recording material on a recording medium recorded by said first recording head is lower than that from said second recording head in the substantially same hue.

47. An information processing method used in combination with a recording method for executing recording based on a given image, utilizing plural kinds of recording heads, comprising the steps of:

mounting on a mounting unit a first recording head or a second recording head different from the first recording head;

inputting image information through an interface; and decoding the image information inputted through the interface, when the first recording head is mounted on the mounting unit, wherein the reflective optical density of a recording material on a recording medium recorded by the first recording head is lower than that from the second recording head in the substantially same hue.

* * * * *

UNITED STATES PATENT AND TRADEMARK OFFICE
CERTIFICATE OF CORRECTION

PATENT NO. : 6,390,586 B1
DATED : May 21, 2002
INVENTOR(S) : Takahashi et al.

It is certified that error appears in the above-identified patent and that said Letters Patent is hereby corrected as shown below:

Column 6,
Line 29, "thus" should read -- the thus --.

Column 7,
Line 28, "(Bk2)" should read -- $(Bk^2)$ --.
Line 34, "Bk2." should read -- $Bk^2$. --.

Column 10,
Line 1, "and" (first occurrence) should be deleted.

Column 11,
Line 15, "thus" should read -- the thus --.
Line 66, "15" should read -- 15A --.
Line 67, "invention." should read -- invention and FIG. 15B is an enlargement of a section thereof. --.

Column 15,
Line 6, "a re" should read -- are --.

Column 20,
Line 59, "luminocities" should read -- luminosities --.

Column 21,
Line 48, "case" should read -- the case of --.

Column 22,
Line 47, "i s" should read -- is --.

Column 28,
Line 3, "read" should read -- reads --.
Line 54, "scannig" should read -- scanning --.

Column 30,
Line 42, "thus" should read -- the thus --.
Line 44, "case" should read -- cases, --.
Line 52, "an" should read -- of an --.

Column 33,
Line 32, "elected" should read -- ejected --.

UNITED STATES PATENT AND TRADEMARK OFFICE
CERTIFICATE OF CORRECTION

PATENT NO.    : 6,390,586 B1
DATED         : May 21, 2002
INVENTOR(S)   : Takahashi et al.

It is certified that error appears in the above-identified patent and that said Letters Patent is hereby corrected as shown below:

Column 35,
Line 11, "utilizatinh" should read -- utilizing --.
Line 30, "for said designation." should read -- from that of other bits. --.

Column 36,
Lines 16, 21 and 26, "identifications" should read -- identification --.

Column 37,
Line 1, "apparatus" should read -- method --.
Line 5, "step" should read -- steps --.

Column 38,
Line 13, "jet.recording" should read -- jet recording --.

Signed and Sealed this

Nineteenth Day of November, 2002

Attest:

Attesting Officer

JAMES E. ROGAN
*Director of the United States Patent and Trademark Office*